United States Patent
Gao et al.

(10) Patent No.: US 11,539,962 B2
(45) Date of Patent: Dec. 27, 2022

(54) CODING METHOD, DEVICE, SYSTEM

(71) Applicant: Huawei Technologies Co., Ltd., Shenzhen (CN)

(72) Inventors: Han Gao, Munich (DE); Semih Esenlik, Munich (DE); Jianle Chen, San Diego, CA (US); Anand Meher Kotra, Munich (DE); Biao Wang, Shenzhen (CN); Zhijie Zhao, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/205,340

(22) Filed: Mar. 18, 2021

(65) Prior Publication Data
US 2021/0250590 A1 Aug. 12, 2021

Related U.S. Application Data

(63) Continuation of application No. PCT/CN2019/106354, filed on Sep. 18, 2019.
(Continued)

(51) Int. Cl.
*H04N 19/157* (2014.01)
*H04N 19/176* (2014.01)
(Continued)

(52) U.S. Cl.
CPC ......... *H04N 19/157* (2014.11); *H04N 19/176* (2014.11); *H04N 19/184* (2014.11); *H04N 19/70* (2014.11); *H04N 19/96* (2014.11)

(58) Field of Classification Search
CPC .. H04N 19/157; H04N 19/176; H04N 19/184; H04N 19/96; H04N 19/70
See application file for complete search history.

(56) References Cited

U.S. PATENT DOCUMENTS 10,715,833 B2 7/2020 Zheng et al.
10,742,972 B1 8/2020 Li et al.
(Continued)

FOREIGN PATENT DOCUMENTS

CN 104322067 A 1/2015
CN 106559669 A 4/2017

OTHER PUBLICATIONS

Bross, B., et al., "Versatile Video Coding (Draft 2)," JVET-K1001-v7, Joint Video Experts Team (JVET) of ITU-T SG 16 WP 3 and ISO/IEC JTC 1/SC 29/WG 11, 11th Meeting: Ljubljana, SI, Jul. 10-18, 2018, 139 pages.
(Continued)

*Primary Examiner* — Neil R Mikeska
(74) *Attorney, Agent, or Firm* — Conley Rose, P.C.

(57) ABSTRACT

A decoding method for decoding an encoded picture which is partitioned into coding tree blocks which are further partitioned into coding blocks with different sizes, comprises parsing a first indication from the sequence parameter set (SPS)/picture parameter set (PPS)/slice header/tile header of a bit stream containing the encoded picture, determining the partition mode of the coding tree blocks, which are confined by block size restriction parameter and partition depth restriction parameter included in the SPS/PPS/slice header/tile header when the first indication is first value, or determining the partition mode of the multiple coding tree blocks, which are confined by default by block size restriction parameter and default partition depth restriction parameter when the first indication is second value or not presented in the SPS/PPS/slice header/tile header, and partitioning the coding tree blocks into the coding blocks according to the partition mode, and decoding the coding blocks.

20 Claims, 14 Drawing Sheets

Related U.S. Application Data

(60) Provisional application No. 62/733,076, filed on Sep. 18, 2018.

(51) Int. Cl.
  *H04N 19/184* (2014.01)
  *H04N 19/70* (2014.01)
  *H04N 19/96* (2014.01)

(56) References Cited

U.S. PATENT DOCUMENTS

| | | |
|---|---|---|
| 2002/0087728 A1 | 7/2002 | Deshpande et al. |
| 2010/0086051 A1* | 4/2010 | Park .................. H04N 19/70 375/E7.123 |
| 2011/0194613 A1 | 8/2011 | Chen et al. |
| 2012/0128067 A1 | 5/2012 | Liu et al. |
| 2012/0177107 A1 | 7/2012 | Fu et al. |
| 2013/0188717 A1 | 7/2013 | Chen et al. |
| 2013/0188719 A1 | 7/2013 | Chen et al. |
| 2013/0251022 A1 | 9/2013 | Sjoberg et al. |
| 2013/0263201 A1* | 10/2013 | Chung-How ...... H04N 21/2402 725/116 |
| 2013/0336399 A1 | 12/2013 | Yu et al. |
| 2014/0010277 A1* | 1/2014 | Wang .................. H04N 19/70 375/240.02 |
| 2015/0043639 A1 | 2/2015 | Lee et al. |
| 2015/0101003 A1* | 4/2015 | Bull .................. H04N 21/2402 725/116 |
| 2015/0304670 A1 | 10/2015 | Liu et al. |
| 2016/0316200 A1 | 10/2016 | Zhang et al. |
| 2017/0078668 A1 | 3/2017 | Misra et al. |
| 2017/0094277 A1 | 3/2017 | Chen et al. |
| 2017/0195679 A1 | 7/2017 | Rapaka et al. |
| 2017/0272758 A1 | 9/2017 | Lin et al. |
| 2017/0280162 A1 | 9/2017 | Zhao et al. |
| 2017/0347128 A1* | 11/2017 | Panusopone ........... H04N 19/46 |
| 2018/0020241 A1* | 1/2018 | Li ....................... H04N 19/18 |
| 2018/0070110 A1* | 3/2018 | Chuang ................ H04N 19/96 |
| 2018/0109812 A1 | 4/2018 | Tsai et al. |
| 2018/0176601 A1* | 6/2018 | Jeong ..................... H04N 19/50 |
| 2018/0205965 A1 | 7/2018 | Chen et al. |
| 2018/0213264 A1 | 7/2018 | Zhang et al. |
| 2018/0309508 A1 | 10/2018 | Regan et al. |
| 2018/0367818 A1 | 12/2018 | Liu et al. |
| 2019/0222859 A1 | 7/2019 | Chuang et al. |
| 2020/0145698 A1 | 5/2020 | Gao et al. |
| 2020/0260070 A1 | 8/2020 | Yoo et al. |
| 2021/0021868 A1* | 1/2021 | Kim .................... H04N 19/119 |

OTHER PUBLICATIONS

Bross, B., et al, "Versatile Video Coding (Draft 2)," Document: JVET-K1001-v4, Joint Video Experts Team (JVET) of ITU-T SG 16 WP 3 and ISO/IEC JTC 1/SC 29/WG 11, 11th Meeting: Ljubljana, SI, Jul. 10-18, 2018, 86 pages.

ITU-T H.223, "Series H: Audiovisual and Multimedia Systems, Infrastructure of audiovisual services—Transmission, multiplexing and synchronization, Multiplexing protocol for low bit rate multimedia communication," Jul. 2001, 74 pages.

Xiu, X., et al, "Description of SDR, HDR, and 360 video coding technology proposal by InterDigital Communications and Dolby Laboratories," JVET-J0015-v1, Joint Video Experts Team (JVET) of ITU-T SG 16 WP 3 and ISO/IEC JTC 1/SC 29/WGII, 10th Meeting: San Diego, US, Apr. 10-20, 2018, 82 pages.

ITU-T H.263 "Series H: Audiovisual and Multimedia Systems, Infrastructure of audiovisual services—Coding of moving video, Video coding for low bit rate communication," Jan. 2005, 226 pages.

ITU-T H.264 "Series H: Audiovisual and Multimedia Systems, Infrastructure of audiovisual services—Coding of moving video, Advanced video coding for generic audiovisual services,"Apr. 2017, 812 pages.

ITU-T H.265 "Series H: Audiovisual and Multimedia Systems Infrastructure of audiovisual services—Coding of moving video, High efficiency video coding," Feb. 2018, 692 pages.

ITU-T H.261 "Line Transmission of Non-Telephone Signals, Video Codec for Audiovisual Services at p x 64 kbits," Mar. 1993, 29 pages.

ITU-T H.262 "Series H: Audiovisual and Multimedia Systems, Infrastructure of audiovisual services—Coding of moving video Information technology—Generic coding of moving pictures and associated audio information: Video Frame packing arrangement signalling for 3D content," Feb. 2012, 238 pages.

An, J., et al., "Block partitioning structure for next generation video coding," ITU-T SG16 Doc. COM16-C966, Sep. 2015, 8 pages.

* cited by examiner

CODING METHOD, DEVICE, SYSTEM

CROSS-REFERENCE TO RELATED APPLICATIONS

This application is a continuation of International Patent Application No. PCT/CN2019/106354 filed on Sep. 18, 2019, which claims priority to U.S. Provisional Patent Application No. 62/733,076 filed on Sep. 18, 2018. The disclosures of the aforementioned applications are hereby incorporated by reference in their entireties.

TECHNICAL FIELD

The embodiments of the present disclosure generally relate to the field of video coding and more particularly to the field of high-level syntax concerning partitioning of a coding tree block.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable. High Efficiency Video Coding (HEVC) is the latest video compression issued by International Organization for Standardization (ISO)/International Electrotechnical Commission (IEC) Moving Picture Experts Group (MPEG) and International Telecommunications Union Telecommunication Standardization Sector (ITU-T) Video Coding Experts Group (VCEG) as ISO/IEC 23008-2 MPEG-H Part 2 or called ITU-T H.265, and offers about double the data compression ratio at the same level of video quality, or substantially improved video quality at the same bit rate. An HEVC bitstream consists of a sequence of data units called Network Abstraction Layer (NAL) units. Some NAL units contain parameter sets that carry high-level information regarding the entire coded video sequence or a subset of the pictures within it. Other NAL units carry coded samples in the form of slices that belong to one of the various picture types that are defined in HEVC. Some picture types indicate that the picture can be discarded without affecting the decodability of other pictures, and other picture types indicate positions in the bitstream where random access is possible. The slices contain information on how decoded pictures are managed, both what previous pictures to keep and in which order they are to be output. Some NAL units contain optional supplementary enhancement information (SEI) that aids the decoding process or may assist in other ways, such as providing hints about how best to display the video. The syntax elements that describe the structure of the bitstream or provide information that applies to multiple pictures or to multiple coded block regions within a picture, such as the parameter sets, reference picture management syntax, and SEI messages, are known as the "high-level syntax" part of HEVC. A considerable amount of attention has been devoted to the design of the high-level syntax in HEVC, in order to make it broadly applicable, flexible, robust to data losses, and generally highly capable of providing useful information to decoders and receiving systems. Several parameter sets are included in the so called "High-level syntax" which are fundamental data in aiming of bit rate efficiency, error resiliency, and providing systems layer interfaces. There is a hierarchy of parameter sets in HEVC as shown in FIG. 6, including the sequence parameter set (SPS) and picture parameter set (PPS) which are similar to their counterparts in Advanced Video Coding (AVC). Additionally, HEVC introduces a new type of parameter set called the video parameter set (VPS). Each slice references a single active PPS, SPS and VPS to access information used for decoding the slice. The PPS contains information which applies to all slices in a picture, and hence all slices in a picture must refer to the same PPS. The slices in different pictures are also allowed to refer to the same PPS. Similarly, the SPS contains information which applies to all pictures in the same coded video sequence. The VPS contains information which applies to all layers within a coded video sequence, and is intended for use in the upcoming layered extensions of HEVC, which will enable scalable and multiview coding. While the PPS may differ for separate pictures, it is common for many or all pictures in a coded video sequence to refer to the same PPS. Reusing parameter sets is bit rate efficient because it avoids the necessity to send shared information multiple times. It is also loss robust because it allows parameter set content to be carried by some more reliable external communication link or to be repeated frequently within the bitstream to ensure that it will not get lost. To identify for a given slice the active parameter set at each level of the parameter set type hierarchy, each slice header contains a PPS identifier which references a particular PPS. Within the PPS is an identifier that references a particular SPS. In turn, within the SPS is an identifier that references a particular VPS. A parameter set is activated when the current coded slice to be decoded references that parameter set or when an SEI message indicates its activation. All active parameter sets must be available to the decoder when they are first referenced. Parameter sets may be sent in-band or out-of-band, and may be sent repeatedly. Parameter sets may be received in any order.

In a latest development versatile video coding (VVC) standard, more partitioning modes, e.g. Quad-tree, binary tree, and ternary tree, are adopted to partition a picture into more fine and flexible shapes as compared to prior standard, HEVC for instance, and the high-level-syntax is changed accordingly. Provision of an efficient syntax is desirable to provide configurability and to enable reduction of rate.

SUMMARY

Embodiments of the present application (or the present disclosure) provide apparatuses and methods for encoding and decoding. The disclosure is defined by the features of the independent claims. Some of advantageous embodiments are subject matter of the dependent claims.

According to a first embodiment, a decoding method is provided to be performed by a decoder for decoding an encoded picture which is partitioned into multiple (two or more) coding tree blocks (CTUs) which are further partitioned into multiple coding blocks with particular sizes. In general, a CTU may be partitioned into the code blocks (CBs) but does not have to be. The sizes (possibly also shapes) of the CBs within a CTU may be equal or different. The decoding method comprises parsing a first indication from a parameter set included in a bit stream containing the encoded picture, the parameter set being (at least one of) SPS, PPS, slice header, or tile header. The method further comprises determining the particular sizes of the coding blocks, which are confined by a block size restriction parameter included in the parameter set of the bit stream if the first indication has a first value, or determining the particular sizes of the coding blocks, which are confined by a default size restriction parameter if the first indication has a second value or is not presented in the parameter set. Finally, the method comprises decoding the coding blocks with the particular sizes. In a non-limiting example, the decoding is a hybrid decoding such as HEVC or its sequels. The default size restriction parameter may be defined in the standard and thus same for the encoder and the decoder. Alternatively, or in addition, the default may be derived in the same way at the encoder and the decoder, e.g. using a procedure defined in the standard. One of the advantages of the above-mentioned method may be more efficient encoding and decoding employing block partitioning, default settings may be used whenever the first indication has a certain value or is not included in the bitstream.

Further to the first embodiment, the method of the second embodiment further comprises determining a partition mode of the multiple coding tree blocks, which are confined by a partition depth restriction parameter included in the parameter set of the bit stream if the first indication has the first value, or determining the partition mode of the multiple coding tree blocks, which are confined by a default partition depth restriction parameter if the first indication has the second value or us not presented in the parameter set, and partitioning the multiple coding tree blocks into the coding blocks with the particular sizes according to the partition mode. In other words, in the second embodiment, in addition to the size restriction parameter (such as a maximum block size or a minimum block size that can be partitioned or that can be a result of partitioning), partition depth restriction parameter is signaled or set per default.

In a method of a third embodiment, further to the first or the second embodiment, the first indication is a flag, partition_constraints_control_present_flag. For example, the first indication takes one of two possible values (a first value and a second value) to indicate presence or absence of partition constraints parameters. Such partition_constraints_control_present_flag provides an advantage of efficient coding—it may be coded by a single bit.

Further to the second or the third embodiment, in a fourth embodiment the size restriction parameters include minimum quad tree size, MinQtSize, and/or maximum binary tree size, MaxBtSize, and/or maximum ternary tree size, MaxTtsize, the partition depth restriction parameter includes maximum multiple type tree depth, MaxMttDepth.
In this embodiment, the depth may be thus signaled for all types of trees in common by a parameter of the maximum multiple type tree depth, while the size restriction parameters may be set individually for different tree types. This may facilitate further increase in efficiency. However, the present disclosure is not limited to these options. For further simplifications, additional rules may be introduced such as that MinQtSize equals to MaxBtSize or the like.

Further to any of the second to fourth embodiment, in a fifth embodiment the default size restriction parameters include minimum quad tree size, MinQtSize, being set as 4 or being set as minimum coding block size, MinCbSize, and/or maximum binary tree size, MaxBtSize, being set as 128 or being set as coding tree block size for inter slice, and being set as 32 for intra slice, and/or maximum ternary tree size, MaxTtSize, being set as 64 for inter slice, and being set as 32 for intra slice, and the default partition depth restriction parameter includes maximum multiple type tree depth, MaxMttDepth, being set as 3.
While these exemplary numbers may provide an efficient setting, the present disclosure is not limited to these particular numbers. The default restriction parameters may be specified in a standard or they may be derived based on previously signaled restriction parameters in a predefined manner (e.g. specified by the standard) or they may be signaled e.g. less frequently than the parameter sets, or the like.

According to a sixth embodiment, a decoding method is provided to be performed by a decoder for decoding an encoded picture which is partitioned into multiple coding tree blocks which are further partitioned into multiple coding blocks with particular sizes, comprises parsing a first indication from the SPS of a bit stream containing the encoded picture, wherein the first indication allows the decoder to determine the particular sizes of the coding blocks, which are confined by block size restriction parameter included in the SPS of the bit stream if the first indication is the first value, or confined by default block size restriction parameter if the first indication is the second value, parsing a second indication from the SPS of the bit stream if the first indication is the first value, wherein, the second indication indicates that a third indication is included in a slice header of a slice including the coding blocks if the second indication has a third value, or a third indication is not included in the slice header. In other words, second indication in the SPS may take one of two values, a third value and a fourth value. The terms third and fourth are mere labels to indicate that these values may be but do not have to be the same values in binary coding as the above-mentioned first and second value of the first indication. For example, the first value may be 1 to indicate signaling of restriction parameters in the parameter set, and the third value may be 1 to indicate signaling of a third indication in a slice header. However, the third value may alternatively be coded by 0 in some implementations.

The third indication indicates that a slice level size restriction parameter is included in the slice header if the third indication has a fifth value, or that a slice level size restriction parameter is not included in the slice header if the third indication has a sixth value.
In this way, signaling restriction parameters at different syntax element levels and with different frequency is facilitated. In some implementations, the first, the second and the third indication are respective one-bit-long flags, i.e. syntax elements of which each can take one of two possible values to indicate presence or absence of further element(s).
The decoding method further comprises parsing the third indication if the second indication has the third value, determining the particular sizes of the coding blocks, which are confined by the slice level size restriction parameter included in the slice header if the third indication has the fifth value, or determining the particular sizes of the coding blocks, which are confined by the block size restriction parameter included in the SPS of the bit stream if the third indication has the sixth value or the second indication has a fourth value, or determining the particular sizes of the coding blocks, which are confined by the default size restriction parameter if the first indication has second value, decoding the coding blocks with the particular sizes.

The slice level size restriction parameters here may be at least in part (or entirely) the same as the size restriction parameters signaled in the SPS (or PPS). For example, the slice level size restriction parameters may include one or more of MinQtSize, MaxBtSize, MaxMttDepth or the like.

According to a seventh embodiment, further to the sixth embodiment, the third indication further indicates that a slice level partition depth restriction parameter is included in the slice header if the third indication has the fifth value, the method further comprising determining the partition mode of the multiple coding tree blocks, which are confined by the slice level partition depth restriction parameter and the slice level size restriction parameter included in the slice header if the third indication has the fifth value, or determining the partition mode of the multiple coding tree blocks, which are confined by partition depth restriction parameter and the size restriction parameter included in the SPS of the bit stream if the third indication has the sixth value or the second indication has the fourth value, or determining the partition mode of the multiple coding tree blocks, which are confined by default partition depth restriction parameter and the default size restriction parameter if the first indication has the second value, and partitioning the multiple coding tree blocks into the coding blocks with the particular sizes according to the partition mode. As mentioned above, signaling partitioning depth may facilitate efficient coding.

According to an eighth embodiment, a decoding method is provided to be performed by a decoder for decoding an encoded picture which is partitioned into multiple coding tree blocks which are further partitioned into multiple coding blocks with particular sizes, comprises parsing a first indication from the SPS of a bit stream containing the encoded picture, wherein the first indication allows the decoder to determine the particular sizes of the coding blocks, which are confined by a size restriction parameter included in the SPS of the bit stream if the first indication has a first value, or confined by default size restriction parameters if the first indication has a second value, parsing a second indication from the SPS if the first indication has the first value, wherein the second indication indicates that multiple type tree partitioning constrained by a size restriction parameter is allowed if second indication has the third value, or indicates that multiple type tree partitioning is not allowed if the second indication has the fourth value, parsing a third indication from the SPS if the first indication has the first value, wherein, the third indication indicates that a fourth indication is included in a slice header of a slice including the coding block if the third indication has the fifth value, or the fourth indication is not included in the slice header, and the fourth indication indicates that slice level size restriction parameter is included in the slice header if the fourth indication has a seventh value, or that the slice level size restriction parameter is not included in the slice header if the third indication has the sixth value, parsing the fourth indication if the third indication has the fifth value, parsing a fifth indication from the slice header if the fourth indication has the seventh value, wherein the fifth indication indicates that multiple type tree partitioning constrained by the slice level size restriction parameter is allowed in the slice if the fifth indication has a ninth value or indicates that multiple type tree partitioning is not allowed in the slice if the fifth indication has a tenth value, determining the particular sizes of the coding blocks, which are confined by the slice level size restriction parameter included in the slice header if the fifth indication has the ninth value, or determining the particular sizes of the coding blocks, which are confined by the size restriction parameter included in the SPS of the bit stream if the third indication has the sixth value and the second indication has the third value or the fourth indication has an eighth value and the second indication has the third value, or determining the particular sizes of the coding blocks, which are confined by the default size restriction parameter if the first indication is second value, decoding the coding blocks with the particular sizes.

Further to the ninth embodiment, in the ninth embodiment, the fourth indication further indicates that a slice level partition depth restriction parameter is included in the slice header if the fourth indication has the seventh value, and the method further comprises determining the partition mode of the multiple coding tree blocks, which are confined by the slice level partition depth restriction parameter and the slice level size restriction parameter included in the slice header if the fifth indication has the ninth value, or determining the partition mode of the multiple coding tree blocks, which are confined by partition depth restriction parameter and the size restriction parameter included in the SPS of the bit stream if the third indication has the fourth value or the fourth indication has the eighth value or the fifth indication has the tenth value, or determining the partition mode of the multiple coding tree blocks, which are confined by default partition depth restriction parameter and the default size restriction parameter if the first indication has the second value, and partitioning the multiple coding tree blocks into the coding blocks with the particular sizes according to the partition mode.

According to a tenth embodiment, a decoding method is provided to be performed by a decoder for decoding an encoded picture which is partitioned into multiple coding tree blocks which are further partitioned into multiple coding blocks with particular sizes, comprises parsing a first indication from SPS, or picture parameter set, PPS, or slice header or tile header of a bit stream containing the encoded picture, determining the partition mode of the multiple coding tree blocks, which are confined by block size restriction parameter and partition depth restriction parameter included in the SPS or PPS or slice header or tile header of the bit stream if the first indication has a first value, or determining the partition mode of the multiple coding tree blocks, which are confined by default block size restriction parameter and default partition depth restriction parameter if the first indication has a second value or not presented in the SPS or PPS or slice header or tile header, and partitioning the multiple coding tree blocks into the coding blocks with according to the partition mode, and decoding the coding blocks.

In an eleventh embodiment, a decoding method is provided to be performed by a decoder for decoding an encoded picture which is partitioned into multiple coding tree blocks which are further partitioned into multiple coding blocks with particular sizes, comprises parsing a first indication the SPS of a bit stream containing the encoded picture, wherein the first indication allows the decoder to determine the partition mode of the coding blocks, which are confined by block size restriction parameter and partition depth restriction parameter included in the SPS of the bit stream if the first indication has a first value, or confined by default block size restriction parameter and default partition depth restriction parameter if the first indication has a second value, parsing a second indication from the SPS if the first indication has the first value, wherein, the second indication indicates that a third indication is included in a slice header of a slice including the coding blocks if the second indication has the first value, or the third indication is not included in the slice header, and the third indication indicates that a slice level size restriction parameter and a slice level partition depth restriction parameter are included in the slice header if the a third indication has a fifth value, or that a slice level size restriction parameter and a slice level partition depth restriction parameter are not included in the slice header if the third indication is a sixth value, parsing the third indication if the second indication has a third value, determining the partition mode of the multiple coding tree blocks, which are confined by the slice level partition depth restriction parameter and the slice level size restriction parameter included in the slice header if the third indication has the fifth value, or determining the partition mode of the multiple coding tree blocks, which are confined by partition depth restriction parameter and the size restriction parameter included in the SPS of the bit stream if the third indication has the sixth value or the second indication has a fourth value, or determining the partition mode of the multiple coding tree blocks, which are confined by default partition depth restriction parameter and the default size restriction parameter if the first indication has the second value, partitioning the multiple coding tree blocks into the coding blocks according to the partition mode, and decoding the coding blocks. In general, the terms first, second, third, fourth, etc. are mere labels and do not imply any particular order. It is noted that e.g. the respective third indications in the sixth, eighth and eleventh embodiments are not the same. In general, the labels first, second, third, fourth, etc. are generally embodiment-specific in the above summary for the sixth, eighth and eleventh embodiments.

According to a twelfth embodiment, a decoding method is provided to be performed by a decoder for decoding an encoded picture which is partitioned into multiple coding tree blocks which are further partitioned into multiple coding blocks with particular sizes, comprises parsing a first indication from the SPS of a bit stream containing the encoded picture, wherein the first indication allows the decoder to determine the partition mode, which are confined by size restriction parameters and partition depth restriction parameter included in the SPS of the bit stream if the first indication has a first value, or confined by default size restriction parameters and default partition depth restriction parameter if the first indication has a second value, parsing a second indication from the SPS if the first indication has the first value, wherein the second indication indicates that multiple type tree partitioning constrained by the size restriction parameter is allowed if the second indication has a third value, or multiple type tree partitioning is not allowed if the second indication has a fourth value, parsing a third indication from the SPS if the first indication has the first value, wherein, the third indication indicates that a fourth indication is included in a slice header of a slice including the coding block if the third indication has a fifth value, or a fourth indication is not included in the slice header, and the fourth indication indicates that slice level size restriction parameter and a slice level partition depth restriction parameter are included in the slice header if the fourth indication has a seventh value, or that slice level size restriction parameter and a slice level partition depth restriction parameter are not included in the slice header if the third indication has a sixth value, parsing the fourth indication if the third indication has the fifth value, parsing a fifth indication from the slice header if the fourth indication has an eighth value, wherein the fifth indication indicates that multiple type tree partition constrained by the slice level size restriction parameter is allowed in the slice if the fifth indication has a ninth value or multiple type tree partition is not allowed in the slice if the fifth indication has a tenth value, determining the partition mode of the multiple coding tree blocks, which are confined by the slice level partition depth restriction parameter and the slice level size restriction parameter included in the slice header if the fifth indication has the ninth value, or determining the partition mode of the multiple coding tree blocks, which are confined by the partition depth restriction parameter and the size restriction parameter included in the SPS of the bit stream if the third indication has the sixth value or the fourth indication has the eighth value or the fifth indication has the tenth value, or determining the partition mode of the multiple coding tree blocks, which are confined by default partition depth restriction parameter and the default size restriction parameter if the first indication has the second value, partitioning the multiple coding tree blocks into the coding blocks, and decoding the coding blocks.

According to a thirteenth embodiment, a decoder is provided for decoding an encoded picture which is partitioned into multiple coding tree blocks which are further partitioned into multiple coding blocks with particular sizes, the decoder comprising a processing circuitry configured to parse a first indication from a parameter set of a bit stream containing the encoded picture, the parameter set being SPS, PPS, slice header, or tile header, determine the particular sizes of the coding blocks, which are confined by a block size restriction parameter included in the parameter set of the bit stream if the first indication has a first value, or determine the particular sizes of the coding blocks, which are confined by a default size restriction parameter if the first indication has a second value or is not presented in the parameter set, and decode the coding blocks with the particular sizes.

The processing circuitry may include one or more processors which may be general-purpose processors or digital signal processors or the like. However, the present disclosure is not limited thereto and the processing circuitry may be any combination of specialized or programmable hardware and/or software. In some implementations, the processing circuitry or the entire decoder may be implemented on (embodied by) an integrated circuit.

According to a fourteenth embodiment, an encoding method for encoding a picture which is partitioned into multiple coding tree blocks which are further partitioned into multiple coding blocks with particular sizes, the method comprising inserting a first indication into a parameter set of a bit stream containing the encoded picture, the parameter set being SPS, PPS, slice header, or tile header, determining the particular sizes of the coding blocks, which are confined by a block size restriction parameter and including the parameter set into the bit stream if the first indication has a first value, or determining the particular sizes of the coding blocks, which are confined by a default size restriction parameter and setting the first indication to a second value or not including the first indication into the parameter set, and encoding the coding blocks with the particular sizes.

According to a fifteenth embodiment, an encoder for encoding a picture which is partitioned into multiple coding tree blocks which are further partitioned into multiple coding blocks with particular sizes, the encoder comprising a processing circuitry configured to insert a first indication into a parameter set of a bit stream containing the encoded picture, the parameter set being SPS, PPS, slice header, or tile header, determine the particular sizes of the coding blocks, which are confined by a block size restriction parameter and including the parameter set into the bit stream if the first indication has a first value, or determine the particular sizes of the coding blocks, which are confined by a default size restriction parameter and setting the first indication to a second value or not including the first indication into the parameter set, and encode the coding blocks with the particular sizes.

According to an embodiment, a computer program is provided on a non-transitory medium, the program comprising code instructions which when executed on a one or more processors cause the one or more processors to execute any of the above mentioned embodiments related to encoding or decoding methods.

According to a sixteenth embodiment, decoding apparatus is provided for decoding an encoded picture which is partitioned into multiple coding tree blocks which are further partitioned into multiple coding blocks with particular sizes, comprises a parsing unit/circuit, configured for, parsing a first indication from a parameter set of a bit stream containing the encoded picture, the parameter set being SPS, PPS, slice header, or tile header, a first size determining unit/circuit, configured for, determining the particular sizes of the coding blocks, which are confined by a block size restriction parameter included in the parameter set of the bit stream if the first indication has a first value, or a second size determining unit/circuit, configured for, determining the particular sizes of the coding blocks, which are confined by a default size restriction parameter if the first indication has a second value or is not presented in the parameter set, and a decoding unit/circuit, configured for, decoding the coding blocks with the particular sizes.
The first and second size determining circuits/units may be included within one size determination unit (circuitry).

According to a seventeenth embodiment, further to the sixteenth embodiment, the decoding apparatus further comprises a first partition mode determining unit/circuit, configured for, determining a partition mode of the multiple coding tree blocks, which are confined by a partition depth restriction parameter included in the parameter set of the bit stream if the first indication has the first value, or a second partition mode determining unit/circuit, configured for, determining the partition mode of the multiple coding tree blocks, which are confined by a default partition depth restriction parameter if the first indication has the second value or us not presented in the parameter set, and a partitioning unit/circuit, configured for, partitioning the multiple coding tree blocks into the coding blocks with the particular sizes according to the partition mode. The first and second partition mode determining circuits/units may be included within one partition mode determining unit (circuitry).

According to an eighteenth embodiment, further to the seventeenth embodiment, the first indication is a flag, partition_constraints_control_present_flag.

According to a nineteenth embodiment, further to sixteenth or seventeenth embodiments, the size restriction parameters include minimum quad tree size, MinQtSize, and/or maximum binary tree size, MaxBtSize, and/or maximum ternary tree size, MaxTtsize, the partition depth restriction parameter includes maximum multiple type tree depth, MaxMttDepth.

According to a twentieth embodiment, in addition to any of seventeenth to nineteenth embodiments, a decoding apparatus is provided, wherein the default size restriction parameters include minimum quad tree size, MinQtSize, being set as 4 or being set as minimum coding block size, and/or maximum binary tree size, MaxBtSize, being set as 128 or being set as coding tree block size for inter slice, and being set as 32 for intra slice, and/or maximum ternary tree size, MaxTtSize, being set as 64 for inter slice, and being set as 32 for intra slice, and the default partition depth restriction parameter includes maximum multiple type tree depth, MaxMttDepth, being set as 3.

According to a twenty-first embodiment, a decoding apparatus is provided for decoding an encoded picture which is partitioned into multiple coding tree blocks which are further partitioned into multiple coding blocks with particular sizes, comprises a parsing unit/circuit, configured for parsing a first indication the SPS, of a bit stream containing the encoded picture, wherein the first indication allows the decoder to determine the particular sizes of the coding blocks, which are confined by block size restriction parameter included in the SPS of the bit stream if the first indication is the first value, or confined by default block size restriction parameter if the first indication is the second value, parsing a second indication from the SPS of the bit stream if the first indication is the first value, wherein, the second indication indicates that a third indication is included in a slice header of a slice including the coding blocks if the second indication has a third value, or a third indication is not included in the slice header, and the third indication indicates that a slice level size restriction parameter is included in the slice header if the third indication has a fifth value, or that a slice level size restriction parameter is not included in the slice header if the third indication has a sixth value, parsing the third indication if the second indication has the third value, a first size determining unit/circuit, configured for, determining the particular sizes of the coding blocks, which are confined by the slice level size restriction parameter included in the slice header if the third indication has the fifth value, or a second size determining unit/circuit, configured for, determining the particular sizes of the coding blocks, which are confined by the block size restriction parameter included in the SPS of the bit stream if the third indication has the sixth value or the second indication has a fourth value, or a third size determining unit/circuit, configured for, determining the particular sizes of the coding blocks, which are confined by the default size restriction parameter if the first indication has second value, a decoding unit/circuit, decoding the coding blocks with the particular sizes.

According to a twenty-second embodiment, further to the twenty-first embodiment, the third indication further indicates that a slice level partition depth restriction parameter is included in the slice header if the third indication has the fifth value, the decoding apparatus further comprising a first partition mode determining unit/circuit, configured for, determining the partition mode of the multiple coding tree blocks, which are confined by the slice level partition depth restriction parameter and the slice level size restriction parameter included in the slice header if the third indication has the fifth value, or a second partition mode determining unit/circuit, configured for, determining the partition mode of the multiple coding tree blocks, which are confined by partition depth restriction parameter and the size restriction parameter included in the SPS of the bit stream if the third indication has the sixth value or the second indication has the fourth value, or a third partition mode determining unit/circuit, configured for, determining the partition mode of the multiple coding tree blocks, which are confined by default partition depth restriction parameter and the default size restriction parameter if the first indication has the second value, and a partitioning unit/circuit, configured for, partitioning the multiple coding tree blocks into the coding blocks with the particular sizes according to the partition mode.

According to a twenty-third embodiment, a decoding apparatus is provided for decoding an encoded picture which is partitioned into multiple coding tree blocks which are further partitioned into multiple coding blocks with particular sizes, comprises a parsing unit/circuit, configured for, parsing a first indication from the SPS of a bit stream containing the encoded picture, wherein the first indication allows the decoder to determine the particular sizes of the coding blocks, which are confined by a size restriction parameter included in the SPS of the bit stream if the first indication has a first value, or confined by default size restriction parameters if the first indication has a second value, parsing a second indication from the SPS if the first indication has the first value, wherein the second indication indicates that multiple type tree partitioning constrained by a size restriction parameter is allowed if second indication has the third value, or indicates that multiple type tree partitioning is not allowed if the second indication has the fourth value, parsing a third indication from the SPS if the first indication has the first value, wherein, the third indication indicates that a fourth indication is included in a slice header of a slice including the coding block if the third indication has the fifth value, or the fourth indication is not included in the slice header, and the fourth indication indicates that slice level size restriction parameter is included in the slice header if the fourth indication has a seventh value, or that the slice level size restriction parameter is not included in the slice header if the third indication has the sixth value, parsing the fourth indication if the third indication has the fifth value, parsing a fifth indication from the slice header if the fourth indication has the seventh value, wherein the fifth indication indicates that multiple type tree partitioning constrained by the slice level size restriction parameter is allowed in the slice if the fifth indication has a ninth value or indicates that multiple type tree partitioning is not allowed in the slice if the fifth indication has a tenth value, a first size determining unit/circuit, configured for, determining the particular sizes of the coding blocks, which are confined by the slice level size restriction parameter included in the slice header if the fifth indication has the ninth value, or a second size determining unit/circuit, configured for, determining the particular sizes of the coding blocks, which are confined by the size restriction parameter included in the SPS of the bit stream if the third indication has the sixth value and the second indication has the third value or the fourth indication has an eighth value and the second indication has the third value, or a third size determining unit/circuit, configured for, determining the particular sizes of the coding blocks, which are confined by the default size restriction parameter if the first indication is second value, a decoding unit/circuit, configured for, decoding the coding blocks with the particular sizes.

According to a twenty-fourth, following the twenty-third embodiment, the fourth indication further indicates that a slice level partition depth restriction parameter is included in the slice header if the fourth indication has the seventh value, and the decoding apparatus further comprising a first partition mode determining unit/circuit, configured for, determining the partition mode of the multiple coding tree blocks, which are confined by the slice level partition depth restriction parameter and the slice level size restriction parameter included in the slice header if the fifth indication has the ninth value, or a second partition mode determining unit/circuit, configured for, determining the partition mode of the multiple coding tree blocks, which are confined by partition depth restriction parameter and the size restriction parameter included in the SPS of the bit stream if the third indication has the fourth value or the fourth indication has the eighth value or the fifth indication has the tenth value, or a third partition mode determining unit/circuit, configured for, determining the partition mode of the multiple coding tree blocks, which are confined by default partition depth restriction parameter and the default size restriction parameter if the first indication has the second value, and a partitioning unit/circuit, configured for, partitioning the multiple coding tree blocks into the coding blocks with the particular sizes according to the partition mode.

According to a twenty-fifth embodiment, a decoding apparatus is provided for decoding an encoded picture which is partitioned into multiple coding tree blocks which are further partitioned into multiple coding blocks with particular sizes, comprises a parsing unit/circuit, configured for, parsing a first indication from SPS or picture parameter set, PPS, or slice header or tile header of a bit stream containing the encoded picture, a first partition mode determining unit/circuit, configured for, determining the partition mode of the multiple coding tree blocks, which are confined by block size restriction parameter and partition depth restriction parameter included in the SPS or PPS or slice header or tile header of the bit stream if the first indication has a first value, or a second partition mode determining unit/circuit, configured for, determining the partition mode of the multiple coding tree blocks, which are confined by default block size restriction parameter and default partition depth restriction parameter if the first indication has a second value or not presented in the SPS or PPS or slice header or tile header, and a partitioning unit/circuit, configured for, partitioning the multiple coding tree blocks into the coding blocks with according to the partition mode, and a decoding unit/circuit, configured for, decoding the coding blocks.

According to a twenty-sixth embodiment, a decoding apparatus is provided for decoding an encoded picture which is partitioned into multiple coding tree blocks which are further partitioned into multiple coding blocks with particular sizes, comprises a parsing unit/circuit configured for parsing a first indication the SPS, of a bit stream containing the encoded picture, wherein the first indication allows the decoder to determine the partition mode of the coding blocks, which are confined by block size restriction parameter and partition depth restriction parameter included in the SPS of the bit stream if the first indication has a first value, or confined by default block size restriction parameter and default partition depth restriction parameter if the first indication has a second value, parsing a second indication from the SPS if the first indication has the first value, wherein, the second indication indicates that a third indication is included in a slice header of a slice including the coding blocks if the second indication has the first value, or the third indication is not included in the slice header, and the third indication indicates that a slice level size restriction parameter and a slice level partition depth restriction parameter are included in the slice header if the a third indication has a fifth value, or that a slice level size restriction parameter and a slice level partition depth restriction parameter are not included in the slice header if the third indication is a sixth value, parsing the third indication if the second indication has a third value, a first partition mode determining unit/circuit determining the partition mode of the multiple coding tree blocks, which are confined by the slice level partition depth restriction parameter and the slice level size restriction parameter included in the slice header if the third indication has the fifth value, or a second partition mode determining unit/circuit determining the partition mode of the multiple coding tree blocks, which are confined by partition depth restriction parameter and the size restriction parameter included in the SPS of the bit stream if the third indication has the sixth value or the second indication has a fourth value, or determining the partition mode of the multiple coding tree blocks, which are confined by default partition depth restriction parameter and the default size restriction parameter if the first indication has the second value, a partitioning unit/circuit configured for, partitioning the multiple coding tree blocks into the coding blocks according to the partition mode, and a decoding unit/circuit configured for, decoding the coding blocks.

According to a twenty-seventh embodiment, a decoding apparatus is provided for decoding an encoded picture which is partitioned into multiple coding tree blocks which are further partitioned into multiple coding blocks with particular sizes, comprises a parsing unit/circuit configured for parsing a first indication from the SPS of a bit stream containing the encoded picture, wherein the first indication allows the decoder to determine the partition mode, which are confined by size restriction parameters and partition depth restriction parameter included in the SPS of the bit stream if the first indication has a first value, or confined by default size restriction parameters and default partition depth restriction parameter if the first indication has a second value, parsing a second indication from the SPS if the first indication has the first value, wherein the second indication indicates that multiple type tree partitioning constrained by the size restriction parameter is allowed if the second indication has a third value, or multiple type tree partitioning is not allowed if the second indication has a fourth value, parsing a third indication from the SPS if the first indication has the first value, wherein, the third indication indicates that a fourth indication is included in a slice header of a slice including the coding block if the third indication has a fifth value, or a fourth indication is not included in the slice header, and the fourth indication indicates that slice level size restriction parameter and a slice level partition depth restriction parameter are included in the slice header if the fourth indication has a seventh value, or that slice level size restriction parameter and a slice level partition depth restriction parameter are not included in the slice header if the third indication has a sixth value, parsing the fourth indication if the third indication has the fifth value, parsing a fifth indication from the slice header if the fourth indication has an eighth value, wherein the fifth indication indicates that multiple type tree partition constrained by the slice level size restriction parameter is allowed in the slice if the fifth indication has a ninth value or multiple type tree partition is not allowed in the slice if the fifth indication has a tenth value, a first partition mode determining unit/circuit determining the partition mode of the multiple coding tree blocks, which are confined by the slice level partition depth restriction parameter and the slice level size restriction parameter included in the slice header if the fifth indication has the ninth value, or a second partition mode determining unit/ circuit determining the partition mode of the multiple coding tree blocks, which are confined by the partition depth restriction parameter and the size restriction parameter included in the SPS of the bit stream if the third indication has the sixth value or the fourth indication has the eighth value or the fifth indication has the tenth value, or a third partition mode determining unit/circuit determining the partition mode of the multiple coding tree blocks, which are confined by default partition depth restriction parameter and the default size restriction parameter if the first indication has the second value, a partitioning unit/circuit configured for, partitioning the multiple coding tree blocks into the coding blocks, and a decoding unit/circuit configured for, decoding the coding blocks.

In any of the above embodiments, the first, second partition mode determining circuits/units may be included within one partition mode determining unit (circuitry). Similarly, in any of the above embodiments, the first, second, and third size determining circuits/units may be included within one size determination unit (circuitry).

According to a twenty-eighth embodiment, an encoding apparatus is provided for encoding a picture which is partitioned into multiple coding tree blocks which are further partitioned into multiple coding blocks with particular sizes, the encoder comprising a bitstream generating unit/ circuit for inserting a first indication into a parameter set of a bit stream containing the encoded picture, the parameter set being SPS, picture parameter set, PPS, slice header, or tile header, a first size determining unit/circuit for determining the particular sizes of the coding blocks, which are confined by a block size restriction parameter and including the parameter set into the bit stream if the first indication has a first value, or a second size determining unit/circuit for determining the particular sizes of the coding blocks, which are confined by a default size restriction parameter and setting the first indication to a second value or not including the first indication into the parameter set, and an encoding unit/circuit for encoding the coding blocks with the particular sizes.

According to further embodiments, encoders and encoding methods are provided which determine the block size and/or depth restriction parameters mentioned above, partition the coding tree unit into the code blocks wherein the code blocks are confined by the block size and/or depth restriction parameters. These parameters are then inserted into the bitstream into one or more parameter sets, as described above in de decoder and decoding method embodiments.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
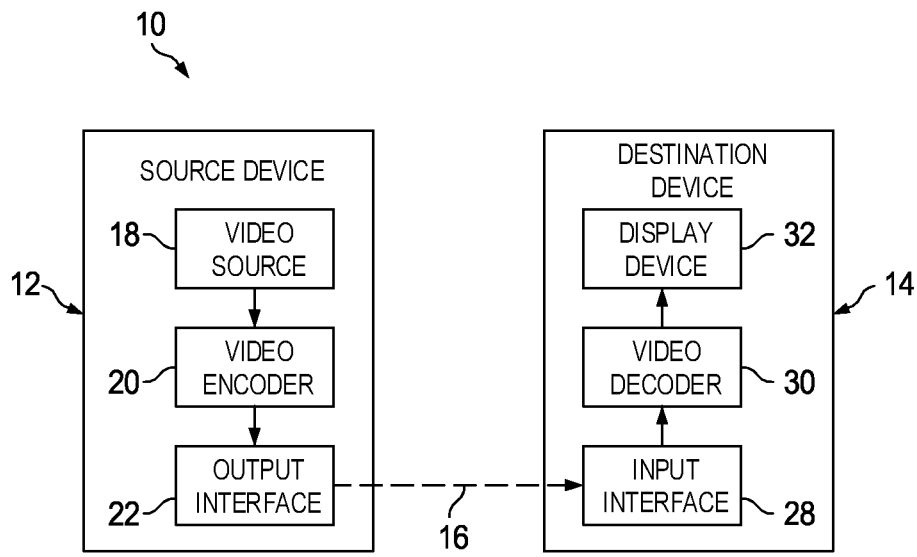
FIG. 1A is a block diagram illustrating an example coding system that may implement embodiments of the disclosure.

The following is an example of the high-level-syntax regarding to part of the partition related parameters in the SPS and slice header.

In the related document [JVET-K1001-v4], JVET AHG report, J.-R. Ohm, G. J. Sulivan, http://phenix.int-evry.fr/jvet/, discloses syntax element of MinQtSizeY (log2_min_qt_size_intra_slices_minus2 and log2_min_qt_size_inter_slices_minus2), and syntax element of MaxMttDepth (max_mtt_hierarchy_depth_inter_slices and max_mtt_hierarchy_depth_intra_slices) which are singled in SPS. The syntax element of the difference between the luma CTB size and MaxBtSizeY (log2_diff_ctu_max_bt_size) is signaled in the slice header. MinQtSizeY is defined as the minimum luma (Y) size of a leaf block resulting from quadtree splitting of a CTU (coding tree unit). The size can indicate either the width or height of the block in number of samples. It might also indicate the width and the height together in the case of square blocks. As an example if the MinQtSizeY is equal to 16, a coding block that has a size smaller than or equal to 16 cannot be partitioned into child block using the quadtree splitting method. In the other approaches, MinQtSizeY, log2_min_qt_size_intra_slices_minus2 and log2_min_qt_size_inter_slices_minus2 are used to indicate the minimum quadtree block size. Please note that the indication of the size can be an indirect indication, meaning that log2_min_qt_size_intra_slices_minus2 might be the binary logarithm (base 2) of the number of luma samples of the minimum quadtree block. MaxMttDepth is defined as the maximum hierarchy depth for coding units resulting from multi-type tree splitting of a quadtree leaf or CTU. A coding tree unit (or CTB) describes the maximum block size that is used to partition a picture frame. MaxMttDepth describes the upper limit for the number of consecutive binary or ternary splitting that can be applied to obtain a child block. As an example, assume the CTU size is 128×128 (width equal to 128 and height equal to 128), and MaxMttDepth is equal to 1. In this case the parent block (128×128 in size) can first be split into two 128×64 child blocks using binary splitting. However, the child blocks cannot apply any consecutive binary splitting (to result in either 128×32 or 64×64 child blocks) since the maximum number of allowed binary splitting is reached. It is noted that MaxMttDepth can control maximum binary splitting depth or maximum ternary splitting depth, or both at the same time. If it controls both binary and ternary splitting at the same time, 1 binary split followed by 1 ternary split can be counted as 2 hierarchical splits. In the other approaches, MaxMttDepth, max_mtt_hierarchy_depth_inter_slices and max_mtt_hierarchy_depth_intra_slices are used to indicate the maximum hierarchy depth for coding units resulting from multi-type tree splitting.

It is noted that the names of the syntax elements are used as they appear in the related document. However, it should be clear that the names can be changed, therefore what should be considered important is the logical meaning of the syntax elements instead of the name.

MaxBtSizeY is defined as the maximum luma size (width or height), in terms of number of samples, of a coding block that can be split using a binary splitting. As an example, if MaxBtSizeY is equal to 64, a coding block that is bigger in size either in width or height cannot be split using binary splitting. This means that a block that has a size 128×128 cannot be split using binary splitting, whereas a block that has a size 64×64 can be split using binary splitting.

MinBtSizeY is defined as the minimum luma size (width or height), in terms of number of samples, of a coding block that can be split using a binary splitting. As an example, if MinBtSizeY is equal to 16, a coding block that is smaller or equal in size either in width or height cannot be split using binary splitting. This means that a block that has a size 8×8 cannot be split using binary splitting, whereas a block that has a size 32×32 can be split using binary splitting.

MinCbSizeY is defined as the minimum coding block size. As an example, MinCbSizeY can be equal to 8, which means that a parent block that has a size 8×8 cannot be split using any of the splitting methods since the resulting child block is guaranteed to be not smaller than the MinCbSizeY in either width or height. According to a second example, if MinCbSizeY is equal to 8 a parent block that has a size 8×16 cannot be partitioned using e.g. quadtree splitting, since the resulting four child blocks would have a size of 4×8 (width equal to 4 and height equal to 8), and the width of the resulting child blocks would be smaller than MinCbSizeY. In the second example it was assumed that MinCbSizeY applies to both width and height of the block, although 2 different syntax elements can be used to independently limit the width and height.

MinTbSizeY is defined as the minimum transform block size, in terms of number of samples, of a coding block that can be split using a ternary splitting. As an example, if MinTbSizeY is equal to 16, a coding block that is smaller or equal in size either in width or height cannot be split using ternary splitting. This means that a block that has a size 8×8 cannot be split using ternary splitting, whereas a block that has a size 32×32 can be split using ternary splitting.

Examples specifying the SPS and slice header syntax tables are shown in the following tables.

Sequence Parameter Set RBSP (Raw Byte Sequence Payload) Syntax (Section 7.3.2.1 of [JVET-K1001-v4])

|  | Descriptor |
|---|---|
| seq_parameter_set_rbsp( ) { |  |
| sps_seq_parameter_set_id | ue(v) |
| chroma_format_idc | ue(v) |
| if( chroma_format_idc = = 3 ) |  |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| sps_cclm_enabled_flag | ue(1) |
| sps_mts_intra_enabled_flag | ue(1) |
| sps_mts_inter_enabled_flag | ue(1) |
| rbsp_trailing_bits( ) |  |
| } |  |

In these syntax tables, bold are the syntax elements included into the bitstream. The elements which are not shown in bold are conditions or placeholders for further syntax units.

Slice Header Syntax (Section 7.3.3 of [JVET-K1001-v4])

|  | Descriptor |
|---|---|
| slice_header( ) { |  |
| slice_pic_parameter_set_id | ue(v) |
| slice_address | u(v) |
| slice_type | ue(v) |
| if ( slice_type != I ) |  |
| log2_diff_ctu_max_bt_size | ue(v) |
| dep_quant_enabled_flag | u(1) |
| if( !dep_quant_enabled_flag ) |  |
| sign_data_hiding_enabled_flag | u(1) |
| byte_alignment( ) |  |
| } |  |

The semantics of the syntax elements, i.e. how the syntax elements included in the bitstream are to be interpreted, is also provided in a standard. In the following, the semantics for the above mentioned elements is provided.

Sequence Parameter Set RBSP Semantics (Section 7.4.3.1 of [JVET-K1001-v4])

log2_ctu_size_minus2 plus 2 specifies the luma coding tree block size of each CTU. The variables CtbLog2SizeY, CtbSizeY, MinCbLog2SizeY, MinCbSizeY, MinTbLog2SizeY, MaxTbLog2SizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$CtbLog2SizeY = log2\_ctu\_size\_minus2+2 \qquad (7\text{-}5)$$

$$CtbSizeY = 1 << CtbLog2SizeY \qquad (7\text{-}6)$$

$$MinCbLog2SizeY = 2 \qquad (7\text{-}7)$$

$$MinCbSizeY = 1 << MinCbLog2SizeY \qquad (7\text{-}8)$$

$$MinTbSizeY = 4 \qquad (7\text{-}9)$$

$$MaxTbSizeY = 64 \qquad (7\text{-}10)$$

$$PicWidthInCtbsY = \text{Ceil}(pic\_width\_in\_luma\_samples \div CtbSizeY) \qquad (7\text{-}11)$$

$$PicHeightInCtbsY = \text{Ceil}(pic\_height\_in\_luma\_samples \div CtbSizeY) \qquad (7\text{-}12)$$

$$PicSizeInCtbsY = PicWidthInCtbsY * PicHeightInCtbsY \qquad (7\text{-}13)$$

$$PicWidthInMinCbsY = pic\_width\_in\_luma\_samples / MinCbSizeY \qquad (7\text{-}14)$$

$$PicHeightInMinCbsY = pic\_height\_in\_luma\_samples / MinCbSizeY \qquad (7\text{-}15)$$

$$PicSizeInMinCbsY = PicWidthInMinCbsY * PicHeightInMinCbsY \qquad (7\text{-}16)$$

$$PicSizeInSamplesY = pic\_width\_in\_luma\_samples * pic\_height\_in\_luma\_samples \qquad (7\text{-}17)$$

$$PicWidthInSamplesC = pic\_width\_in\_luma\_samples / SubWidthC \qquad (7\text{-}18)$$

$$PicHeightInSamplesC = pic\_height\_in\_luma\_samples / SubHeightC \qquad (7\text{-}19)$$

. . . .

log2_min_qt_size_intra_slices_minus2 plus 2 specifies the minimum luma size of a leaf block resulting from quadtree splitting of a CTU in slices with slice_type equal to 2 (I). The value of log2_min_qt_size_intra_slices_minus2 shall be in the range of 0 to CtbLog2SizeY−2, inclusive.

$$MinQtLog2SizeIntraY = log2\_min\_qt\_size\_intra\_slices\_minus2+2 \qquad (7\text{-}22)$$

[Ed. (BB): The leaf of a quadtree can either be a coding unit or the root of a nested multi-type tree.]

log2_min_qt_size_inter_slices_minus2 plus 2 specifies the minimum luma size of a leaf block resulting from quadtree splitting of a CTU in slices with slice_type equal to 0 (B) or 1 (P). The value of log2_min_qt_size_inter_slices_minus2 shall be in the range of 0 to CtbLog2SizeY−2, inclusive.

$$MinQtLog2SizeInterY = log2\_min\_qt\_size\_inter\_slices\_minus2+2 \qquad (7\text{-}23)$$

max_mtt_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of 0 to CtbLog2SizeY−MinTbLog2SizeY, inclusive.

max_mtt_hierarchy_depth_intra_slices specifies the maximum hierarchy depth for coding units resulting from multi-type tree splitting of a quadtree leaf in slices with slice_type equal to 2 (I). The value of max_mtt_hierarchy_depth_intra_slices shall be in the range of 0 to CtbLog2SizeY−MinTbLog2SizeY, inclusive.

Slice Header Semantics (Section 7.4.4 of [JVET-K1001-v4]))

log2_diff_ctu_max_bt_size specifies the difference between the luma CTB size and the maximum luma size (width or height) of a coding block that can be split using a binary split. The value of log2_diff_ctu_max_bt_size shall be in the range of 0 to CtbLog2SizeY−MinCbLog2SizeY, inclusive.

When log2_diff_ctu_max_bt_size is not present, the value of log2_diff_ctu_max_bt_size is inferred to be equal to 2.

The variables MinQtLog2SizeY, MaxBtLog2SizeY, MinBtLog2SizeY, MaxTtLog2SizeY, MinTtLog2SizeY, MaxBtSizeY, MinBtSizeY, MaxTtSizeY, MinTtSizeY and MaxMttDepth are derived as follows:

$$\text{MinQtLog2SizeY}=(\text{slice\_type}==I)\,?\,\text{MinQtLog2SizeIntraY}:\text{MinQtLog2SizeInterY} \quad (7\text{-}25)$$

$$\text{MaxBtLog2SizeY}=\text{CtbLog2Size}-\text{log2\_diff\_ctu\_max\_bt\_size} \quad (7\text{-}26)$$

$$\text{MinBtLog2SizeY}=\text{MinCbLog2SizeY} \quad (7\text{-}27)$$

$$\text{MaxTtLog2SizeY}=(\text{slice\_type}==I)?5:6 \quad (7\text{-}28)$$

$$\text{MinTtLog2SizeY}=\text{MinCbLog2SizeY} \quad (7\text{-}29)$$

$$\text{MinQtSizeY}=1<<\text{MinQtLog2SizeY} \quad (7\text{-}30)$$

$$\text{MaxBtSizeY}=1<<\text{MaxBtLog2SizeY} \quad (7\text{-}31)$$

$$\text{MinBtSizeY}=1<<\text{MinBtLog2SizeY} \quad (7\text{-}32)$$

$$\text{MaxTtSizeY}=1<<\text{MaxTtLog2SizeY} \quad (7\text{-}33)$$

$$\text{MinTtSizeY}=1<<\text{MinTtLog2SizeY} \quad (7\text{-}34)$$

$$\text{MaxMttDepth}=(\text{slice\_type}==I)?\text{max\_mtt\_hierarchy\_depth\_intra\_slices}:\text{max\_mtt\_hierarchy\_depth\_inter\_slices} \quad (7\text{-}35)$$

[Ed. (BB): Currently the maximum TT size is fixed (32×32 luma samples and corresponding chroma samples for I-slices and 64×64 luma samples and corresponding chroma samples for P/B-slices) as well as the maximum BT size for I-slices (CtbLog2SizeY−2, e.g. 32×32 luma samples and corresponding chroma samples for a CTU size of 128×128 luma samples).]

However, there is still some space in the high syntax level in term of the partition to further improve the flexibility of the partition related parameters signaling and selections which can robust the coding performance and even saving bits consuming.

Some exemplary embodiments of the present application (or the present disclosure) provide inter prediction apparatuses and methods for encoding and decoding an image which can mitigate even eliminate the problem mentioned above.

In one embodiment, the present disclosure provides a decoding method performed by a decoder for decoding an encoded picture which is partitioned into multiple coding tree blocks which are further partitioned into multiple coding blocks with particular sizes, comprises parsing a first indication from the SPS/PPS/slice header/tile header of a bit stream containing the encoded picture, determining the partition mode of the multiple coding tree blocks, which are confined by block size restriction parameter and partition depth restriction parameter included in the SPS/PPS/slice header/tile header of the bit stream if the first indication is first value, or determining the partition mode of the multiple coding tree blocks, which are confined by default by block size restriction parameter and default partition depth restriction parameter if the first indication is second value or not presented in the SPS/PPS/slice header/tile header, and partitioning the multiple coding tree blocks into the coding blocks with according to the partition mode, and decoding the coding blocks.

In another embodiment the present disclosure provides a decoding method performed by a decoder for decoding an encoded picture which is partitioned into multiple coding tree blocks which are further partitioned into multiple coding blocks with particular sizes, comprises parsing a first indication the SPS of a bit stream containing the encoded picture, wherein the first indication allows the decoder to determine the partition mode of the coding blocks, which are confined by block size restriction parameter and partition depth restriction parameter included in the SPS of the bit stream if the first indication is the first value, or confined by default block size restriction parameter and default partition depth restriction parameter if the first indication is the second value, parsing a second indication from the SPS of the bit stream if the first indication is the first value, wherein, the second indication indicates a third indication is included in a slice header of a slice including the coding blocks if the second indication is the first value, or a third indication is not included in the slice header, and the third indication indicates that a slice level size restriction parameter and a slice level partition depth restriction parameter are included in the slice header if the a third indication is the first value, or that a slice level size restriction parameter and a slice level partition depth restriction parameter are not included in the slice header if the third indication is the second value, parsing the third indication if the second indication is the first value, determining the partition mode of the multiple coding tree blocks, which are confined by the slice level partition depth restriction parameter and the slice level size restriction parameter included in the slice header if the third indication is the first value, or determining the partition mode of the multiple coding tree blocks, which are confined by partition depth restriction parameter and the size restriction parameter included in the SPS of the bit stream if the third indication is the second value or the second indication is the second value, or determining the partition mode of the multiple coding tree blocks, which are confined by default partition depth restriction parameter and the default size restriction parameter if the first indication is second value, partitioning the multiple coding tree blocks into the coding blocks according to the partition mode, and decoding the coding blocks.

In another embodiment the present disclosure provides a decoding method performed by a decoder for decoding an encoded picture which is partitioned into multiple coding tree blocks which are further partitioned into multiple coding blocks with particular sizes, comprises parsing a first indication from the SPS of a bit stream containing the encoded picture, wherein the first indication allows the decoder to determine the partition mode, which are confined by size restriction parameters and partition depth restriction parameter included in the SPS of the bit stream if the first indication is first value, or confined by default size restriction parameters and default and partition depth restriction parameter if the first indication is second value, parsing a second indication from the SPS if the first indication is the first value, wherein the second indication indicates multiply type tree partition constrained by the by size restriction parameter is allowed if second indication is the first value, or multiply type tree partition is not allowed if the second indication is the second value, parsing a third indication from the SPS if the first indication is the first value, wherein, the third indication indicates a fourth indication is included in a slice header of a slice including the coding block if the third indication is first value, or a fourth indication is not included in the slice header, and the fourth indication indicates that slice level size restriction parameter and a slice level partition depth restriction parameter are included in the slice header if the a fourth indication is first value, or that slice level size restriction parameter and a slice level partition depth restriction parameter are not included in the slice header if the a third indication is second value, parsing the fourth indication if the third indication is the first value, parsing a fifth indication from the slice header if the fourth indication is the first value, wherein the fifth indication indicates multiply type tree partition constrained by the slice level size restriction parameter is allowed in the slice if fifth indication is the first value or multiply type tree partition is not allowed in the slice if the fifth indication is the second value, determining the partition mode of the multiple coding tree blocks, which are confined by the slice level partition depth restriction parameter and the slice level size restriction parameter included in the slice header if the firth indication is the first value, or determining the partition mode of the multiple coding tree blocks, which are confined by partition depth restriction parameter and the size restriction parameter included in the SPS of the bit stream if the third indication is the second value or the fourth indication is the second value or the fifth indication is the second value, or determining the partition mode of the multiple coding tree blocks, which are confined by default partition depth restriction parameter and the default size restriction parameter if the first indication is second value, partitioning the multiple coding tree blocks into the coding blocks, and decoding the coding blocks.

The present disclosure further provides a decoding device and an encoding device for performing the methods above.

By the disclosure provided above, namely, signaling the high level partition constraints control syntax elements present (absent) flag in parameter set, it makes one more way to define the constraints, further default values are set (previously only signaling), which provide more options (flexibility) if the high level partition constraints get their presence. Otherwise, if the high level partition constraints are not present, default values for those syntax elements will be used, therefore, no signaling for those syntax elements is required, which can save bits consuming and provide more flexibility to set the size constraints.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless noted otherwise.

FIG. 1A is a block diagram illustrating an example coding system 10 that may utilize bidirectional prediction techniques. As shown in FIG. 1A, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, BLU-RAY DISCS, digital video disks (DVD)s, compact disc (CD) read-only memories (ROMs) (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. Destination device 14 may access the encoded video data through any standard data connection, including an Internet connection. This may include a wireless channel (e.g., a WI-FI connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as Dynamic Adaptive Streaming over Hypertext Transfer Protocol (HTTP) (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1A, source device 12 includes video source 18, video encoder 20, and output interface 22. Destination device 14 includes input interface 28, video decoder 30, and display device 32. In accordance with this disclosure, video encoder 200 of source device 12 and/or the video decoder 300 of the destination device 14 may be configured to apply the techniques for bidirectional prediction. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1A is merely one example. Techniques for bidirectional prediction may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, BLU-RAY DISC, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode-ray tube (CRT), a liquid-crystal display (LCD), a plasma display, an organic light-emitting diode (OLED) display, or another type of display device.

Video encoder 200 and video decoder 300 may operate according to a video coding standard, such as the HEVC standard presently under development, and may conform to the HEVC Test Model (HM). Alternatively, video encoder 200 and video decoder 300 may operate according to other proprietary or industry standards, such as the ITU-T H.264 standard, alternatively referred to as MPEG-4, Part 10, AVC, H.265/HEVC, or extensions of such standards. The techniques of this disclosure, however, are not limited to any particular coding standard. Other examples of video coding standards include MPEG-2 and ITU-T H.263. Although not shown in FIG. 1A, in some aspects, video encoder 200 and video decoder 300 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder circuitry, such as one or more microprocessors, digital signal processors (DSPs), application-specific integrated circuits (ASICs), field-programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Figure 1B:
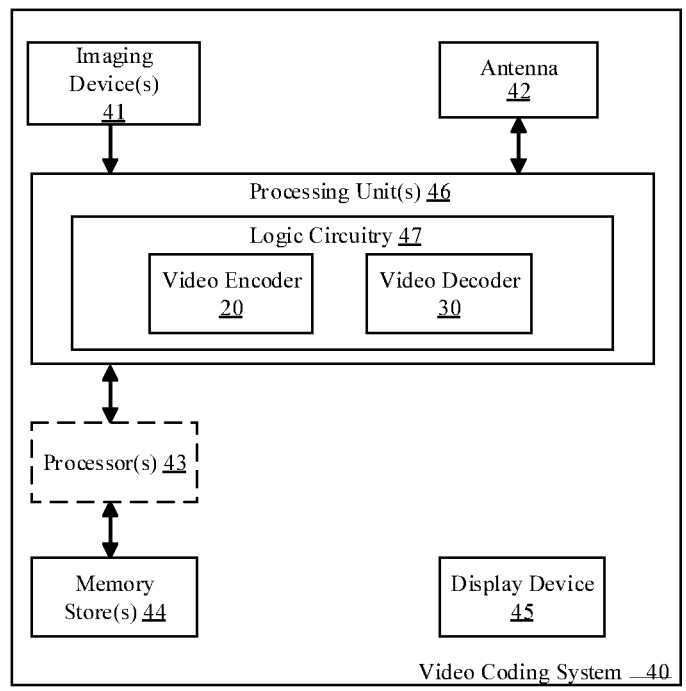
FIG. 1B is a block diagram illustrating another example coding system that may implement embodiments of the disclosure.
Figure 2:
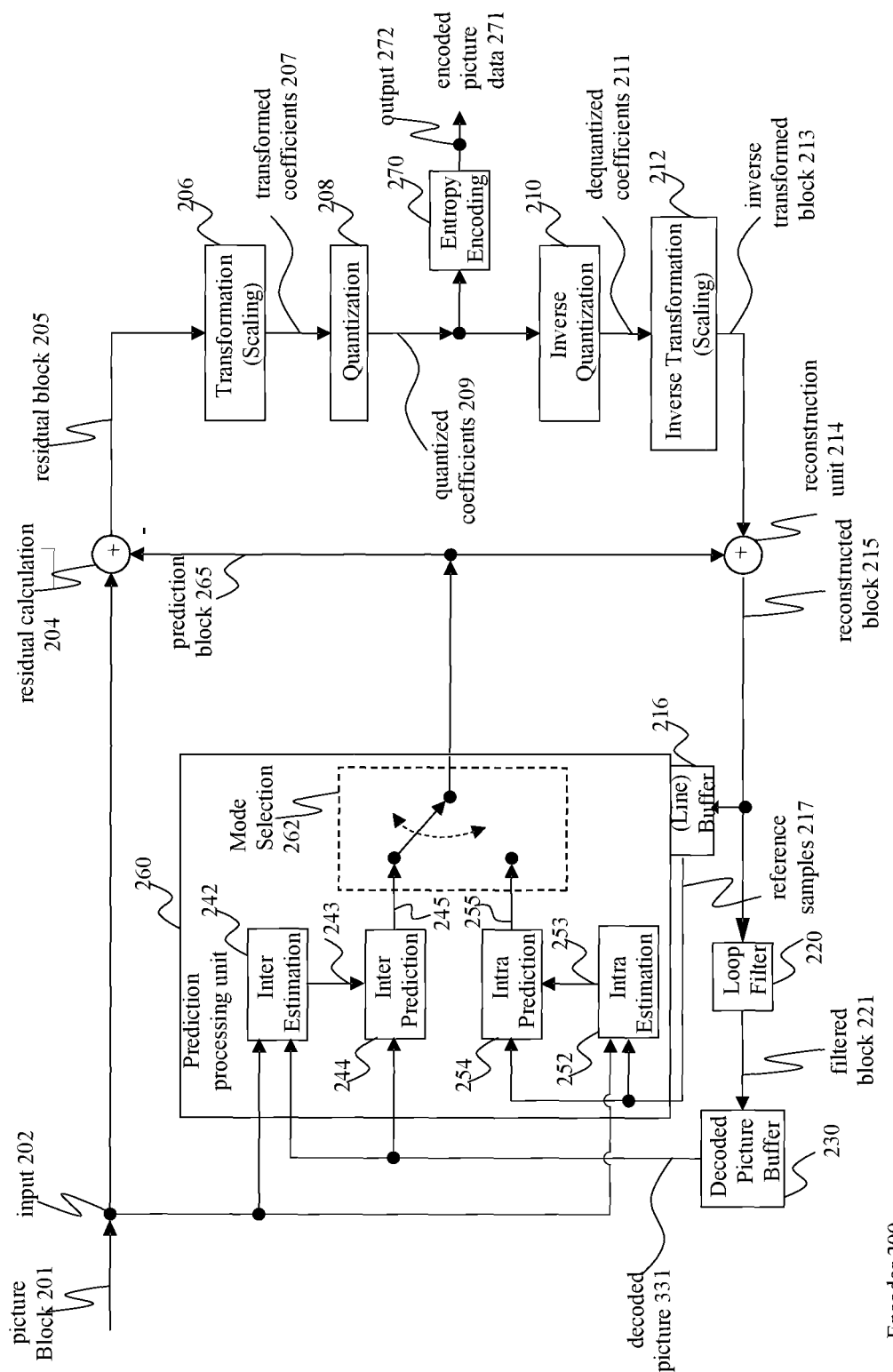
FIG. 2 is a block diagram illustrating an example video encoder that may implement embodiments of the disclosure.
Figure 3:
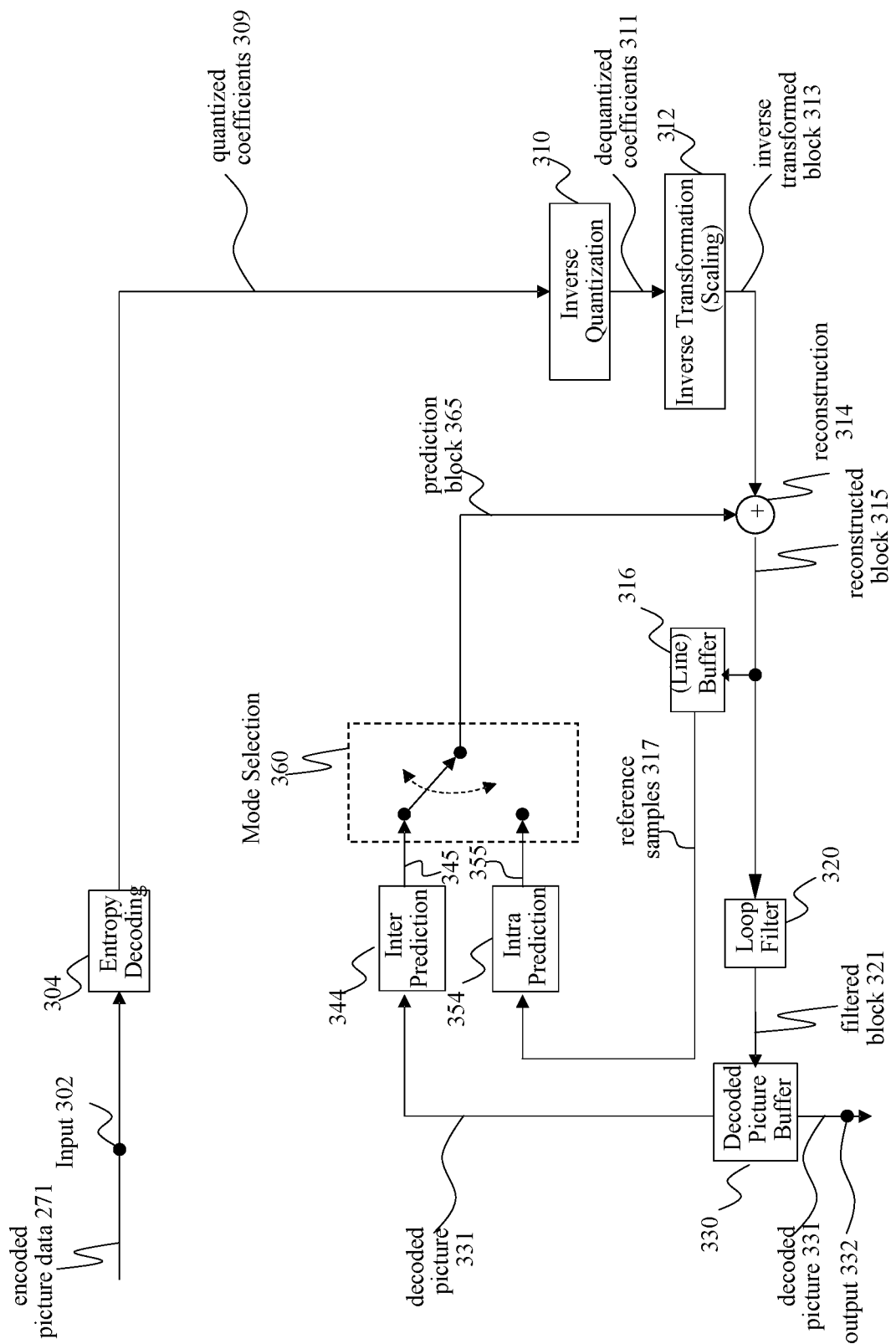
FIG. 3 is a block diagram illustrating an example of a video decoder that may implement embodiments of the disclosure.

FIG. 1B is an illustrative diagram of an example video coding system 40 including encoder 200 of FIG. 2 and/or decoder 300 of FIG. 3 according to an exemplary embodiment. The system 40 can implement techniques of this present application. e.g., the merge estimation in the inter prediction. In the illustrated implementation, video coding system 40 may include imaging device(s) 41, video encoder 20, video decoder 300 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 200 and video decoder 30, video coding system 40 may include only video encoder 200 or only video decoder 300 in various practical scenario.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 54 may be implemented via processing unit(s) 46. Processing unit(s) 46 may include ASIC logic, graphics processor(s), general purpose processor(s), or the like. Video coding system 40 also may include optional processor(s) 43, which may similarly include ASIC logic, graphics processor(s), general purpose processor(s), or the like. In some examples, logic circuitry 54 may be implemented via hardware, video coding dedicated hardware, or the like, and processor(s) 43 may implemented general purpose software, operating systems, or the like. In addition, memory store(s) 44 may be any type of memory such as volatile memory (e.g., static random-access memory (RAM) (SRAM), dynamic RAM (DRAM), etc.) or non-volatile memory (e.g., flash memory, etc.), and so forth. In a non-limiting example, memory store(s) 44 may be implemented by cache memory. In some examples, logic circuitry 54 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 200 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 200 as implemented via logic circuitry 47 to embody the various modules as discussed with respect to FIG. 2 and/or any other encoder system or subsystem described herein. The logic circuitry may be configured to perform the various operations as discussed herein.

Video decoder 300 may be implemented in a similar manner as implemented via logic circuitry 47 to embody the various modules as discussed with respect to decoder 300 of FIG. 3 and/or any other decoder system or subsystem described herein. In some examples, video decoder 300 may be implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video decoder 300 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 300 coupled to antenna 42 and configured to decode the encoded bitstream. The display device 45 configured to present video frames.

FIG. 2 is a block diagram illustrating an example of video encoder 200 that may implement the techniques of the present application. Video encoder 200 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

FIG. 2 shows a schematic/conceptual block diagram of an example video encoder 200 that is configured to implement the techniques of the present disclosure. In the example of FIG. 2, the video encoder 200 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter estimation 242, inter prediction unit 244, an intra estimation 252, an intra prediction unit 254 and a mode selection unit 262. Inter prediction unit 244 may further include a motion compensation unit (not shown). A video encoder 200 as shown in FIG. 2 may also be referred to as hybrid video encoder or a video encoder according to a hybrid video codec.

For example, the residual calculation unit 204, the transform processing unit 206, the quantization unit 208, the prediction processing unit 260 and the entropy encoding unit 270 form a forward signal path of the encoder 200, whereas, for example, the inverse quantization unit 210, the inverse transform processing unit 212, the reconstruction unit 214, the buffer 216, the loop filter 220, the DPB 230, prediction processing unit 260 form a backward signal path of the encoder, wherein the backward signal path of the encoder corresponds to the signal path of the decoder (see decoder 300 in FIG. 3).

The encoder 200 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

Partitioning

Embodiments of the encoder 200 may comprise a partitioning unit (not depicted in FIG. 2) configured to partition the picture 201 into a plurality of blocks, e.g. blocks like block 203, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

In HEVC and other video coding specifications, to generate an encoded representation of a picture, a set of coding tree units (CTUs) may be generated. Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

In HEVC, a CTU is split into CUs by using a quad-tree structure denoted as coding tree to adapt to various local characteristics. The decision whether to code a picture area using inter-picture (temporal) or intra-picture (spatial) prediction is made at the CU level. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. A coding block is an N×N block of samples. In some examples, a CU may be the same size of a CTU. Each CU is coded with one coding mode, which could be, e.g., an intra coding mode or an inter coding mode. Other coding modes are also possible. Encoder 200 receives video data. Encoder 200 may encode each CTU in a slice of a picture of the video data. As part of encoding a CTU, prediction processing unit 260 or another processing unit (Including but not limited to unit of encoder 200 shown in FIG. 2) of encoder 200 may perform partitioning to divide the CTBs of the CTU into progressively-smaller blocks 203. The smaller blocks may be coding blocks of CUs.

Syntax data within a bitstream may also define a size for the CTU. A slice includes a number of consecutive CTUs in coding order. A video frame or image or picture may be partitioned into one or more slices. As mentioned above, each tree block may be split into coding units (CUs) according to a quad-tree. In general, a quad-tree data structure includes one node per CU, with a root node corresponding to the treeblock (e.g., CTU). If a CU is split into four sub-CUs, the node corresponding to the CU includes four child nodes, each of which corresponds to one of the sub-CUs. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. For each respective non-root node of the plurality of nodes, the respective non-root node corresponds to a sub-CU of a CU corresponding to a parent node in the tree structure of the respective non-root node. Each respective non-leaf node has one or more child nodes in the tree structure.

Each node of the quad-tree data structure may provide syntax data for the corresponding CU. For example, a node in the quad-tree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. If a block of CU is split further, it may be generally referred to as a non-leaf-CU. As shown in FIG. 2, each level of partitioning is a quad-tree split into four sub-CUs. The black CU is an example of a leaf-node (i.e., a block that is not further split).

A CU has a similar purpose as a macroblock of the H.264 standard, except that a CU does not have a size distinction. For example, a tree block may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a tree block may be split, referred to as a maximum CU depth, and may also define a minimum size of the coding nodes. Accordingly, a bitstream may also define a smallest coding unit (SCU). The term "block" is used to refer to any of a CU, PU, or TU, in the context of HEVC, or similar data structures in the context of other standards (e.g., macroblocks and sub-blocks thereof in H.264/AVC).

In HEVC, each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU. One of key feature of the HEVC structure is that it has the multiple partition conceptions including CU, PU, and TU. PUs may be partitioned to be non-square in shape. Syntax data associated with a CU may also describe, for example, partitioning of the CU into one or more PUs. A TU can be square or non-square (e.g., rectangular) in shape, syntax data associated with a CU may describe, for example, partitioning of the CU into one or more TUs according to a quad-tree. Partitioning modes may differ between whether the CU is skip or direct mode encoded, intra-prediction mode encoded, or inter-prediction mode encoded.

While VVC removes the separation of the PU and TU concepts, and supports more flexibility for CU partition shapes. A size of the CU corresponds to a size of the coding node and may be square or non-square (e.g., rectangular) in shape. The size of the CU may range from 4×4 pixels (or 8×8 pixels) up to the size of the tree block with a maximum of 128×128 pixels or greater (for example, 256×256 pixels).

After encoder 200 generates a predictive block (e.g., luma, Cb, and Cr predictive block) for CU, encoder 200 may generate a residual block for the CU. For instance, encoder 100 may generate a luma residual block for the CU. Each sample in the CU's luma residual block indicates a difference between a luma sample in the CU's predictive luma block and a corresponding sample in the CU's original luma coding block. In addition, encoder 200 may generate a Cb residual block for the CU. Each sample in the Cb residual block of a CU may indicate a difference between a Cb sample in the CU's predictive Cb block and a corresponding sample in the CU's original Cb coding block. Encoder 100 may also generate a Cr residual block for the CU. Each sample in the CU's Cr residual block may indicate a difference between a Cr sample in the CU's predictive Cr block and a corresponding sample in the CU's original Cr coding block.

In some examples, encoder 100 skips application of the transforms to the transform block. In such examples, encoder 200 may treat residual sample values in the same way as transform coefficients. Thus, in examples where encoder 100 skips application of the transforms, the following discussion of transform coefficients and coefficient blocks may be applicable to transform blocks of residual samples.

After generating a coefficient block (e.g., a luma coefficient block, a Cb coefficient block or a Cr coefficient block), encoder 200 may quantize the coefficient block to possibly reduce the amount of data used to represent the coefficient block, potentially providing further compression. Quantization generally refers to a process in which a range of values is compressed to a single value. After encoder 200 quantizes a coefficient block, encoder 200 may entropy encode syntax elements indicating the quantized transform coefficients. For example, encoder 200 may perform context-adaptive binary arithmetic coding (CABAC) or other entropy coding techniques on the syntax elements indicating the quantized transform coefficients.

Encoder 200 may output a bitstream of encoded picture data 271 that includes a sequence of bits that forms a representation of coded pictures and associated data. Thus, the bitstream comprises an encoded representation of video data.

In J. An et al., "Block partitioning structure for next generation video coding", International Telecommunication Union, COM16-C966, September 2015 (hereinafter, "VCEG proposal COM16-C966"), quad-tree-binary-tree (QTBT) partitioning techniques were proposed for future video coding standard beyond HEVC. Simulations have shown that the proposed QTBT structure is more efficient than the quad-tree structure in used HEVC. In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Figure 10:
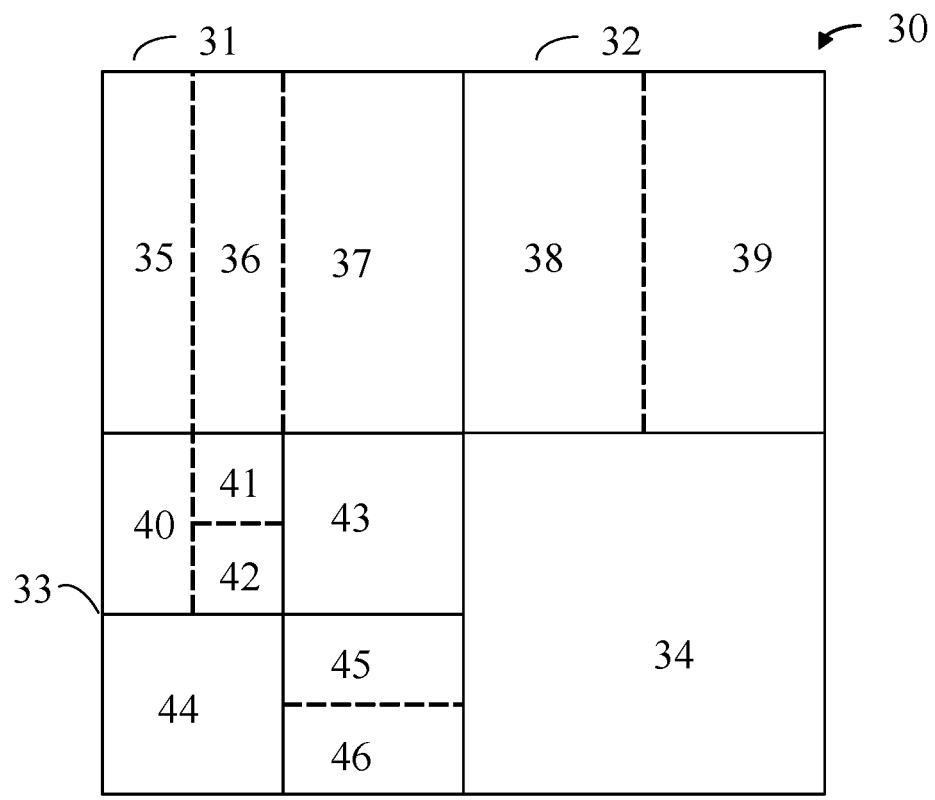
FIG. 10 is a schematic drawing illustrating an example of block partitioning using a quad-tree-binary-tree (QTBT) structure.

In the QTBT, a CU can have either a square or rectangular shape. As shown in FIG. 10, a coding tree unit (CTU) is first partitioned by a quadtree structure. The quadtree leaf nodes can be further partitioned by a binary tree structure. There are two splitting types, symmetric horizontal splitting and symmetric vertical splitting, in the binary tree splitting. In each case, a node is split by dividing the node down the middle, either horizontally or vertically. The binary tree leaf nodes are called coding units (CUs), and that segmentation is used for prediction and transform processing without any further partitioning. This means that the CU, PU and TU have the same block size in the QTBT coding block structure. A CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in HEVC.

MinQTSize: the minimum allowed quadtree leaf node size.

MaxBTSize: the maximum allowed binary tree root node size.

MaxBTDepth: the maximum allowed binary tree depth.

MinBTSize: the minimum allowed binary tree leaf node size.

In one example of the QTBT partitioning structure, the CTU size is set as 128×128 luma samples (also referred to as Y samples) with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). When the quadtree node has size equal to MinQTSize, no further quadtree is considered. If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples. The leaf nodes of the binary-tree (CUs) may be further processed (e.g., by performing a prediction process and a transform process) without any further partitioning.

Figure 11:
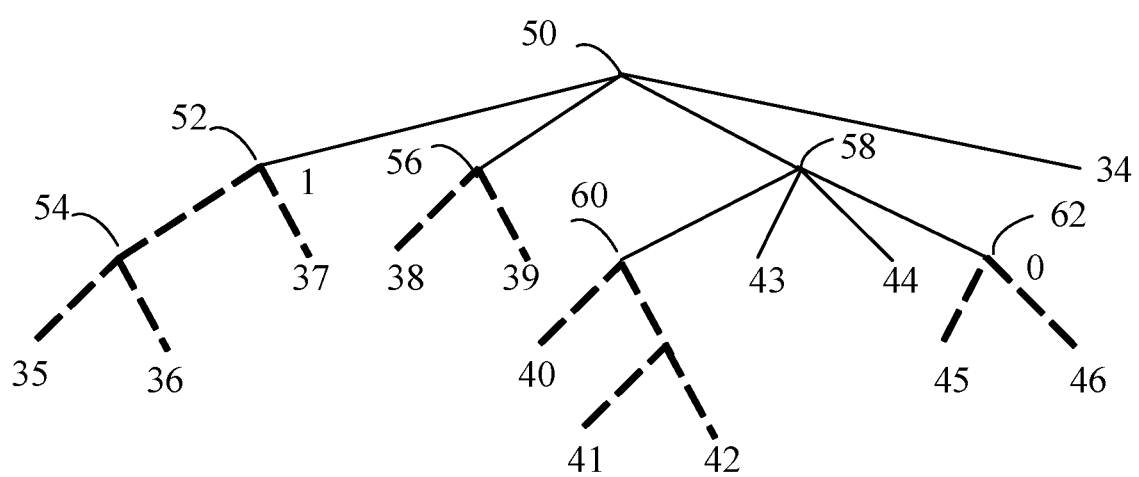
FIG. 11 is a schematic drawing illustrating an example of tree structure corresponding to the block partitioning using the QTBT structure of FIG. 10.

FIG. 10 illustrates an example of a block 30 (e.g., a CTB) partitioned using QTBT partitioning techniques. As shown in FIG. 10, using QTBT partition techniques, each of the blocks is split symmetrically through the center of each block. FIG. 11 illustrates the tree structure corresponding to the block partitioning of FIG. 11. The solid lines in FIG. 11 indicate quad-tree splitting and dotted lines indicate binary-tree splitting. In one example, in each splitting (i.e., non-leaf) node of the binary-tree, a syntax element (e.g., a flag) is signaled to indicate the type of splitting performed (e.g., horizontal or vertical), where 0 indicates horizontal splitting and 1 indicates vertical splitting. For the quad-tree splitting, there is no need to indicate the splitting type, as quad-tree splitting always splits a block horizontally and vertically into 4 sub-blocks with an equal size.

Figure 4:
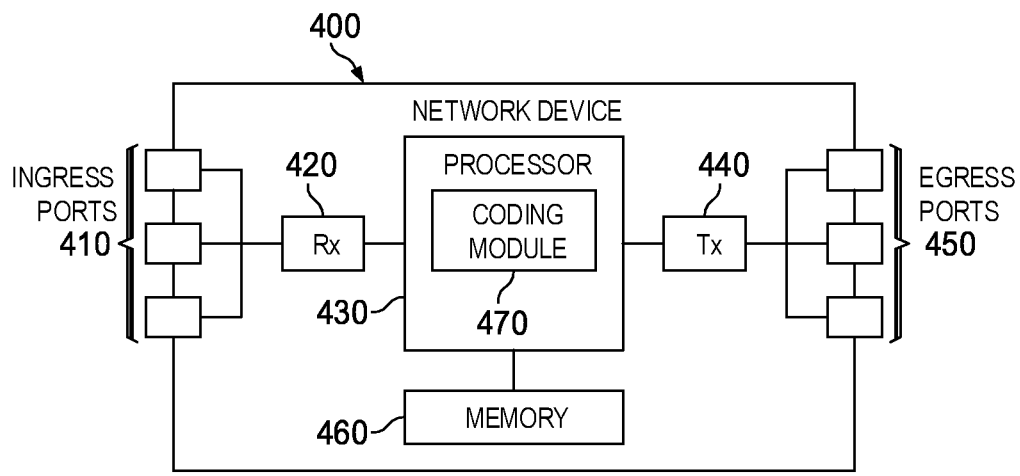
FIG. 4 is a block diagram of an exemplary network device.

As shown in FIG. 11, at node 50, block 30 is split into the four blocks 31, 32, 33, and 34, shown in FIG. 10, using QT partitioning. Block 34 is not further split, and is therefore a leaf node. At node 52, block 31 is further split into two blocks using BT partitioning. As shown in FIG. 4, node 52 is marked with a 1, indicating vertical splitting. As such, the splitting at node 52 results in block 37 and the block including both blocks 35 and 36. Blocks 35 and 36 are created by a further vertical splitting at node 54. At node 56, block 32 is further split into two blocks 38 and 39 using BT partitioning.

At node 58, block 33 is split into 4 equal size blocks using QT partitioning. Blocks 43 and 44 are created from this QT partitioning and are not further split. At node 60, the upper left block is first split using vertical binary-tree splitting resulting in block 40 and a right vertical block. The right vertical block is then split using horizontal binary-tree splitting into blocks 41 and 42. The lower right block created from the quad-tree splitting at node 58, is split at node 62 using horizontal binary-tree splitting into blocks 45 and 46. As shown in FIG. 11, node 62 is marked with a 0, indicating vertical splitting.

In addition, the QTBT scheme supports the ability for the luma and chroma to have a separate QTBT structure. Currently, for P and B slices, the luma and chroma CTBs in one CTU may share the same QTBT structure. However, for I slices, the luma CTB is partitioned into CUs by a QTBT structure, and the chroma CTBs may be partitioned into chroma CUs by another QTBT structure. This means that a CU in an I slice consists of a coding block of the luma component or coding blocks of two chroma components, and a CU in a P or B slice consists of coding blocks of all three colour components.

The encoder 200 applies a rate-distortion optimization (RDO) process for the QTBT structure to determine the block partitioning.

In addition, a block partitioning structure named multi-type-tree (MTT) is proposed in U.S. Patent Application Publication No. 20170208336 to replace QT, BT, and/or QTBT based CU structures. The MTT partitioning structure is still a recursive tree structure. In MTT, multiple different partition structures (e.g., three or more) are used. For example, according to the MTT techniques, three or more different partition structures may be used for each respective non-leaf node of a tree structure, at each depth of the tree structure. The depth of a node in a tree structure may refer to the length of the path (e.g., the number of splits) from the node to the root of the tree structure. A partition structure may generally refer to how many different blocks a block may be divided into. A Partition structure may be a quad-tree partitioning structure may divide a block into four blocks, a binary-tree partitioning structure may divide a block into two blocks, or a triple-tree partitioning structure may divide a block into three blocks, furthermore, triple-tree partitioning structure may be without dividing the block through the center. A partition structure may have multiple different partition types. A partition type may additionally define how a block is divided, including symmetric or asymmetric partitioning, uniform or non-uniform partitioning, and/or horizontal or vertical partitioning.

In MTT, at each depth of the tree structure, encoder 200 may be configured to further split sub-trees using a particular partition type from among one of three more partitioning structures. For example, encoder 100 may be configured to determine a particular partition type from QT, BT, triple-tree (TT) and other partitioning structures. In one example, the QT partitioning structure may include square quad-tree or rectangular quad-tree partitioning types. Encoder 200 may partition a square block using square quad-tree partitioning by dividing the block, down the center both horizontally and vertically, into four equal-sized square blocks. Likewise, encoder 200 may partition a rectangular (e.g., non-square) block using rectangular quad-tree partition by dividing the rectangular block, down the center both horizontally and vertically, into four equal-sized rectangular blocs.

The BT partitioning structure may include at least one of horizontal symmetric binary-tree, vertical symmetric binary-tree, horizontal non-symmetric binary-tree, or vertical non-symmetric binary-tree partition types. For the horizontal symmetric binary-tree partition type, encoder 200 may be configured to split a block, down the center of the block horizontally, into two symmetric blocks of the same size. For the vertical symmetric binary-tree partition type, encoder 200 may be configured to split a block, down the center of the block vertically, into two symmetric blocks of the same size. For the horizontal non-symmetric binary-tree partition type, encoder 100 may be configured to split a block, horizontally, into two blocks of differing size. For example, one block may be ¼ the size of the parent block and the other block may be ¾ the size of the parent blocks, similar to the PART_2N×nU or PART_2N×nD partition type. For the vertical non-symmetric binary-tree partition type, encoder 100 may be configured to split a block, vertically, into two blocks of differing size. For example, one block may be ¼ the size of the parent block and the other block may be ¾ the size of the parent blocks, similar to the PART_nL×2N or PART_nR×2N partition type. In other examples, an asymmetric binary-tree partition type may divide a parent block into different size fractions. For example, one sub-block may be ⅜ of the parent block and the other sub-block may be ⅝ of the parent block. Of course, such a partition type may be either vertical or horizontal.

The TT partition structure differs from that of the QT or BT structures, in that the TT partition structure does not split a block down the center. The center region of the block remains together in the same sub-block. Different from QT, which produces four blocks, or binary tree, which produces two blocks, splitting according to a TT partition structure produces three blocks. Example partition types according to the TT partition structure include symmetric partition types (both horizontal and vertical), as well as asymmetric partition types (both horizontal and vertical). Furthermore, the symmetric partition types according to the TT partition structure may be uneven/non-uniform or even/uniform. The asymmetric partition types according to the TT partition structure are uneven/non-uniform. In one example, a TT partition structure may include at least one of the following partition types: horizontal even/uniform symmetric triple-tree, vertical even/uniform symmetric triple-tree, horizontal uneven/non-uniform symmetric triple-tree, vertical uneven/non-uniform symmetric triple-tree, horizontal uneven/non-uniform asymmetric triple-tree, or vertical uneven/non-uniform asymmetric triple-tree partition types.

In general, an uneven/non-uniform symmetric triple-tree partition type is a partition type that is symmetric about a center line of the block, but where at least one of the resultant three blocks is not the same size as the other two.

One preferred example is where the side blocks are ¼ the size of the block, and the center block is ½ the size of the block. An even/uniform symmetric triple-tree partition type is a partition type that is symmetric about a center line of the block, and the resultant blocks are all the same size. Such a partition is possible if the block height or width, depending on a vertical or horizontal split, is a multiple of 3. An uneven/non-uniform asymmetric triple-tree partition type is a partition type that is not symmetric about a center line of the block, and where at least one of the resultant blocks is not the same size as the other two.

Figure 12:
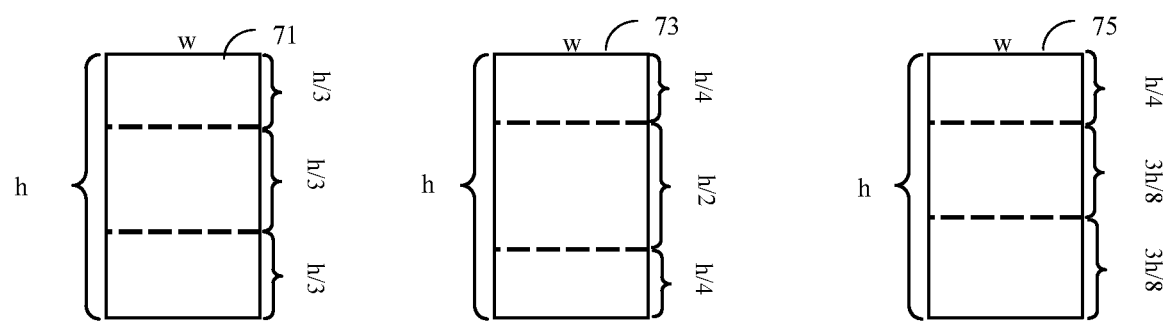
FIG. 12 is a schematic drawing illustrating an example of horizontal triple-tree partition types.
Figure 13:
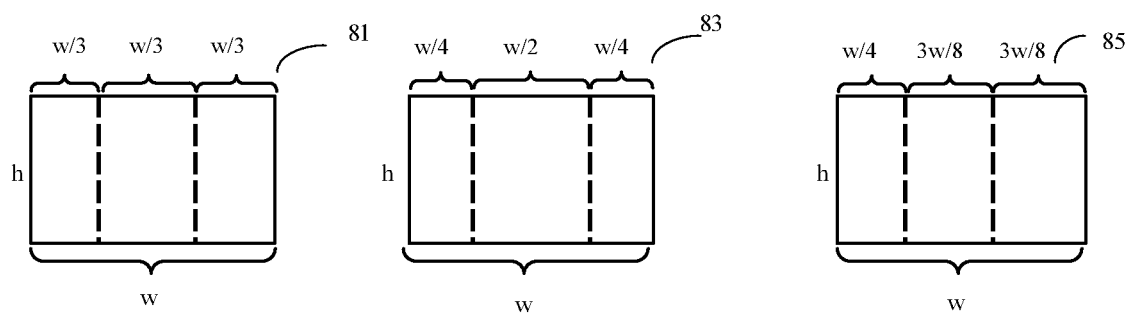
FIG. 13 is a schematic drawing illustrating an example of vertical triple-tree partition types.

FIG. 12 is a conceptual diagram illustrating example horizontal triple-tree partition types. FIG. 13 is a conceptual diagram illustrating example vertical triple-tree partition types. In both FIG. 12 and FIG. 13, h represents the height of the block in luma or chroma samples and w represents the width of the block in luma or chroma samples. Note that the respective center line of a block does not represent the boundary of the block (i.e., the triple-tree partitions do not spit a block through the center line). Rather, the center line\ are used to depict whether or not a particular partition type is symmetric or asymmetric relative to the center line of the original block. The center line is also along the direction of the split.

As shown in FIG. 12, block 71 is partitioned with a horizontal even/uniform symmetric partition type. The horizontal even/uniform symmetric partition type produces symmetrical top and bottom halves relative to the center line of block 71. The horizontal even/uniform symmetric partition type produces three sub-blocks of equal size, each with a height of h/3 and a width of w. The horizontal even/uniform symmetric partition type is possible when the height of block 71 is evenly divisible by 3.

Block 73 is partitioned with a horizontal uneven/non-uniform symmetric partition type. The horizontal uneven/non-uniform symmetric partition type produces symmetrical top and bottom halves relative to the center line of block 73. The horizontal uneven/non-uniform symmetric partition type produces two blocks of equal size (e.g., the top and bottom blocks with a height of h/4), and a center block of a different size (e.g., a center block with a height of h/2). In one example, according to the horizontal uneven/non-uniform symmetric partition type, the area of the center block is equal to the combined areas of the top and bottom blocks. In some examples, the horizontal uneven/non-uniform symmetric partition type may be preferred for blocks having a height that is a power of 2 (e.g., 2, 4, 8, 16, 32, etc.).

Figure 7:
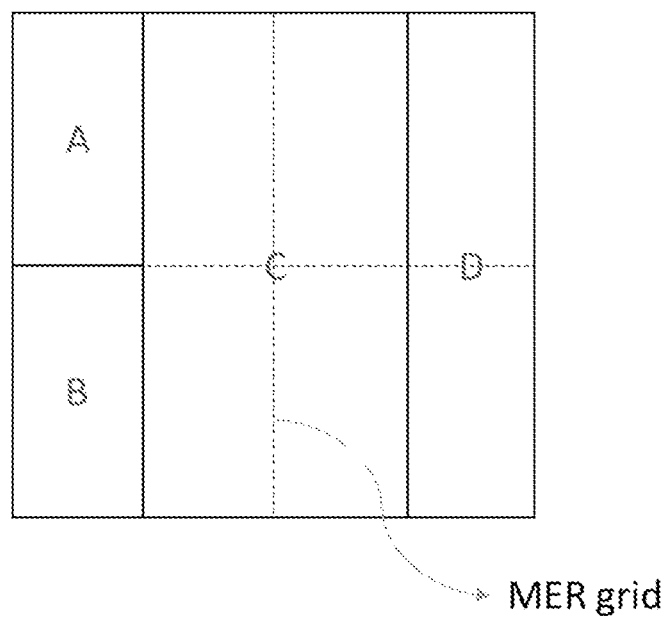
FIG. 7 is a schematic drawing illustrating a first example of partitioning resulted based on the partition modes allowed in VVC.

Block 75 is partitioned with a horizontal uneven/non-uniform asymmetric partition type. The horizontal uneven/non-uniform asymmetric partition type does not produce a symmetrical top and bottom half relative to the center line of block 75 (i.e., the top and bottom halves are asymmetric). In the example of FIG. 7, the horizontal uneven/non-uniform asymmetric partition type produces a top block with height of h/4, a center block with height of 3 h/8, and a bottom block with a height of 3 h/8. Of course, other asymmetric arrangements may be used, and the MER grid is shown to illustrating that the blocks within the MER area can be processed parallel.

As shown in FIG. 13, block 81 is partitioned with a vertical even/uniform symmetric partition type. The vertical even/uniform symmetric partition type produces symmetrical left and right halves relative to the center line of block 81. The vertical even/uniform symmetric partition type produces three sub-blocks of equal size, each with a width of w/3 and a height of h. The vertical even/uniform symmetric partition type is possible when the width of block 81 is evenly divisible by 3.

Block 83 is partitioned with a vertical uneven/non-uniform symmetric partition type. The vertical uneven/non-uniform symmetric partition type produces symmetrical left and right halves relative to the center line of block 83. The vertical uneven/non-uniform symmetric partition type produces symmetrical left and right halves relative to the center line of 83. The vertical uneven/non-uniform symmetric partition type produces two blocks of equal size (e.g., the left and right blocks with a width of w/4), and a center block of a different size (e.g., a center block with a width of w/2). In one example, according to the vertical uneven/non-uniform symmetric partition type, the area of the center block is equal to the combined areas of the left and right blocks. In some examples, the vertical uneven/non-uniform symmetric partition type may be preferred for blocks having a width that is a power of 2 (e.g., 2, 4, 8, 16, 32, etc.).

Figure 8:
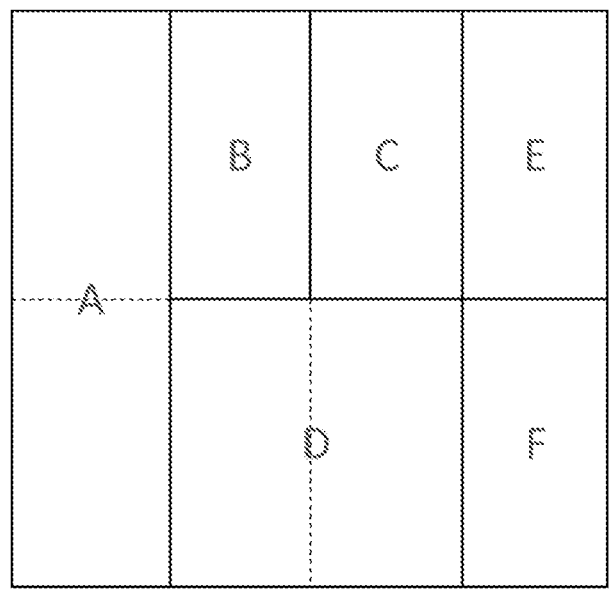
FIG. 8 is a schematic drawing illustrating a second example of partitioning resulted based on the partition modes allowed in VVC.
Figure 9:
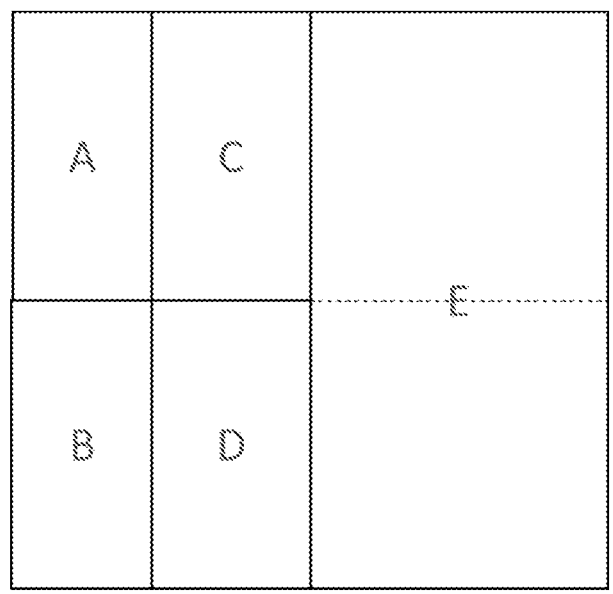
FIG. 9 is a schematic drawing illustrating a third example of partitioning resulted based on the partition modes allowed in VVC.

Block 85 is partitioned with a vertical uneven/non-uniform asymmetric partition type. The vertical uneven/non-uniform asymmetric partition type does not produce a symmetrical left and right half relative to the center line of block 85 (i.e., the left and right halves are asymmetric). In the example of FIG. 8, the vertical uneven/non-uniform asymmetric partition type produces a left block with width of w/4, a center block with width of 3w/8, and a bottom block with a width of 3w/8. Of course, other asymmetric arrangements may be used.

In examples where a block (e.g., at a sub-tree node) is split to a non-symmetric triple-tree partition type, encoder 200 and/or decoder 300 may apply a restriction such that two of the three partitions have the same size. Such a restriction may correspond to a limitation to which encoder 200 must comply when encoding video data. Furthermore, in some examples, encoder 200 and decoder 300 may apply a restriction whereby the sum of the area of two partitions is equal to the area of the remaining partition when splitting according to a non-symmetric triple-tree partition type.

In some examples, encoder 200 may be configured to select from among all the of the aforementioned partition types for each of the QT, BT, and TT partition structures. In other examples, encoder 200 may be configured to only determine a partition type from among a subset of the aforementioned partition types. For example, a subset of the above-discussed partition types (or other partition types) may be used for certain block sizes or for certain depths of a quadtree structure. The subset of supported partition types may be signaled in the bitstream for use by decoder 200 or may be predefined such that encoder 200 and decoder 300 may determine the subsets without any signaling.

In other examples, the number of supported partitioning types may be fixed for all depths in all CTUs. That is, encoder 200 and decoder 300 may be preconfigured to use the same number of partitioning types for any depth of a CTU. In other examples, the number of supported partitioning types may vary and may be dependent on depth, slice type, or other previously coded information. In one example, at depth 0 or depth 1 of the tree structure, only the QT partition structure is used. At depths greater than 1, each of the QT, BT, and TT partition structures may be used.

In some examples, encoder 200 and/or decoder 300 may apply preconfigured constraints on supported partitioning types in order to avoid duplicated partitioning for a certain region of a video picture or region of a CTU. In one example, when a block is split with non-symmetric partition type, encoder 200 and/or decoder 300 may be configured to not further split the largest sub-block that is split from the current block. For example, when a square block is split according to a non-symmetric partition type (similar to the PART_2N×nU partition type), the largest sub-block among all sub-blocks (similar to the largest sub-block of PART_2N×nU partition type) is the noted leaf node and cannot be further split. However, the smaller sub-block (similar to the smaller sub-block of PART_2N×nU partition type) can be further split.

As another example where constraints on supported partitioning types may be applied to avoid duplicated partitioning for a certain region, when a block is split with non-symmetric partition type, the largest sub-block that is split from the current block cannot be further split in the same direction. For example, when a square block is split non-symmetric partition type (similar to the PART_2N×nU partition type), encoder 200 and/or 3ecoder 200 may be configured to not split the large sub-block among all sub-blocks (similar to the largest sub-block of PART_2N×nU partition type) in the horizontal direction.

As another example where constraints on supported partitioning types may be applied to avoid difficulty in further splitting, encoder 200 and/or decoder 300 may be configured to not split a block, either horizontally or vertically, when the width/height of a block is not a power of 2 (e.g., when the width height is not 2, 4, 8, 16, etc.).

The above examples describe how encoder 200 may be configured to perform MTT partitioning. Decoder 300 may also then apply the same MTT partitioning as was performed by encoder 200. In some examples, how a picture of video data was partitioned by encoder 200 may be determined by applying the same set of predefined rules at decoder 300. However, in many situations, encoder 200 may determine a particular partition structure and partition type to use based on rate-distortion criteria for the particular picture of video data being coded. As such, in order for decoder 300 to determine the partitioning for a particular picture, encoder 200 may signal syntax elements in the encoded bitstream that indicate how the picture, and CTUs of the picture, are to be partitioned. Decoder 200 may parse such syntax elements and partition the picture and CTUs accordingly. In order to balance the computational complexity as decoding/encoding a picture, the partition of the picture should be confined by certain constraints, for example, the minimum luma size of a leaf block resulting from quadtree splitting of a CTU, the maximum hierarchy depth for coding units resulting from multi-type tree splitting of a quadtree leaf, et. al. In order to balance the complexity and coding efficiency, the following disclosures are provided.

Disclosure 1

Additional high level partition constraints control syntax elements present (absent) flag could be signaled in SPS or other parameter set or Slice header or Tiles header. The flag can take one of two different values, a first value and a second value. For example, the first value may be coded as zero (1) and the second value as (0) or vice versa.

For instance, if the flag is equal to 1, partition constraints related high level syntax elements (e.g. MinQtSizeY, MaxMttDepth, and/or MaxBtSizeY) are signaled as it in the bitstream. Otherwise (e.g. if the flag is equal to 0) default values of partition constraints related to high level syntax elements will be used to confine the partition information derivation of a coding block.

Further, MinQtSizeY is set as 4 or is set as MinCbSize for both intra and inter slices, to make sure the QT split can reach the minimal allowed coding block. MaxMttDepth is set as 3 both for intra and inter slice to balance the complexity and coding efficiency. MaxBtSizeY is set as 128 or CtbLog2SizeY for inter slices, and set as 32 (respecting to the CTU size 128) for intra slices to further balance the complexity and coding efficiency. If MaxTtSizeY elements are not signaled, the default value of MaxTtSizeY is set as 64 for inter slices, and set as 32 for intra slices to balance the complexity and coding efficiency. All default values are not limited to the values mentioned above. It is noted that these default settings are merely exemplary and other default settings may be agreed between or preconfigured for the encoder and the decoder.

Technique advantage: Signaling of the high level partition constraints control syntax elements present (absent) flag make one more way to define the constraints, further default values are set (apart from signaling, previously only signaling was possible), which provides more options (flexibility) if the high level partition constraints get their presence. Otherwise, if the high level partition constraints are not present in the bitstream, default values for those syntax elements will be used, therefore, no signaling for those syntax elements is required, which can save bits consuming and provide more flexibility to set the size constraints. Both encoder (or encoding method) and decoder (or decoding method) do the same (corresponding) operations, i.e. both the encoder and the decoder side make use of the same rules, default values, and syntax/semantics.

The corresponding syntax and semantics modification based on the other approaches mentioned above are shown below. In the following exemplary syntax, the added portions are emphasized by underlining. In particular, the syntax element partition_constraints_control_present_flag, which corresponds to the above-mentioned high level partition constraint control syntax elements present (absent) flag, is inserted into the bitstream. Correspondingly, a condition is inserted into the syntax definition, which evaluates whether the value of partition_constraints_control_present_flag (which may correspond to the first indication) is 1 or 0 (which may correspond to the first and the second value of the first indication, respectively). If the value is 1, then the constraint parameters are included as syntax elements log2_min_qt_size_intra_slices_minus2, log2_min_qt_size_inter_slices_minus2, max_mtt_hierarchy_depth_inter_slices, and max_mtt_hierarchy_depth_intra_slices into the bitstream, in particular into a parameter set. Otherwise, these parameters are not included as syntax parameters into the bitstream. Rather, they may be specified by means of a preset default values. In this example, the flag and the parameters are included in a parameter set referred to as seq_parameter_set_rbsp( ) (corresponding to the above-mentioned SPS), which may be common for one or more image frames. Moreover, the syntax of the slice header is modified.

Modified Sequence Parameter Set RBSP Syntax
(Based on Section 7.3.2.1 of [JVET-K1001-v4])

| | Descriptor |
|---|---|
| seq_parameter_set_rbsp( ) { | |
| sps_seq_parameter_set_id | ue(v) |
| chroma_format_idc | ue(v) |
| if( chroma_format_idc = = 3 ) | |
| separate_colour_plane_flag | u(1) |

-continued

| | Descriptor |
|---|---|
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| partition_constraints_control_present_flag | ue(v) |
| if (partition_constraints_control_present_flag) { | |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| } | |
| sps_cclm_enabled_flag | ue(1) |
| sps_mts_intra_enabled_flag | ue(1) |
| sps_mts_inter_enabled_flag | ue(1) |
| rbsp_trailing_bits( ) | |
| } | |

In some embodiments, the parameters specified in the SPS (e.g. for the entire frame or image) may be overruled by parameters specified in other syntax unites (e.g. for parts of one frame or image) such as slice header or tile header. In the following, a modified slice header is shown, which includes syntax element log2_diff_ctu_max_bt_size which may (but does not have to be) already provided on the higher level of syntax, such as the SPS. In this case, the log2_diff_ctu_max_bt_size value signaled in the slice header is used to decode the data correctly. In other words, in this example, the first indication also indicates presence or absence of one or more block size (or depth) parameters in slice header.

Modified Slice Header Syntax (Based on Section 7.3.3 of [JVET-K1001-v4])

| | Descriptor |
|---|---|
| slice_header( ) { | |
| slice_pic_parameter_set_id | ue(v) |
| slice_address | u(v) |
| slice_type | ue(v) |
| if ( slice_type != I ‖ partition_constraints_control_present_flag) | |
| log2_diff_ctu_max_bt_size | ue(v) |
| dep_quant_enabled_flag | u(1) |
| if( !dep_quant_enabled_flag ) | |
| sign_data_hiding_enabled_flag | u(1) |
| byte_alignment( ) | |
| } | ... |

Modified sequence parameter set RBSP semantics (based on Section 7.4.3.1 of [JVET-K1001-v4]) . . . .

partition_constraints_control_present_flag equal to 1 specifies the presence of partition constraints control syntax elements in the SPS. partition_constraints_control_present_flag equal to 0 specifies the absence of partition constraints control syntax elements in the SPS.

log2_min_qt_size_intra_slices_minus2 plus 2 specifies the minimum luma size of a leaf block resulting from quadtree splitting of a CTU in slices with slice type equal to 2 (I). The value of log2_min_qt_size_intra_slices_minus2 shall be in the range of 0 to CtbLog2SizeY−2, inclusive. When not present, the value of sps_log2_min_qt_size_intra_slices_minus2 is inferred to be equal to 0.

$$\text{MinQtLog2SizeIntra}Y=\text{log2\_min\_qt\_size\_intra\_slices\_minus2}+2 \qquad (7\text{-}22)$$

log2_min_qt_size_inter_slices_minus2 plus 2 specifies the minimum luma size of a leaf block resulting from quadtree splitting of a CTU in slices with slice type equal to 0 (B) or 1 (P). The value of log2_min_qt_size_inter_slices_minus2 shall be in the range of 0 to CtbLog2SizeY−2, inclusive. When not present, the value of sps_log2_min_qt_size_inter_slices_minus2 is inferred to be equal to 0.

$$\text{MinQtLog2SizeInter}Y=\text{log2\_min\_qt\_size\_inter\_slices\_minus2}+2 \qquad (7\text{-}23)$$

max_mtt_hierarchy_depth_inter_slices specifies the maximum hierarchy depth for coding units resulting from multi-type tree splitting of a quadtree leaf in slices with slice type equal to 0 (B) or 1 (P). The value of max_mtt_hierarchy_depth_inter_slices shall be in the range of 0 to CtbLog2SizeY-MinTbLog2SizeY, inclusive. When not present, the value of sps_max_mtt_hierarchy_depth_inter_slices is inferred to be equal to 3.

max_mtt_hierarchy_depth_intra_slices specifies the maximum hierarchy depth for coding units resulting from multi-type tree splitting of a quadtree leaf in slices with slice type equal to 2 (I). The value of max_mtt_hierarchy_depth_intra_slices shall be in the range of 0 to CtbLog2SizeY-MinTbLog2SizeY, inclusive. When not present, the value of sps_max_mtt_hierarchy_depth_inter_slices is inferred to be equal to 3.

Modified Slice Header Semantics (Based on Section 7.4.4 of [JVET-K1001-v4]))

log2_diff_ctu_max_bt_size specifies the difference between the luma CTB size and the maximum luma size (width or height) of a coding block that can be split using a binary split. The value of log2_diff_ctu_max_bt_size shall be in the range of 0 to CtbLog2SizeY-MinCbLog2SizeY, inclusive. When log2_diff_ctu_max_bt_size is not present, If the slice type is equal to 2 (I) the value of log2_diff_ctu_max_bt_size is inferred to be equal to 2. Otherwise the value of log2_diff_ctu_max_bt_size is inferred to be equal to 0.

The variables MinQtLog2SizeY, MaxBtLog2SizeY, MinBtLog2SizeY, MaxTtLog2SizeY, MinTtLog2SizeY, MaxBtSizeY, MinBtSizeY, MaxTtSizeY, MinTtSizeY and MaxMttDepth are derived as follows:

$$\text{MinQtLog2Size}Y=(\text{slice type}==I)?\text{MinQtLog2Intra}Y:\text{MinQtLog2SizeInter}Y \qquad (7\text{-}25)$$

$$\text{MinQtLog2Size}Y=\text{log2\_min\_qt\_size\_minus2}+2 \qquad (7\text{-}25)$$

$$\text{MaxBtLog2Size}Y=\text{CtbLog2Size}Y-\text{log2\_diff\_ctu\_max\_bt\_size} \qquad (7\text{-}26)$$

$$\text{MinBtLog2Size}Y=\text{MinCbLog2Size}Y \qquad (7\text{-}27)$$

$$\text{MaxTtLog2Size}Y=(\text{slice type}==I)?5:6 \qquad (7\text{-}28)$$

$$\text{MinTtLog2Size}Y=\text{MinCbLog2Size}Y \qquad (7\text{-}29)$$

$$\text{MinQtSize}Y=1<<\text{MinQtLog2Size}Y \qquad (7\text{-}30)$$

$$\text{MaxBtSize}Y=1<<\text{MaxBtLog2Size}Y \qquad (7\text{-}31)$$

$$\text{MinBtSize}Y=1<<\text{MinBtLog2Size}Y \qquad (7\text{-}32)$$

MaxTtSize*Y*=1<<MaxTtLog2Size*Y*          (7-33)

MinTtSize*Y*=1<<MinTtLog2Size*Y*          (7-34)

MaxMttDepth=(slice_type==*I*)?max_mtt_hierar-
 chy_depth_intra_slices:max_mtt_hierar-
 chy_depth_inter_slices          (7-35)

MaxMttDepth=1<<max_mtt_hierarchy_depth          (7-36)

In this example, the flag and the parameters are included in a parameter set referred to as seq_parameter_set_rbsp( ), SPS, which may be common for one or more image frames. However, the present disclosure is not limited thereby and the flag and/or the parameters may be included in other syntax portions of the bitstream, corresponding to other video portions, such as picture parameter set (PPS) or virtual parameter set (VPS), or the like.

Disclosure 2

The following aspect 1 can be combined with aspect 2 and/or 3, means partition high level syntax constraint elements can be signaled in SPS (referred to as aspect 1a in disclosure 1).

Partition high level syntax constraint elements can be overridden (overwritten/overruled) in slice header (aspect 1b in disclosure 2).

Partition high level syntax constrain elements can use default values (referred to as aspect 2 in disclosure 1).

BT and TT can be disabled in SPS (aspect 3a in an alternative embodiment). This may be achieved by inserting an enabling/disabling flag.

BT and TT can be disabled in Slice header (aspect 3b in another alternative embodiment). This may be achieved by inserting an enabling/disabling flag.

BT and TT enabled (disabled) flag can be signaled in SPS and override in Slice header (aspect 1a and 1b in in an alternative embodiment).

These techniques may facilitate provision of the following advantage (for example signaling in SPS, overriding in slice header): The high level partition constraint(s) control the tradeoff between partition complexity and the coding efficiency from partition. The disclosure 1 and/or 2 make sure the flexibility to control the tradeoff for individual slice. For defaults values and BT and/or TT enabling (disabling function), there is even more flexibility for controlling the elements. Both encoder side and decoder side do the same (corresponding) operations.

For example, partition_constraints_control_present_flag may be supplemented by partition_constraints_override_enabled_flag which indicates whether or not the same parameter signaled in the SPS and the slice header (and possibly having different value in SPS than in the slice header) is taken from the slice header, thus overriding the value signaled in the SPS. The corresponding modifications of disclosure 2 based on other approaches are shown below:

Modified Sequence Parameter Set RBSP Syntax
(Based on Section 7.3.2.1 of [JVET-K1001-v4]))

|  | Descriptor |
|---|---|
| seq_parameter_set_rbsp( ) { |  |
|   sps_seq_parameter_set_id | ue(v) |
|   chroma_format_idc | ue(v) |
|   if( chroma_format_idc = = 3 ) |  |

-continued

|  | Descriptor |
|---|---|
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   qtbtt_dual_tree_intra_flag | ue(v) |
|   log2_ctu_size_minus2 | ue(v) |
|   partition_constraints_control_present_flag | ue(v) |
|   if (partition_constraints_control_present_flag) { |  |
|     partition_constraints_override_enabled_flag | ue(v) |
|     sps_btt_enabled_flag | ue(v) |
|     if (sps_btt_enabled_flag) { |  |
|       sps_log2_min_qt_size_intra_slices_minus2 | ue(v) |
|       sps_log2_min_qt_size_inter_slices_minus2 | ue(v) |
|       sps_max_mtt_hierarchy_depth_inter_slices | ue(v) |
|       sps_max_mtt_hierarchy_depth_intra_slices | ue(v) |
|       sps_log2_diff_ctu_max_bt_size_intra_slices | ue(v) |
|       sps_log2_diff_ctu_max_bt_size_inter_slices | ue(v) |
|     } |  |
|   } |  |
|   sps_cclm_enabled_flag | ue(1) |
|   sps_mts_intra_enabled_flag | ue(1) |
|   sps_mts_inter_enabled_flag | ue(1) |
|   rbsp_trailing_bits( ) |  |
| } |  |

Modified Slice Header Syntax (Based on Section
7.3.3 of [JVET-K1001-v4]))

|  | Descriptor |
|---|---|
| slice_header( ) { |  |
|   slice_pic_parameter_set_id | ue(v) |
|   slice_address | u(v) |
|   slice_type | ue(v) |
|   if (partition_constraints_override_enabled_flag) { |  |
|     partition_constraints_override_flag | ue(v) |
|   if (partition_constraints_override_flag) { |  |
|     slice_btt_enabled_flag | ue(v) |
|     if (slice_btt_enalbed_flag) { |  |
|       log2_min_qt_size_minus2 | ue(v) |
|       max_mtt_hierarchy_depth | ue(v) |
|       log2_diff_ctu_max_bt_size | ue(v) |
|     } |  |
|   } |  |
|   } |  |
|   ~~if( slice_type != I )~~ |  |
|     ~~log2_diff_ctu_max_bt_size~~ | ~~ue(v)~~ |
|   dep_quant_enabled_flag | u(1) |
|   if( !dep_quant_enabled_flag ) |  |
|     sign_data_hiding_enabled_flag | u(1) |
|   byte_alignment( ) |  |
| } |  |

Modified Sequence Parameter Set RBSP Semantics (Based on Section 7.4.3.1 of [JVET-K1001-v4]))

partition_constraints_control_present_flag equal to 1 specifies the presence of partition constraints control syntax elements in the SPS. partition_constraints_control_present_flag equal to 0 specifies the absence of partition constraints control syntax elements in the SPS.

sps_btt_enabled_flag equal to 1 specifies that the operation of the multi-type tree partition is applied for slices referring to the SPS in which slice_btt_enable_flag is not present. sps_btt_enabled_flag equal to 0 specifies that the operation of the multi-type tree partition is not applied for slices referring to the SPS in which slice_btt_enable_flag is not present. When not present, the value of sps_btt_enabled_flag is inferred to be equal to 1.

partition_constraints_override_enabled_flag equal to 1 specifies the presence of partition_constraints_override_flag in the slice headers for slices referring to the SPS. partition_constraints_override_enabled_flag equal to 0 specifies the absence of partition_constraints_override_flag in the slice headers for slices referring to the SPS. When not present, the value of partition_constraints_override_enabled_flag is inferred to be equal to 0.

sps_log2_min_qt_size_intra_slices_minus2 plus 2 specifies the initial value of minimum luma size in SPS of a leaf block resulting from quadtree splitting of a CTU in slices with slice type equal to 2 (I) referring to the SPS, unless the initial value of minimum luma sizes in SPS of a leaf block resulting from quadtree splitting of a CTU are overridden by the minimum luma sizes of a leaf block resulting from quadtree splitting of a CTU present in the slice header of the slices referring to the SPS. The value of log2_min_qt_size_intra_slices_minus2 shall be in the range of 0 to CtbLog2SizeY−2, inclusive. When not present, the value of sps_log2_min_qt_size_intra_slices_minus2 is inferred to be equal to 0.

sps_log2_min_qt_size_inter_slices_minus2 plus 2 specifies the initial value of minimum luma size in SPS of a leaf block resulting from quadtree splitting of a CTU in slices with slice type equal to 0 (B) or 1 (P) referring to the SPS, unless the minimum luma sizes of a leaf block resulting from quadtree splitting of a CTU are overridden by the minimum luma sizes of a leaf block resulting from quadtree splitting of a CTU present in the slice header of the slices referring to the SPS. The value of log2_min_qt_size_inter_slices_minus2 shall be in the range of 0 to CtbLog2SizeY−2, inclusive. When not present, the value of sps_log2_min_qt_size_inter_slices_minus2 is inferred to be equal to 0.

sps_max_mtt_hierarchy_depth_inter_slices specifies the initial value of maximum hierarchy depth in SPS for coding units resulting from multi-type tree splitting of a quadtree leaf in slices with slice_type equal to 0 (B) or 1 (P) referring to the SPS, unless the initial value of maximum hierarchy depths in SPS for coding units resulting from multi-type tree splitting of a quadtree leaf are overridden by the maximum hierarchy depths for coding units resulting from multi-type tree splitting of a quadtree leaf present in the slice header of the slices referring to the SPS. The value of max_mtt_hierarchy_depth_inter_slices shall be in the range of 0 to CtbLog2SizeY-MinTbLog2SizeY, inclusive. When not present, if the sps_btt_enabled_flag is equal to 1 the value of sps_max_mtt_hierarchy_depth_inter_slices is inferred to be equal to 3. Otherwise the value of sps_max_mtt_hierarchy_depth_inter_slices is inferred to be equal to 0.

Sps_max_mtt_hierarchy_depth_intra_slices specifies the initial value of maximum hierarchy depth in SPS for coding units resulting from multi-type tree splitting of a quadtree leaf in slices with slice_type equal to 2 (I) referring to the SPS, unless the initial value of maximum hierarchy depths in SPS for coding units resulting from multi-type tree splitting of a quadtree leaf are overridden by the maximum hierarchy depths for coding units resulting from multi-type tree splitting of a quadtree leaf present in the slice header of the slices referring to the SPS. The value of max_mtt_hierarchy_depth_intra_slices shall be in the range of 0 to CtbLog2SizeY-MinTbLog2SizeY, inclusive. When not present, if the sps_btt_enabled_flag is equal to 1 the value of sps_max_mtt_hierarchy_depth_intra_slices is inferred to be equal to 3. Otherwise the value of sps_max_mtt_hierarchy_depth_intra_slices is inferred to be equal to 0.

sps_log2_diff ctu_max_bt_size_intra_slices specifies the initial value of difference between the luma CTB size and the maximum luma size (width or height) in SPS of a coding block that can be split using a binary split in slices with slice_type equal to 2 (I) referring to the SPS, unless the initial value of differences between the luma CTB size and the maximum luma size (width or height) in SPS of a coding block that can be split using a binary split are overridden by the differences between the luma CTB size and the maximum luma size (width or height) of a coding block that can be split using a binary split present in the slice header of the slices referring to the SPS. The value of log2_diff_ctu_max_bt_size shall be in the range of 0 to CtbLog2SizeY-MinCbLog2SizeY, inclusive. When not present, if the sps_btt_enabled_flag is equal to 1 the value of sps_log2_diff_ctu_max_bt_size_intra_slices is inferred to be equal to 2. Otherwise the value of sps_log2_diff_ctu_max_bt_size_intra_slices is inferred to be equal to CtbLog2SizeY-MinCbLog2SizeY.

sps_log2_diff_ctu_max_bt_size_inter_slices specifies the initial value of difference between the luma CTB size and the maximum luma size (width or height) in SPS of a coding block that can be split using a binary split in slices with slice_type equal to 0 (B) or 1 (P) referring to the SPS, unless the initial value of differences between the luma CTB size and the maximum luma size (width or height) in SPS of a coding block that can be split using a binary split are overridden by the differences between the luma CTB size and the maximum luma size (width or height) of a coding block that can be split using a binary split present in the slice header of the slices referring to the SPS. The value of log2_diff_ctu_max_bt_size shall be in the range of 0 to CtbLog2SizeY-MinCbLog2SizeY, inclusive. When not present, if the sps_btt_enabled_flag is equal to 1 the value of sps_log2_diff_ctu_max_bt_size_inter slices is inferred to be equal to 0. Otherwise the value of sps_log2_diff_ctu_max_bt_size_inter slices is inferred to be equal to CtbLog2SizeY-MinCbLog2SizeY.

Modified Slice Header Semantics (Based on Section 7.4.4 of [JVET-K1001-v4])

partition_constraints_override_flag equal to 1 specifies that partition constraints parameters are present in the slice header. partition_constraints_override_flag equal to 0 specifies that partition constraints parameters are not present in the slice header. When not present, the value of partition_constraints_override_flag is inferred to be equal to 0.

slice_btt_enabled_flag equal to 1 specifies that the operation of the multi-type tree partition is applied for the current slice. slice_btt_enabled_flag equal to 0 specifies that the operation of the multi-type tree partition is not applied for the current slice. When slice_btt_enabled_flag is not present, it is inferred to be equal to sps_btt_enabled_flag.

log2_min_qt_size_minus2 plus 2 specifies the minimum luma size of a leaf block resulting from quadtree splitting of a CTU fur the current slice. The value of log2_min_qt_size_inter_slices_minus2 shall be in the range of 0 to CtbLog2SizeY−2, inclusive. When not present, the values of log2_min_qt_size_minus2 is inferred to be equal to sps_log2_min_qt_size_intra_slices_minus2 with slice_type equal to 2 (I) and inferred to be equal to sps_log2_min_qt_size_inter_slices_minus2 with slice_type equal to 0 (B) or 1 (P).

max_mtt_hierarchy_depth specifies the maximum hierarchy depth for coding units resulting from multi-type tree splitting of a quadtree leaf for the current slice. The value of max_mtt_hierarchy_depth_intra_slices shall be in the range of 0 to CtbLog2SizeY-MinTbLog2SizeY, inclusive. When not present, the values of max_mtt_hierarchy_depth is inferred to be equal to sps_max_mtt_hierarchy_depth_intra_slices with slice type equal to 2 (I) and inferred to be equal to sps_max_mtt_hierarchy_depth_inter_slices with slice type equal to 0 (B) or 1 (P).

log2_diff_ctu_max_bt_size specifies the difference between the luma CTB size and the maximum luma size (width or height) of a coding block that can be split using a binary split for the current slice. The value of log2_diff_ctu_max_bt_size shall be in the range of 0 to CtbLog2SizeY-MinCbLog2SizeY, inclusive. When not present, the values of log2_diff_ctu_max_bt_size is inferred to be equal to sps_log2_diff_ctu_max_bt_size_intra_slices with slice type equal to 2 (I) and inferred to be equal to sps_log2_diff_ctu_max_bt_size_inter_slices with slice type equal to 0 (B) or 1 (P). The variables MinQtLog2SizeY, MaxBtLog2SizeY, MinBtLog2SizeY, MaxTtLog2SizeY, MinTtLog2SizeY, MaxBtSizeY, MinBtSizeY, MaxTtSizeY, MinTtSizeY and MaxMttDepth are derived as follows:

$$MinQtLog2SizeY = log2\_min\_qt\_size\_minus2 + 2 \quad (7\text{-}25)$$

$$MaxBtLog2SizeY = CtbLog2SizeY - log2\_diff\_ctu\_max\_bt\_size \quad (7\text{-}26)$$

$$MinBtLog2SizeY = MinCbLog2SizeY \quad (7\text{-}27)$$

$$MaxTtLog2SizeY = (slice\_type == I)?5:6 \quad (7\text{-}28)$$

$$MinTtLog2SizeY = MinCbLog2SizeY \quad (7\text{-}29)$$

$$MinQtSizeY = 1 << MinQtLog2SizeY \quad (7\text{-}30)$$

$$MaxBtSizeY = 1 << MaxBtLog2SizeY \quad (7\text{-}31)$$

$$MinBtSizeY = 1 << MinBtLog2SizeY \quad (7\text{-}32)$$

$$MaxTtSizeY = 1 << MaxTtLog2SizeY \quad (7\text{-}33)$$

$$MinTtSizeY = 1 << MinTtLog2SizeY \quad (7\text{-}34)$$

$$MaxMttDepth = (slice\_type == I)?max\_mtt\_hierarchy\_depth\_intra\_slices:max\_mtt\_hierarchy\_depth\_inter\_slices \quad (7\text{-}35)$$

$$MaxMttDepth = 1 << max\_mtt\_hierarchy\_depth \quad (7\text{-}35)$$

If the MaxTTSizeY (maximum luma size (width or height) of a coding block that can be split using a ternary split is signaled in the SPS (or other parameter set or Slice header), the disclosure 1 and 2 or aspect 1, 2 or aspect 3 could be applied in the same manner.

Technique advantage: The disclosure for the signaling the indicator of MaxTtSizeY syntax elements make sure that there is more flexibility the control the elements. Both encoder and decoding do the same (corresponding) operations. When referring to "the same operations" here it is meant that since the encoder and decoder make use of the same syntax, they shall apply the same splitting. However, the encoder shall determine and encode the syntax elements, whereas the decoder shall derive or decode them from the bitstream and/or as default values or based on some pre-set rule.

The corresponding syntax and semantics modification based on other approaches are shown below:

Modified Sequence Parameter Set RBSP Syntax (Based on Section 7.3.2.1 of [JVET-K1001-v4]))

| | Descriptor |
|---|---|
| seq_parameter_set_rbsp( ) { | |
| sps_seq_parameter_set_id | ue(v) |
| chroma_format_idc | ue(v) |
| if( chroma_format_idc = = 3) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| partition_constrains_override_enabled_flag | ue(v) |
| sps_log2_min_qt_size_intra_slices_minus2 | ue(v) |
| sps_log2_min_qt_size_inter_slices_minus2 | ue(v) |
| sps_max_mtt_hierarchy_depth_inter_slices | ue(v) |
| sps_max_mtt_hierarchy_depth_intra_slices | ue(v) |
| sps_log2_diff_ctu_max_bt_size_intra_slices | ue(v) |
| sps_log2_diff_ctu_max_bt_size_inter_slices | ue(v) |
| sps_log2_diff_ctu_max_tt_size_intra_slices | ue(v) |
| sps_log2_diff_ctu_max_tt_size_inter_slices | ue(v) |
| sps_cclm_enabled_flag | ue(1) |
| sps_mts_intra_enabled_flag | ue(1) |
| sps_mts_inter_enabled_flag | ue(1) |
| rbsp_trailing_bits( ) | |
| } | |

Modified Slice Header Syntax (Based on Section 7.3.3 of [JVET-K1001-v4]))

| | Descriptor |
|---|---|
| slice_header( ) { | |
| slice_pic_parameter_set_id | ue(v) |
| slice_address | u(v) |
| slice_type | ue(v) |
| if (partition_constrains_override_enabled_flag) { | |
| partition_constrains_override_flag | ue(v) |
| if (partition_constrains_override_flag) { | |
| log2_min_qt_size_minus2 | ue(v) |
| max_mtt_hierarchy_depth | ue(v) |
| log2_diff_ctu_max_bt_size | ue(v) |
| log2_diff_ctu_max_tt_size | |
| } | |
| } | |
| dep_quant_enabled_flag | u(1) |
| if( !dep_quant_enabled_flag ) | |
| sign_data_hiding_enabled_flag | u(1) |
| byte_alignment( ) | |
| } | |

Like the picture 201, the block 203 again is or can be regarded as a two-dimensional array or matrix of samples with intensity values (sample values), although of smaller dimension than the picture 201. In other words, the block 203 may comprise, e.g., one sample array (e.g. a luma array in case of a monochrome picture 201) or three sample arrays (e.g. a luma and two chroma arrays in case of a color picture 201) or any other number and/or kind of arrays depending on the color format applied. The number of samples in horizontal and vertical direction (or axis) of the block 203 define the size of block 203.

Encoder 200 as shown in FIG. 2 is configured encode the picture 201 block by block, e.g. the encoding and prediction is performed per block 203.

Residual Calculation

The residual calculation unit 204 is configured to calculate a residual block 205 based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 is configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transform coefficients, tradeoff between accuracy and implementation costs, etc. Specific scaling factors are, for example, specified for the inverse transform, e.g. by inverse transform processing unit 212, at a decoder 300 (and the corresponding inverse transform, e.g. by inverse transform processing unit 212 at an encoder 20) and corresponding scaling factors for the forward transform, e.g. by transform processing unit 206, at an encoder 200 may be specified accordingly.

Quantization

The quantization unit 208 is configured to quantize the transform coefficients 207 to obtain quantized transform coefficients 209, e.g. by applying scalar quantization or vector quantization. The quantized transform coefficients 209 may also be referred to as quantized residual coefficients 209. The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a QP. The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g. an inverse discrete cosine transform (DCT) or inverse discrete sine transform (DST), to obtain an inverse transform block 213 in the sample domain. The inverse transform block 213 may also be referred to as inverse transform dequantized block 213 or inverse transform residual block 213.

The reconstruction unit 214 (e.g. Summer 214) is configured to add the inverse transform block 213 (i.e. reconstructed residual block 213) to the prediction block 265 to obtain a reconstructed block 215 in the sample domain, e.g. by adding the sample values of the reconstructed residual block 213 and the sample values of the prediction block 265.

Optional, the buffer unit 216 (or short "buffer" 216), e.g. a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g. intra prediction.

Embodiments of the encoder 200 may be configured such that, e.g. the buffer unit 216 is not only used for storing the reconstructed blocks 215 for intra prediction 254 but also for the loop filter unit 220 (not shown in FIG. 2), and/or such that, e.g. the buffer unit 216 and the decoded picture buffer unit 230 form one buffer. Further embodiments may be configured to use filtered blocks 221 and/or blocks or samples from the decoded picture buffer 230 (both not shown in FIG. 2) as input or basis for intra prediction 254.

The loop filter unit 220 (or short "loop filter" 220), is configured to filter the reconstructed block 215 to obtain a filtered block 221, e.g. to smooth pixel transitions, or otherwise improve the video quality. The loop filter unit 220 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the encoder 200 (respectively loop filter unit 220) may be configured to output loop filter parameters (such as sample adaptive offset information), e.g. directly or entropy encoded via the entropy encoding unit 270 or any other entropy coding unit, so that, e.g., a decoder 300 may receive and apply the same loop filter parameters for decoding.

The decoded picture buffer (DPB) 230 may be a reference picture memory that stores reference picture data for use in encoding video data by video encoder 20. The DPB 230 may be formed by any of a variety of memory devices, such as DRAM, including synchronous DRAM (SDRAM), magnetoresistive RAM (MRAM), resistive RAM (RRAM), or other types of memory devices. The DPB 230 and the buffer 216 may be provided by the same memory device or separate memory devices. In some example, the decoded picture buffer DPB 230 is configured to store the filtered block 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. In some example, if the reconstructed block 215 is reconstructed but without in-loop filtering, the DPB 230 is configured to store the reconstructed block 215.

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction processing unit 260 and mode selection (e.g. by mode selection unit 262) performed by an example encoder 200 will be explained in more detail.

As described above, the encoder 200 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g. non-directional modes like DC (or mean) mode and planar mode, or directional modes, e.g. as defined in H.265, or may comprise 67 different intra-prediction modes, e.g. non-directional modes like DC (or mean) mode and planar mode, or directional modes, e.g. as defined in H.266 under developing.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction processing unit 260 may be further configured to partition the block 203 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 203 and the prediction modes applied to each of the block partitions or sub-blocks.

The inter prediction unit 244 may include motion estimation (ME) unit and motion compensation (MC) unit (not shown in FIG. 2). The motion estimation unit is configured to receive or obtain the picture block 203 (current picture block 203 of the current picture 201) and a decoded picture 331, or at least one or a plurality of previously reconstructed blocks, e.g. reconstructed blocks of one or a plurality of other/different previously decoded pictures 331, for motion estimation. E.g. a video sequence may comprise the current picture and the previously decoded pictures 331, or in other words, the current picture and the previously decoded pictures 331 may be part of or form a sequence of pictures forming a video sequence. The encoder 200 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 2). This offset is also called motion vector (MV). Merging is an important motion estimation tool used in HEVC and inherited to VVC. For performing the merge estimation, the first thing should be done is construct a merge candidate list where each of the candidate contains all motion data including the information whether one or two reference picture lists are used as well as a reference index and a motion vector for each list. The merge candidate list is constructed based on the following candidates: a. up to four spatial merge candidates that are derived from five spatial neighboring blocks, b. one temporal merge candidate derived from two temporal, co-located blocks, c. additional merge candidates including combined bi-predictive candidates and zero motion vector candidates.

The derivation of the motion vectors for the temporal merge candidate is the same as for the TMVP. Since a merge candidate comprises all motion data and the TMVP is only one motion vector, the derivation of the whole motion data only depends on the slice type. For bi-predictive slices, a TMVP is derived for each reference picture list. Depending on the availability of the TMVP for each list, the prediction type is set to bi-prediction or to the list for which the TMVP is available. All associated reference picture indices are set equal to zero. Consequently, for uni-predictive slices, only the TMVP for list 0 is derived together with the reference picture index equal to zero.

When at least one TMVP is available and the temporal merge candidate is added to the list, no redundancy check is performed. This makes the merge list construction independent of the co-located picture which improves error resilience. Consider the case where the temporal merge candidate would be redundant and therefore not included in the merge candidate list. In the event of a lost co-located picture, the decoder could not derive the temporal candidates and hence not check whether it would be redundant. The indexing of all subsequent candidates would be affected by this.

For parsing robustness reasons, the length of the merge candidate list is fixed. After the spatial and the temporal merge candidates have been added, it can happen that the list has not yet the fixed length. In order to compensate for the coding efficiency loss that comes along with the non-length adaptive list index signaling, additional candidates are generated. Depending on the slice type, up to two kind of candidates are used to fully populate the list: a. Combined bi-predictive candidates, b. Zero motion vector candidates.

In bi-predictive slices, additional candidates can be generated based on the existing ones by combining reference picture list 0 motion data of one candidate with and the list 1 motion data of another one. This is done by copying Oxo, Ayo, Oto from one candidate, e.g. the first one, and $\Delta x_1, \Delta y_1, \Delta t_1$ from another, e.g. the second one. The different combinations are predefined and given in Table 1.1.

TABLE 1.1

| Combination Order | 0 | 1 | 2 | 3 | 4 | 5 | 6 | 7 | 8 | 9 | 10 | 11 |
|---|---|---|---|---|---|---|---|---|---|---|---|---|
| $\Delta x_0, \Delta y_0, \Delta t_0$ from Cand. | 0 | 1 | 0 | 2 | 1 | 2 | 0 | 3 | 1 | 3 | 2 | 3 |
| $\Delta x_1, \Delta y_1, \Delta t_1$ from Cand. | 1 | 0 | 2 | 0 | 2 | 1 | 3 | 0 | 3 | 1 | 3 | 2 |

When the list is still not full after adding the combined bi-predictive candidates, or for uni-predictive slices, zero motion vector candidates are calculated to complete the list. All zero motion vector candidates have one zero displacement motion vector for uni-predictive slices and two for bi-predictive slices. The reference indices are set equal to zero and are incremented by one for each additional candidate until the maximum number of reference indices is reached. If that is the case and there are still additional candidates missing, a reference index equal to zero is used to create these. For all the additional candidates, no redundancy checks are performed as it turned out that omitting these checks will not introduce a coding efficiency loss.

For each PU coded in inter-picture prediction mode, a merge_flag indicates that block merging is used to derive the motion data. The merge_idx further determines the candidate in the merge list that provides all the motion data needed for the MCP. Besides this PU-level signaling, the number of candidates in the merge list is signaled in the slice header. Since the default value is five, it is represented as a difference to five (five_minus_max_num_merge_cand). That way, the five is signaled with a short codeword for the 0 whereas using only one candidate, is signaled with a longer codeword for the 4. Regarding the impact on the merge candidate list construction process, the overall process remains the same although it terminates after the list contains the maximum number of merge candidates. In the initial design, the maximum value for the merge index coding was given by the number of available spatial and temporal candidates in the list. When e.g. only two candidates are available, the index can be efficiently coded as a flag. But, in order to parse the merge index, the whole merge candidate list has to be constructed to know the actual number of candidates. Assuming unavailable neighboring blocks due to transmission errors, it would not be possible to parse the merge index anymore.

A crucial application of the block merging concept in HEVC is its combination with a skip mode. In previous video coding standards, the skip mode was used to indicate for a block that the motion data is inferred instead of explicitly signaled and that the prediction residual is zero, i.e. no transform coefficients are transmitted. In HEVC, at the beginning of each CU in an inter-picture prediction slice, a skip_flag is signaled that implies the following: a. the CU only contains one PU (2N×2N partition type), b. the merge mode is used to derive the motion data (merge_flag equal to 1), c. no residual data is present in the bitstream.

Embodiments of the encoder 200 may be configured to select the intra-prediction mode based on an optimization criterion, e.g. minimum residual (e.g. the intra-prediction mode providing the prediction block 255 most similar to the current picture block 203) or minimum rate distortion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

The entropy encoding unit 270 is configured to apply an entropy encoding algorithm or scheme (e.g. a variable length coding (VLC) scheme, an context adaptive VLC scheme (CALVC), an arithmetic coding scheme, a CABAC, syntax-based CABAC (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g. in the form of an encoded bitstream 21. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 200 can be used to encode the video stream. For example, a non-transform based encoder 200 can quantize the residual signal directly without the transform processing unit 206 for certain blocks or frames. In another implementation, an encoder 200 can have the quantization unit 208 and the inverse quantization unit 210 combined into a single unit.

FIG. 3 shows an exemplary video decoder 300 that is configured to implement the techniques of this present application. The video decoder 300 configured to receive encoded picture data (e.g. encoded bitstream) 271, e.g. encoded by encoder 200, to obtain a decoded picture 331. During the decoding process, video decoder 300 receives video data, e.g. an encoded video bitstream that represents picture blocks of an encoded video slice and associated syntax elements, from video encoder 200.

In the example of FIG. 3, the decoder 300 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 300 may, in some examples, perform a decoding pass generally reciprocal to the encoding pass described with respect to video encoder 200 from FIG. 2.

The entropy decoding unit 304 is configured to perform entropy decoding to the encoded picture data 271 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 300 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 300 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 300 is configured to output the decoded picture 311, e.g. via output 312, for presentation or viewing to a user.

Other variations of the video decoder 300 can be used to decode the compressed bitstream. For example, the decoder 300 can produce the output video stream without the loop filtering unit 320. For example, a non-transform based decoder 300 can inverse-quantize the residual signal directly without the inverse-transform processing unit 312 for certain blocks or frames. In another implementation, the video decoder 300 can have the inverse-quantization unit 310 and the inverse-transform processing unit 312 combined into a single unit.

FIG. 4 is a schematic diagram of a network device 400 (e.g., a coding device) according to an embodiment of the disclosure. The network device 400 is suitable for implementing the disclosed embodiments as described herein. In an embodiment, the network device 400 may be a decoder such as video decoder 300 of FIG. 1A or an encoder such as video encoder 200 of FIG. 1A. In an embodiment, the network device 400 may be one or more components of the video decoder 300 of FIG. 1A or the video encoder 200 of FIG. 1A as described above.

The network device 400 comprises ingress ports 410 and receiver units (Rx) 420 for receiving data, a processor, logic unit, or central processing unit (CPU) 430 to process the data, transmitter units (Tx) 440 and egress ports 450 for transmitting the data, and a memory 460 for storing the data. The network device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the network device 400 and effects a transformation of the network device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 5:
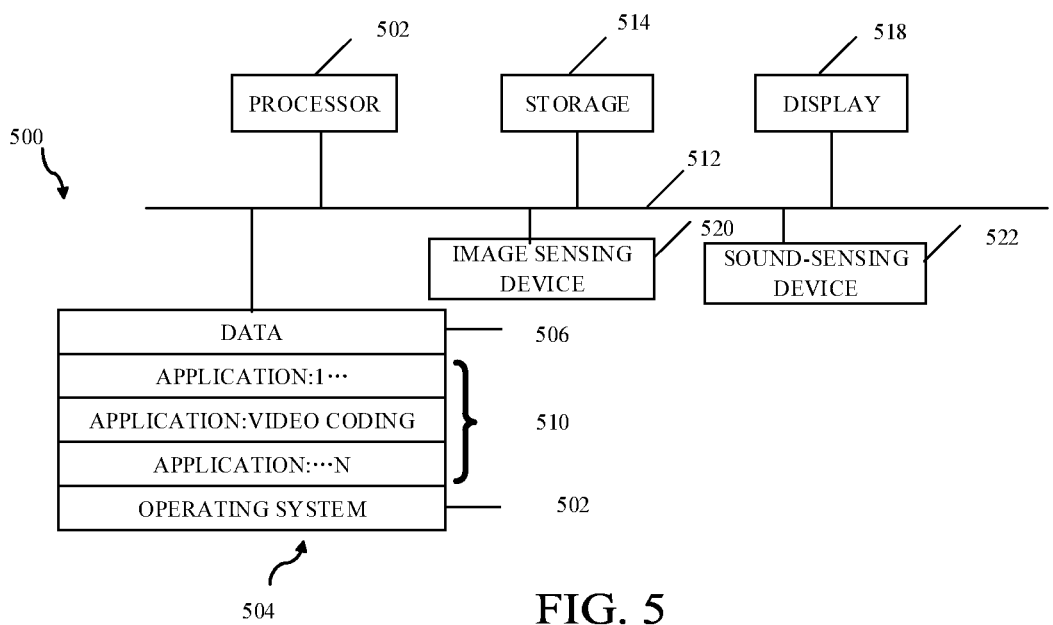
FIG. 5 is a simplified block diagram of an apparatus 500 that may be used as either or both of the source device 12 and the destination device 14 from FIG. 1A according to an exemplary embodiment.
Figure 6:
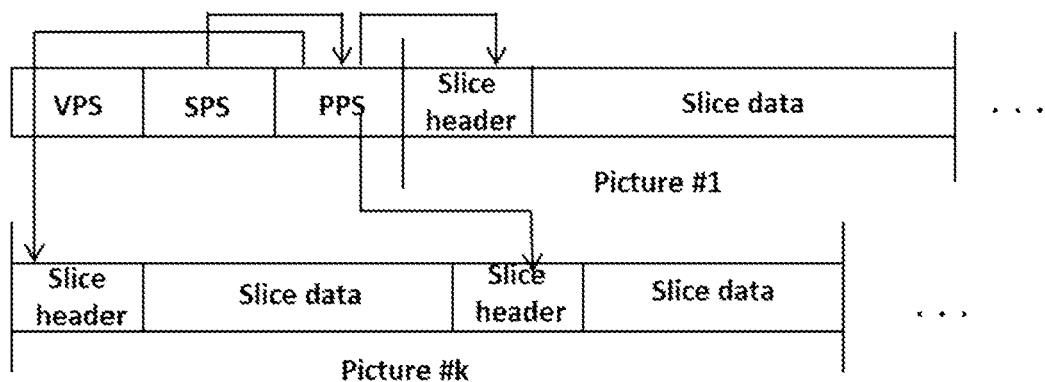
FIG. 6 is a schematic drawing illustrating a typical bitstream structure.

FIG. 5 is a simplified block diagram of an apparatus 500 that may be used as either or both of the source device 12 and the destination device 14 from FIG. 1A according to an exemplary embodiment. The apparatus 500 can implement techniques of this present application. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a ROM device or a RAM device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by an LCD, a CRT display, a plasma display or light-emitting diode (LED) display, such as an OLED display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, electrically erasable programmable ROM (EEPROM), CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and BLU-RAY DISC, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Figure 14:
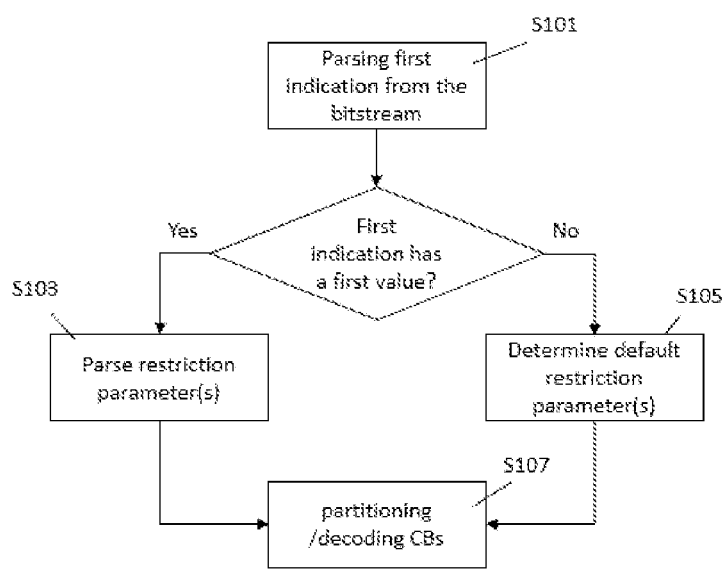
FIG. 14 is a flow diagram illustrating an exemplary decoding method including determination of restriction parameters.

In summary, as shown in FIG. 14, according to a first example, a decoding method is provided to be performed by a decoder for decoding an encoded picture which is partitioned into multiple coding tree blocks which are further partitioned into multiple coding blocks with particular sizes, comprises parsing S101 a first indication from the SPS or PPS or slice header or tile header of a bit stream containing the encoded picture, determining S103 the particular size of the coding blocks, which are confined by block size restriction parameter included in the SPS/PPS/slice header/tile header of the bit stream if the first indication is first value, or (otherwise) determining S105 the particular size of the coding blocks, which are confined by default size restriction parameter if the first indication is second value or not presented in the SPS/PPS/slice header/tile header, and decoding S107 the coding blocks with the particular sizes.

In addition to the example 1, an example 2 comprises determining the partition mode of the multiple coding tree blocks, which are confined by partition depth restriction parameter included in the SPS/PPS/slice header/tile header of the bit stream if the first indication is first value, or determining the partition mode of the multiple coding tree blocks, which are confined by default partition depth restriction parameter if the first indication is second value or not presented in the SPS/PPS/slice header/tile header, and partitioning the multiple coding tree blocks into the coding blocks with the particular sizes according to the partition mode. It is noted that in the figures, the block size restriction and/or the depth restriction correspond to the "restriction parameter".

In addition to the example 2, in an example 3, the first indication is partition_constrains_control_present_flag.

In addition to the example 2, in an example 4, the size restriction parameters include minimum quad tree size (MinQtSize), and/or maximum binary tree size (MaxBtSize), and/or maximum ternary tree size (MaxTtsize), the partition depth restriction parameter includes maximum multiple type tree depth (MaxMttDepth).

In addition to the example 2, in an example 5, the default size restriction parameters include minimum quad tree size (MinQtSize) being set as 4 or being set as minimum coding block size, and/or maximum binary tree size (MaxBtSize) being set as 128 or being set as coding tree block size for inter slice, and being set as 32 for intra slice, and/or maximum ternary tree size (MaxTtSize) being set as 64 for inter slice, and being set as 32 for intra slice, and the default partition depth restriction parameter includes maximum multiple type tree depth (MaxMttDepth) being set as 3.

Figure 15:
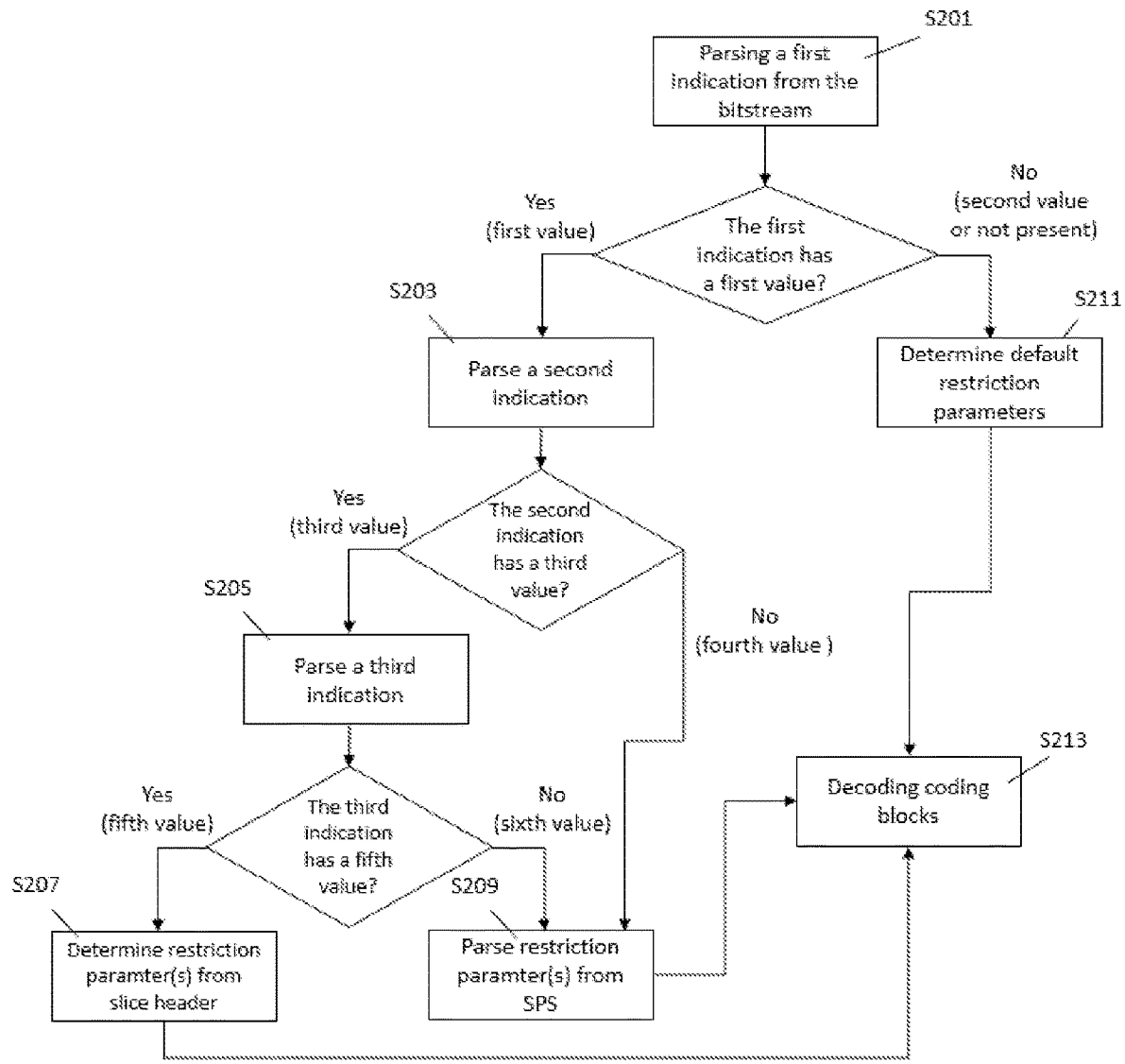
FIG. 15 is a flow diagram illustrating another exemplary decoding method including determination of restriction parameters.

According to an example 6, as shown in FIG. 15, a decoding method is provided to be performed by a decoder for decoding an encoded picture which is partitioned into multiple coding tree blocks which are further partitioned into multiple coding blocks with particular sizes, comprises parsing S201 a first indication the SPS of a bit stream containing the encoded picture, wherein the first indication allows the decoder to determine the particular sizes of the coding blocks, which are confined by block size restriction parameter included in the SPS of the bit stream if the first indication is the first value, or confined by default block size restriction parameter if the first indication is the second value, parsing S203 a second indication from the SPS of the bit stream if the first indication is the first value, wherein the second indication indicates a third indication is included in a slice header of a slice including the coding blocks if the second indication is the first value, or a third indication is not included in the slice header, and the third indication indicates that a slice level size restriction parameter is included in the slice header if the a third indication is the first value, or that a slice level size restriction parameter is not included in the slice header if the third indication is the second value, parsing S205 the third indication if the second indication is the first value, determining S207 the particular sizes of the coding blocks, which are confined by the slice level size restriction parameter included in the slice header if the third indication is the first value, or determining S209 the particular sizes of the coding blocks, which are confined by the block size restriction parameter included in the SPS of the bit stream if the third indication is the second value or the second indication is the second value, or determining S211 the particular sizes of the coding blocks, which are confined by the default size restriction parameter if the first indication is second value, and decoding S213 the coding blocks with the particular sizes.

It is noted that the first value of the second indication corresponds to a third value in the figures (to emphasize that it does not have to be similar to the first value of other indications) and the second value of the second indication corresponds to the fourth value in figures. Similarly, the first and second values of the third indication correspond respectively to the fifth and sixth values. Similarly, the first and second values of the fourth indication correspond respectively to the seventh and eighth values. Similarly, the first and second values of the fifth indication correspond respectively to the ninth and tenth values.

Further to the example 6, in an example 7, the third indication further indicates that a slice level partition depth restriction parameter is included in the slice header if the a third indication is the first value, and the method further comprising determining the partition mode of the multiple coding tree blocks, which are confined by the slice level partition depth restriction parameter and the slice level size restriction parameter included in the slice header if the third indication is the first value, or determining the partition mode of the multiple coding tree blocks, which are confined by partition depth restriction parameter and the size restriction parameter included in the SPS of the bit stream if the third indication is the second value or the second indication is the second value, or determining the partition mode of the multiple coding tree blocks, which are confined by default partition depth restriction parameter and the default size restriction parameter if the first indication is second value, and partitioning the multiple coding tree blocks into the coding blocks with the particular sizes according to the partition mode.

Further to the example 7, in an example 8, the first indication is partition_constrains_control_present_flag.

Further to the example 8, in an example 9, the size restriction parameters include minimum quad tree size(MinQtSize), and/or maximum binary tree size (MaxBtSize), and/or maximum ternary tree size (MaxTtsize), the partition depth restriction parameter includes maximum multiple type tree depth (MaxMttDepth).

Moreover, in addition to the example 8, in an example 10, the default size restriction parameters include minimum quad tree size(MinQtSize) being set as 4 or being set as minimum coding block size, and/or maximum binary tree size (MaxBtSize) being set as 128 or being set as coding tree block size for inter slice, and being set as 32 for intra slice, and/or maximum ternary tree size (MaxTtSize) being set as 64 for inter slice, and being set as 32 for intra slice, and the default partition depth restriction parameter includes maximum multiple type tree depth (MaxMttDepth) being set as 3.

Figure 16:
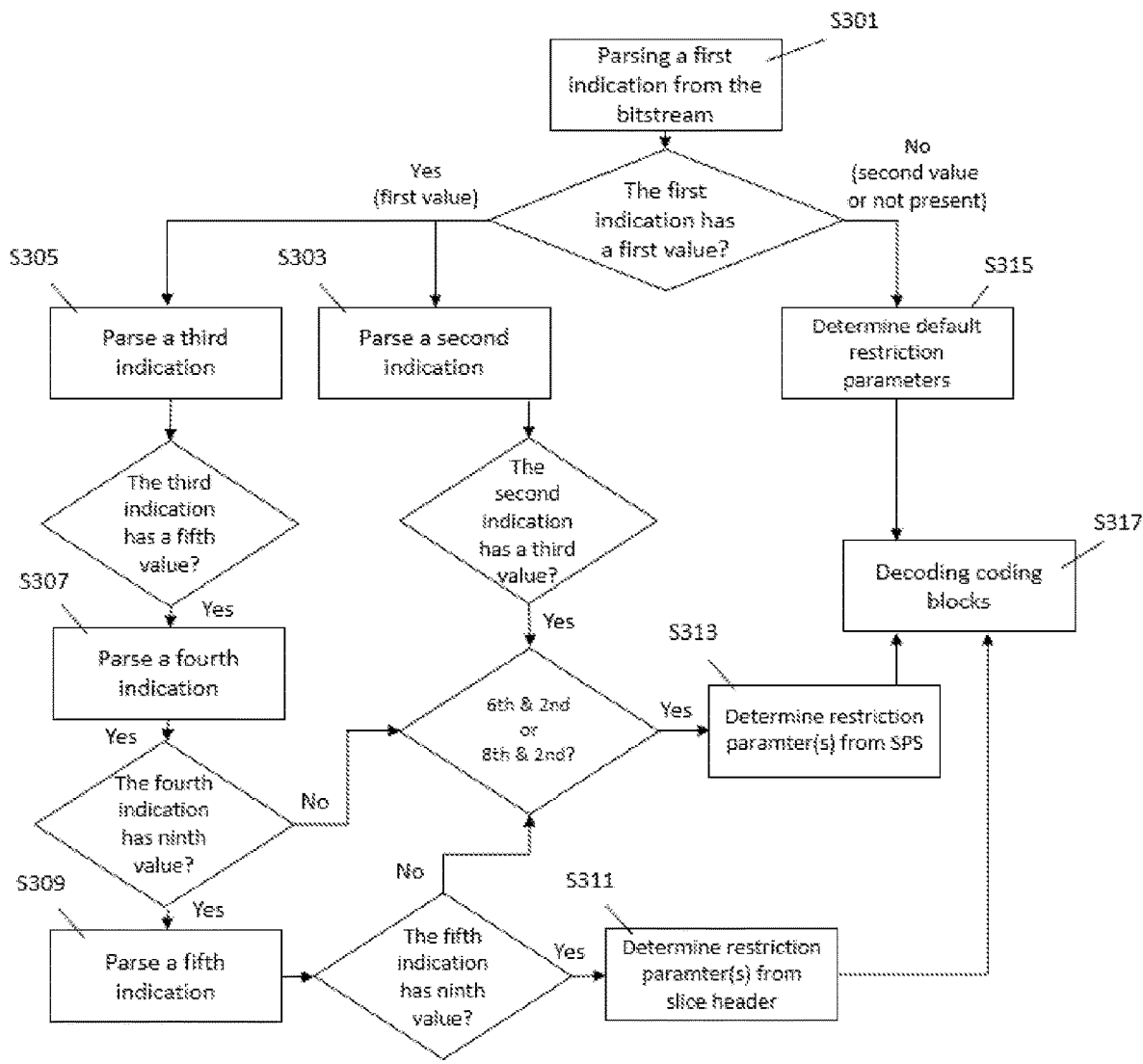
FIG. 16 is a flow diagram illustrating another exemplary decoding method including determination of restriction parameters.

In an example 11, illustrated in FIG. 16, a decoding method is provided performed by a decoder for decoding an encoded picture which is partitioned into multiple coding tree blocks which are further partitioned into multiple coding blocks with particular sizes, comprises parsing S301 a first indication from the SPS of a bit stream containing the encoded picture, wherein the first indication allows the decoder to determine the particular sizes of the coding blocks, which are confined by size restriction parameter included in the SPS of the bit stream if the first indication is first value, or confined by default size restriction parameters if the first indication is second value, parsing S303 a second indication from the SPS if the first indication is the first value, wherein the second indication indicates multiply type tree partition constrained by the by size restriction parameter is allowed if second indication is the first value, or multiply type tree partition is not allowed if the second indication is the second value, parsing S305 a third indication from the SPS if the first indication is the first value, wherein the third indication indicates a fourth indication is included in a slice header of a slice including the coding block if the third indication is first value, or a fourth indication is not included in the slice header, and the fourth indication indicates that slice level size restriction parameter is included in the slice header if the a fourth indication is first value, or that slice level size restriction parameter is not included in the slice header if the a third indication is second value, parsing S307 the fourth indication if the third indication is the first value, parsing S309 a fifth indication from the slice header if the fourth indication is the first value, wherein the fifth indication indicates multiply type tree partition constrained by the slice level size restriction parameter is allowed in the slice if fifth indication is the first value or multiply type tree partition is not allowed in the slice if the fifth indication is the second value, determining S311 the particular sizes of the coding blocks, which are confined by the slice level size restriction parameter is included in the slice header if the fifth indication is the first value, or determining S313 the particular sizes of the coding blocks, which are confined by the size restriction parameter included in the SPS of the bit stream if the third indication is the second value and the second indication is the first value or fourth indication is the second value and the second indication is the first value, or determining S315 the particular sizes of the coding blocks, which are confined by the default size restriction parameter if the first indication is second value, decoding S317 the coding blocks with the particular sizes.

Further to the example 11, in an example 12, the fourth indication further indicates that a slice level partition depth restriction parameter is included in the slice header if the fourth value is the first value, and the method further comprising determining the partition mode of the multiple coding tree blocks, which are confined by the slice level partition depth restriction parameter and the slice level size restriction parameter included in the slice header if the firth indication is the first value, or determining the partition mode of the multiple coding tree blocks, which are confined by partition depth restriction parameter and the size restriction parameter included in the SPS of the bit stream if the third indication is the second value or the fourth indication is the second value or the fifth indication is the second value, or determining the partition mode of the multiple coding tree blocks, which are confined by default partition depth restriction parameter and the default size restriction parameter if the first indication is second value, and partitioning the multiple coding tree blocks into the coding blocks with the particular sizes according to the partition mode.

In addition to the example 12, in an example 13, the first indication is partition_constrains_control_present_flag.

Further to the example 13, in an example 14, the size restriction parameters include minimum quad tree size(MinQtSize), and/or maximum binary tree size (MaxBtSize), and/or maximum ternary tree size (MaxTtsize), the partition depth restriction parameter includes maximum multiple type tree depth (MaxMttDepth).

Further to the example 13, in an example 15, the default size restriction parameters include minimum quad tree size (MinQtSize) being set as 4 or being set as minimum coding block size, and/or maximum binary tree size (MaxBtSize) being set as 128 or being set as coding tree block size for inter slice, and being set as 32 for intra slice, and/or maximum ternary tree size (MaxTtSize) being set as 64 for inter slice, and being set as 32 for intra slice, and the default partition depth restriction parameter includes maximum multiple type tree depth (MaxMttDepth) being set as 3.

An example 16 provides a decoding method (which may be also operating exemplarily according to FIG. 14, wherein the determined restriction is partitioning mode and wherein the decoding is performed using the determined partition mode) performed by a decoder for decoding an encoded picture which is partitioned into multiple coding tree blocks which are further partitioned into multiple coding blocks with particular sizes, comprises parsing a first indication from the SPS/PPS/slice header/tile header of a bit stream containing the encoded picture, determining the partition mode of the multiple coding tree blocks, which are confined by block size restriction parameter and partition depth restriction parameter included in the SPS/PPS/slice header/tile header of the bit stream if the first indication is first value, or determining the partition mode of the multiple coding tree blocks, which are confined by default block size restriction parameter and default partition depth restriction parameter if the first indication is second value or not presented in the SPS/PPS/slice header/tile header, and partitioning the multiple coding tree blocks into the coding blocks with according to the partition mode, and decoding the coding blocks.

In addition to the example 16, in an example 17, the first indication is partition_constrains_control_present_flag.

In addition to the example 16, in an example 18, the size restriction parameters include minimum quad tree size (MinQtSize), and/or maximum binary tree size (MaxBtSize), and/or maximum ternary tree size (MaxTtsize), the partition depth restriction parameter includes maximum multiple type tree depth (MaxMttDepth).

In addition to the example 16, in an example 19, the default size restriction parameters include minimum quad tree size (MinQtSize) being set as 4 or being set as minimum coding block size, and/or maximum binary tree size (MaxBtSize) being set as 128 or being set as coding tree block size for inter slice, and being set as 32 for intra slice, and/or maximum ternary tree size (MaxTtSize) being set as 64 for inter slice, and being set as 32 for intra slice, and the default partition depth restriction parameter includes maximum multiple type tree depth (MaxMttDepth) being set as 3.

According to an example 20, a decoding method is provided (which may be also operating exemplarily according to FIG. 15, wherein the determined restriction is partitioning mode and wherein the decoding is performed using the determined partition mode) to be performed by a decoder for decoding an encoded picture which is partitioned into multiple coding tree blocks which are further partitioned into multiple coding blocks with particular sizes, comprises parsing a first indication the SPS of a bit stream containing the encoded picture, wherein the first indication allows the decoder to determine the partition mode of the coding blocks, which are confined by block size restriction parameter and partition depth restriction parameter included in the SPS of the bit stream if the first indication is the first value, or confined by default block size restriction parameter and default partition depth restriction parameter if the first indication is the second value, parsing a second indication from the SPS of the bit stream if the first indication is the first value, wherein, the second indication indicates a third indication is included in a slice header of a slice including the coding blocks if the second indication is the first value, or a third indication is not included in the slice header, and the third indication indicates that a slice level size restriction parameter and a slice level partition depth restriction parameter are included in the slice header if the a third indication is the first value, or that a slice level size restriction parameter and a slice level partition depth restriction parameter are not included in the slice header if the third indication is the second value, parsing the third indication if the second indication is the first value, determining the partition mode of the multiple coding tree blocks, which are confined by the slice level partition depth restriction parameter and the slice level size restriction parameter included in the slice header if the third indication is the first value, or determining the partition mode of the multiple coding tree blocks, which are confined by partition depth restriction parameter and the size restriction parameter included in the SPS of the bit stream if the third indication is the second value or the second indication is the second value, or determining the partition mode of the multiple coding tree blocks, which are confined by default partition depth restriction parameter and the default size restriction parameter if the first indication is second value, partitioning the multiple coding tree blocks into the coding blocks according to the partition mode, and decoding the coding blocks.

In addition to the example 20, in an example 21, the third indication further indicates that is included in the slice header if the third indication is the first value.

In addition to the example 20, in an example 22, the first indication is partition_constrains_control_present_flag.

In addition to the example 20, in an example 23, the size restriction parameters include minimum quad tree size (MinQtSize), and/or maximum binary tree size (MaxBtSize), and/or maximum ternary tree size (MaxTtsize), the partition depth restriction parameter includes maximum multiple type tree depth (MaxMttDepth).

In addition to the example 20, in an example 24, the default size restriction parameters include minimum quad tree size (MinQtSize) being set as 4 or being set as minimum coding block size, and/or maximum binary tree size (MaxBtSize) being set as 128 or being set as coding tree block size for inter slice, and being set as 32 for intra slice, and/or maximum ternary tree size (MaxTtSize) being set as 64 for inter slice, and being set as 32 for intra slice, and the default partition depth restriction parameter includes maximum multiple type tree depth (MaxMttDepth) being set as 3.

According to an example 25, a decoding method is provided (which may be also operating exemplarily according to FIG. 16, wherein the determined restriction is partitioning mode and wherein the decoding is performed using the determined partition mode) to be performed by a decoder for decoding an encoded picture which is partitioned into multiple coding tree blocks which are further partitioned into multiple coding blocks with particular sizes, wherein the method comprises parsing a first indication from the SPS of a bit stream containing the encoded picture, wherein the first indication allows the decoder to determine the partition mode, which are confined by size restriction parameters and partition depth restriction parameter included in the SPS of the bit stream if the first indication is first value, or confined by default size restriction parameters and default and partition depth restriction parameter if the first indication is second value, parsing a second indication from the SPS if the first indication is the first value, wherein the second indication indicates multiply type tree partition constrained by the by size restriction parameter is allowed if second indication is the first value, or multiply type tree partition is not allowed if the second indication is the second value, parsing a third indication from the SPS if the first indication is the first value, wherein, the third indication indicates a fourth indication is included in a slice header of a slice including the coding block if the third indication is first value, or a fourth indication is not included in the slice header, and the fourth indication indicates that slice level size restriction parameter and a slice level partition depth restriction parameter are included in the slice header if the a fourth indication is first value, or that slice level size restriction parameter and a slice level partition depth restriction parameter are not included in the slice header if the a third indication is second value, parsing the fourth indication if the third indication is the first value, parsing a fifth indication from the slice header if the fourth indication is the first value, wherein the fifth indication indicates multiply type tree partition constrained by the slice level size restriction parameter is allowed in the slice if fifth indication is the first value or multiply type tree partition is not allowed in the slice if the fifth indication is the second value, determining the partition mode of the multiple coding tree blocks, which are confined by the slice level partition depth restriction parameter and the slice level size restriction parameter included in the slice header if the firth indication is the first value, or determining the partition mode of the multiple coding tree blocks, which are confined by partition depth restriction parameter and the size restriction parameter included in the SPS of the bit stream if the third indication is the second value or the fourth indication is the second value or the fifth indication is the second value, or determining the partition mode of the multiple coding tree blocks, which are confined by default partition depth restriction parameter and the default size restriction parameter if the first indication is second value, partitioning the multiple coding tree blocks into the coding blocks, and decoding the coding blocks.

In addition to the example 25, in an example 26, the fourth indication further indicates that is included in the slice header if the fourth value is the first value, and the method further comprising the following.

In addition to the example 25, in an example 27, the first indication is partition_constrains_control_present_flag.

In addition to the example 25, in an example 28, the size restriction parameters include minimum quad tree size (MinQtSize), and/or maximum binary tree size (MaxBtSize), and/or maximum ternary tree size (MaxTtsize), the partition depth restriction parameter includes maximum multiple type tree depth (MaxMttDepth).

In addition to the example 25, in an example 29, the default size restriction parameters include minimum quad tree size(MinQtSize) being set as 4 or being set as minimum coding block size, and/or maximum binary tree size (MaxBtSize) being set as 128 or being set as coding tree block size for inter slice, and being set as 32 for intra slice, and/or maximum ternary tree size (MaxTtSize) being set as 64 for inter slice, and being set as 32 for intra slice, and the default partition depth restriction parameter includes maximum multiple type tree depth (MaxMttDepth) being set as 3.

According to an example 26, a decoder is provided for decoding an encoded picture which is partitioned into multiple coding tree blocks which are further partitioned into multiple coding blocks with particular sizes, the decoder comprising a bitstream parsing unit (e.g. entropy decoder) for parsing a first indication from a parameter set of a bit stream containing the encoded picture, the parameter set being SPS, PPS, slice header, or tile header, a partitioning unit configured to determine the particular sizes of the coding blocks, which are confined by a block size restriction parameter included in the parameter set of the bit stream if the first indication has a first value, or to determine the particular sizes of the coding blocks, which are confined by a default size restriction parameter if the first indication has a second value or is not presented in the parameter set, and a reconstructing unit for decoding the coding blocks with the particular sizes.

Here, the reconstructing unit performs (hybrid) decoding (reconstruction of the encoded image) such as inverse quantization and/or inverse transformation and/or reconstruction including predictive decoding or the like.

According to an example 27, an encoder is provided for encoding a picture which is partitioned into multiple coding tree blocks which are further partitioned into multiple coding blocks with particular sizes, the encoder comprising a bitstream generating unit for inserting a first indication into a parameter set of a bit stream containing the encoded picture, the parameter set being SPS, PPS, slice header, or tile header, a partitioning unit for determining the particular sizes of the coding blocks, which are confined by a block size restriction parameter and including the parameter set into the bit stream if the first indication has a first value, or for determining the particular sizes of the coding blocks, which are confined by a default size restriction parameter and setting the first indication to a second value or not including the first indication into the parameter set, and an encoding unit for encoding the coding blocks with the particular sizes.

Figure 17:
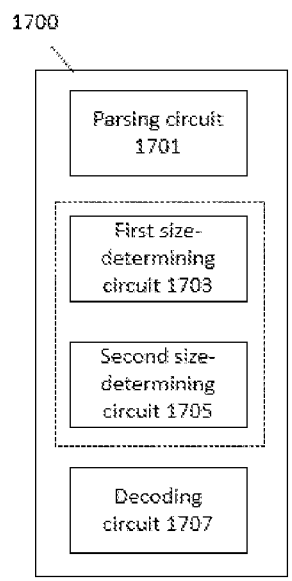
FIG. 17 is a functional block diagram illustrating an exemplary first decoding apparatus.

FIG. 17 shows a decoding apparatus 1700 for decoding an encoded picture which is partitioned into multiple coding tree blocks which are further partitioned into multiple coding blocks with particular sizes, comprises a parsing unit/circuit 1701, configured for, parsing a first indication from a parameter set of a bit stream containing the encoded picture, the parameter set being sequence parameter set, SPS, picture parameter set, PPS, slice header, or tile header, a first size determining unit/circuit 1703, configured for, determining the particular sizes of the coding blocks, which are confined by a block size restriction parameter included in the parameter set of the bit stream if the first indication has a first value, or a second size determining unit/circuit 1705, configured for, determining the particular sizes of the coding blocks, which are confined by a default size restriction parameter if the first indication has a second value or is not presented in the parameter set, and a decoding unit/circuit 1707, configured for decoding the coding blocks with the particular sizes. The first and second size determining circuits/units may be included within one size determination unit (circuitry) as illustrated by the dashed line.

Figure 18:
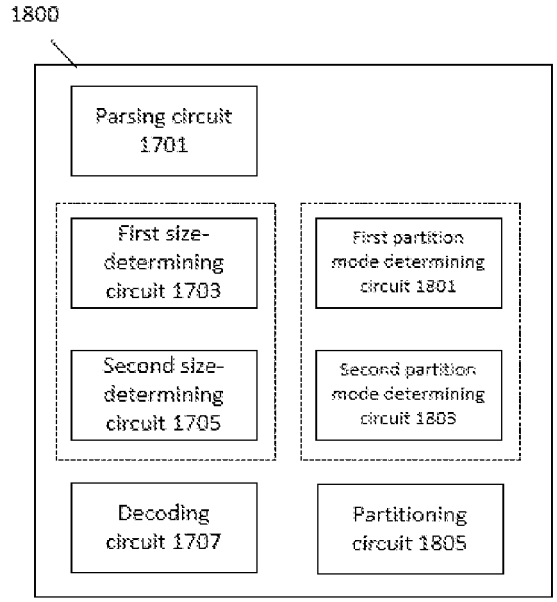
FIG. 18 is a functional block diagram illustrating an exemplary second decoding apparatus.

In FIG. 18, the decoding apparatus 1800 is based on the decoding apparatus 1700 and further comprises a first partition mode determining unit/circuit 1801, configured for, determining a partition mode of the multiple coding tree blocks, which are confined by a partition depth restriction parameter included in the parameter set of the bit stream if the first indication has the first value, or a second partition mode determining unit/circuit 1803, configured for, determining the partition mode of the multiple coding tree blocks, which are confined by a default partition depth restriction parameter if the first indication has the second value or us not presented in the parameter set, and a partitioning unit/circuit 1805, configured for, partitioning the multiple coding tree blocks into the coding blocks with the particular sizes according to the partition mode. The first and second partition mode determining circuits/units may be included within one partition mode determining unit (circuitry) as illustrated by the dashed line.

Figure 19:
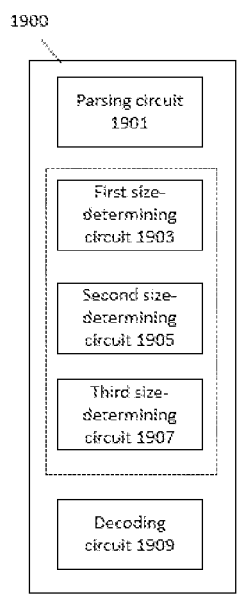
FIG. 19 is a functional block diagram illustrating an exemplary third decoding apparatus.

In FIG. 19, a decoding apparatus 1900 is shown for decoding an encoded picture which is partitioned into multiple coding tree blocks which are further partitioned into multiple coding blocks with particular sizes. The apparatus 1900 comprises a parsing unit/circuit 1901, configured for parsing a first indication the SPS of a bit stream containing the encoded picture, wherein the first indication allows the decoder to determine the particular sizes of the coding blocks, which are confined by block size restriction parameter included in the SPS of the bit stream if the first indication is the first value, or confined by default block size restriction parameter if the first indication is the second value, parsing a second indication from the SPS of the bit stream if the first indication is the first value, wherein, the second indication indicates that a third indication is included in a slice header of a slice including the coding blocks if the second indication has a third value, or a third indication is not included in the slice header, and the third indication indicates that a slice level size restriction parameter is included in the slice header if the third indication has a fifth value, or that a slice level size restriction parameter is not included in the slice header if the third indication has a sixth value, parsing the third indication if the second indication has the third value, a first size determining unit/circuit 1903, configured for, determining the particular sizes of the coding blocks, which are confined by the slice level size restriction parameter included in the slice header if the third indication has the fifth value, or a second size determining unit/circuit 1905, configured for, determining the particular sizes of the coding blocks, which are confined by the block size restriction parameter included in the SPS of the bit stream if the third indication has the sixth value or the second indication has a fourth value, or a third size determining unit/circuit 1907, configured for, determining the particular sizes of the coding blocks, which are confined by the default size restriction parameter if the first indication has second value, a decoding unit/circuit 1909, decoding the coding blocks with the particular sizes.

Figure 20:
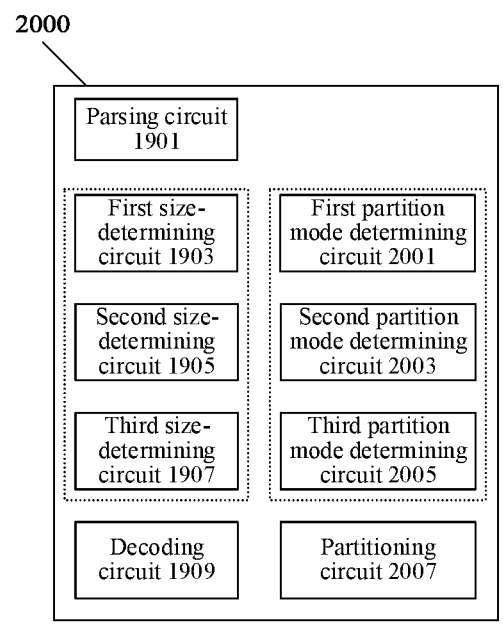
FIG. 20 is a functional block diagram illustrating an exemplary fourth decoding apparatus.

In FIG. 20, an apparatus 2000 based on the apparatus 1900 is shown. The third indication further indicates that a slice level partition depth restriction parameter is included in the slice header if the third indication has the fifth value. The decoding apparatus 2000 further comprises a first partition mode determining unit/circuit 2001, configured for, determining the partition mode of the multiple coding tree blocks, which are confined by the slice level partition depth restriction parameter and the slice level size restriction parameter included in the slice header if the third indication has the fifth value, or a second partition mode determining unit/circuit 2003, configured for, determining the partition mode of the multiple coding tree blocks, which are confined by partition depth restriction parameter and the size restriction parameter included in the SPS of the bit stream if the third indication has the sixth value or the second indication has the fourth value, or a third partition mode determining unit/circuit 2005, configured for, determining the partition mode of the multiple coding tree blocks, which are confined by default partition depth restriction parameter and the default size restriction parameter if the first indication has the second value, and a partitioning unit/circuit 2007, configured for, partitioning the multiple coding tree blocks into the coding blocks with the particular sizes according to the partition mode.

Figure 21:
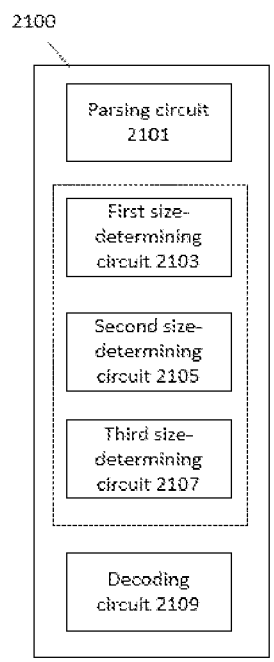
FIG. 21 is a functional block diagram illustrating an exemplary fifth decoding apparatus.

FIG. 21 shows a decoding apparatus 2100 for decoding an encoded picture which is partitioned into multiple coding tree blocks which are further partitioned into multiple coding blocks with particular sizes, comprises a parsing unit/circuit 2301, configured for, parsing a first indication from the sequence parameter set, SPS, of a bit stream containing the encoded picture, wherein the first indication allows the decoder to determine the particular sizes of the coding blocks, which are confined by a size restriction parameter included in the SPS of the bit stream if the first indication has a first value, or confined by default size restriction parameters if the first indication has a second value, parsing a second indication from the SPS if the first indication has the first value, wherein the second indication indicates that multiple type tree partitioning constrained by a size restriction parameter is allowed if second indication has the third value, or indicates that multiple type tree partitioning is not allowed if the second indication has the fourth value, parsing a third indication from the SPS if the first indication has the first value, wherein, the third indication indicates that a fourth indication is included in a slice header of a slice including the coding block if the third indication has the fifth value, or the fourth indication is not included in the slice header, and the fourth indication indicates that slice level size restriction parameter is included in the slice header if the fourth indication has a seventh value, or that the slice level size restriction parameter is not included in the slice header if the third indication has the sixth value, parsing the fourth indication if the third indication has the fifth value, parsing a fifth indication from the slice header if the fourth indication has the seventh value, wherein the fifth indication indicates that multiple type tree partitioning constrained by the slice level size restriction parameter is allowed in the slice if the fifth indication has a ninth value or indicates that multiple type tree partitioning is not allowed in the slice if the fifth indication has a tenth value, a first size determining unit/circuit 2103, configured for, determining the particular sizes of the coding blocks, which are confined by the slice level size restriction parameter included in the slice header if the fifth indication has the ninth value, or a second size determining unit/circuit 2105, configured for, determining the particular sizes of the coding blocks, which are confined by the size restriction parameter included in the SPS of the bit stream if the third indication has the sixth value and the second indication has the third value or the fourth indication has an eighth value and the second indication has the third value, or a third size determining unit/circuit 2107, configured for, determining the particular sizes of the coding blocks, which are confined by the default size restriction parameter if the first indication is second value, a decoding unit/circuit 2109, configured for, decoding the coding blocks with the particular sizes.

Figure 22:
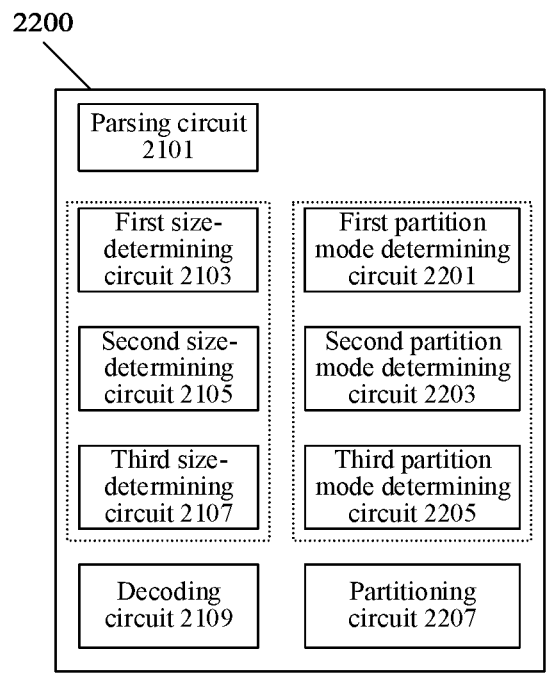
FIG. 22 is a functional block diagram illustrating an exemplary sixth decoding apparatus.

In FIG. 22, an apparatus 2200 is shown based on the apparatus 2100. Here, the fourth indication further indicates that a slice level partition depth restriction parameter is included in the slice header if the fourth indication has the seventh value. The decoding apparatus 2200 further comprises a first partition mode determining unit/circuit 2201, configured for, determining the partition mode of the multiple coding tree blocks, which are confined by the slice level partition depth restriction parameter and the slice level size restriction parameter included in the slice header if the fifth indication has the ninth value, or a second partition mode determining unit/circuit 2203, configured for, determining the partition mode of the multiple coding tree blocks, which are confined by partition depth restriction parameter and the size restriction parameter included in the SPS of the bit stream if the third indication has the fourth value or the fourth indication has the eighth value or the fifth indication has the tenth value, or a third partition mode determining unit/circuit 2205, configured for, determining the partition mode of the multiple coding tree blocks, which are confined by default partition depth restriction parameter and the default size restriction parameter if the first indication has the second value, and a partitioning unit/circuit 2207, configured for, partitioning the multiple coding tree blocks into the coding blocks with the particular sizes according to the partition mode.

Figure 23:
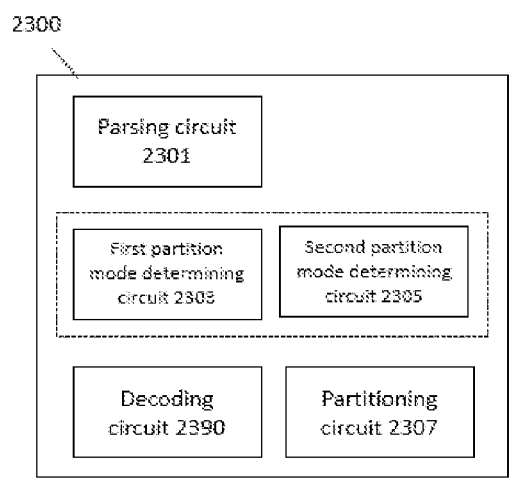
FIG. 23 is a functional block diagram illustrating an exemplary seventh decoding apparatus.

In FIG. 23, a decoding apparatus 2300 is provided for decoding an encoded picture which is partitioned into multiple coding tree blocks which are further partitioned into multiple coding blocks with particular sizes, comprises a parsing unit/circuit 2301, configured for, parsing a first indication from sequence parameter set, SPS, or picture parameter set, PPS, or slice header or tile header of a bit stream containing the encoded picture, a first partition mode determining unit/circuit 2303, configured for, determining the partition mode of the multiple coding tree blocks, which are confined by block size restriction parameter and partition depth restriction parameter included in the SPS or PPS or slice header or tile header of the bit stream if the first indication has a first value, or a second partition mode determining unit/circuit 2305, configured for, determining the partition mode of the multiple coding tree blocks, which are confined by default block size restriction parameter and default partition depth restriction parameter if the first indication has a second value or not presented in the SPS or PPS or slice header or tile header, and a partitioning unit/circuit 2307, configured for, partitioning the multiple coding tree blocks into the coding blocks with according to the partition mode, and a decoding unit/circuit 2309, configured for, decoding the coding blocks.

Figure 24:
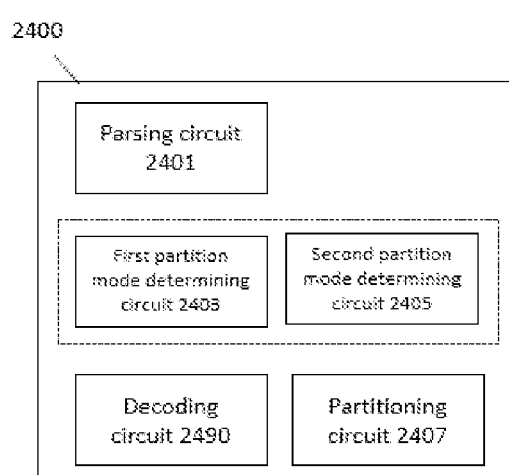
FIG. 24 is a functional block diagram illustrating an exemplary eighth decoding apparatus.

In FIG. 24, a decoding apparatus 2400 is provided for decoding an encoded picture which is partitioned into multiple coding tree blocks which are further partitioned into multiple coding blocks with particular sizes, comprises a parsing unit/circuit 2401, configured for parsing a first indication the sequence parameter set, SPS, of a bit stream containing the encoded picture, wherein the first indication allows the decoder to determine the partition mode of the coding blocks, which are confined by block size restriction parameter and partition depth restriction parameter included in the SPS of the bit stream if the first indication has a first value, or confined by default block size restriction parameter and default partition depth restriction parameter if the first indication has a second value, parsing a second indication from the SPS if the first indication has the first value, wherein, the second indication indicates that a third indication is included in a slice header of a slice including the coding blocks if the second indication has the first value, or the third indication is not included in the slice header, and the third indication indicates that a slice level size restriction parameter and a slice level partition depth restriction parameter are included in the slice header if the a third indication has a fifth value, or that a slice level size restriction parameter and a slice level partition depth restriction parameter are not included in the slice header if the third indication is a sixth value, parsing the third indication if the second indication has a third value, a first partition mode determining unit/circuit 2403, determining the partition mode of the multiple coding tree blocks, which are confined by the slice level partition depth restriction parameter and the slice level size restriction parameter included in the slice header if the third indication has the fifth value, or a second partition mode determining unit/circuit 2405, determining the partition mode of the multiple coding tree blocks, which are confined by partition depth restriction parameter and the size restriction parameter included in the SPS of the bit stream if the third indication has the sixth value or the second indication has a fourth value, or determining the partition mode of the multiple coding tree blocks, which are confined by default partition depth restriction parameter and the default size restriction parameter if the first indication has the second value, a partitioning unit/circuit 2407, configured for, partitioning the multiple coding tree blocks into the coding blocks according to the partition mode, and a decoding unit/circuit 2409, configured for, decoding the coding blocks.

Figure 25:
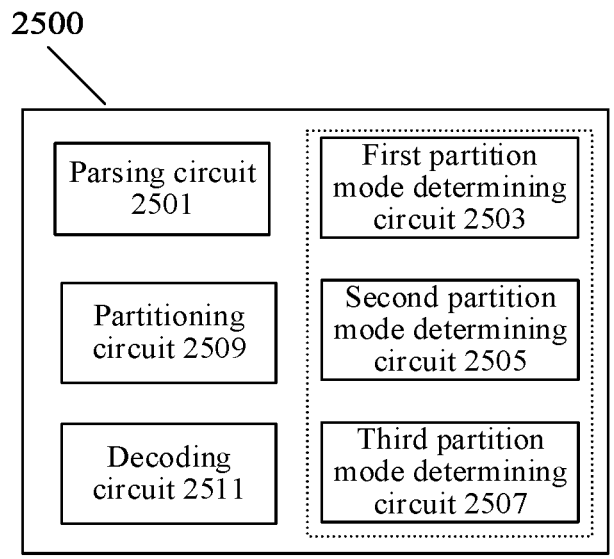
FIG. 25 is a functional block diagram illustrating an exemplary ninth decoding apparatus.

In FIG. 25, a decoding apparatus 2500 is provided for decoding an encoded picture which is partitioned into multiple coding tree blocks which are further partitioned into multiple coding blocks with particular sizes, comprises a parsing unit/circuit 2501, configured for parsing a first indication from the sequence parameter set, SPS, of a bit stream containing the encoded picture, wherein the first indication allows the decoder to determine the partition mode, which are confined by size restriction parameters and partition depth restriction parameter included in the SPS of the bit stream if the first indication has a first value, or confined by default size restriction parameters and default partition depth restriction parameter if the first indication has a second value, parsing a second indication from the SPS if the first indication has the first value, wherein the second indication indicates that multiple type tree partitioning constrained by the size restriction parameter is allowed if the second indication has a third value, or multiple type tree partitioning is not allowed if the second indication has a fourth value, parsing a third indication from the SPS if the first indication has the first value, wherein, the third indication indicates that a fourth indication is included in a slice header of a slice including the coding block if the third indication has a fifth value, or a fourth indication is not included in the slice header, and the fourth indication indicates that slice level size restriction parameter and a slice level partition depth restriction parameter are included in the slice header if the fourth indication has a seventh value, or that slice level size restriction parameter and a slice level partition depth restriction parameter are not included in the slice header if the third indication has a sixth value, parsing the fourth indication if the third indication has the fifth value, parsing a fifth indication from the slice header if the fourth indication has an eighth value, wherein the fifth indication indicates that multiple type tree partition constrained by the slice level size restriction parameter is allowed in the slice if the fifth indication has a ninth value or multiple type tree partition is not allowed in the slice if the fifth indication has a tenth value, a first partition mode determining unit/circuit 2503, determining the partition mode of the multiple coding tree blocks, which are confined by the slice level partition depth restriction parameter and the slice level size restriction parameter included in the slice header if the fifth indication has the ninth value, or a second partition mode determining unit/circuit 2505, determining the partition mode of the multiple coding tree blocks, which are confined by the partition depth restriction parameter and the size restriction parameter included in the SPS of the bit stream if the third indication has the sixth value or the fourth indication has the eighth value or the fifth indication has the tenth value, or a third partition mode determining unit/circuit 2507, determining the partition mode of the multiple coding tree blocks, which are confined by default partition depth restriction parameter and the default size restriction parameter if the first indication has the second value, a partitioning unit/circuit 2509, configured for, partitioning the multiple coding tree blocks into the coding blocks, and a decoding unit/circuit 2511, configured for, decoding the coding blocks.

In any of the above embodiments, the first, second partition mode determining circuits/units may be included within one partition mode determining unit (circuitry). Similarly, in any of the above embodiments, the first, second, and third size determining circuits/units may be included within one size determination unit (circuitry).

Figure 26:
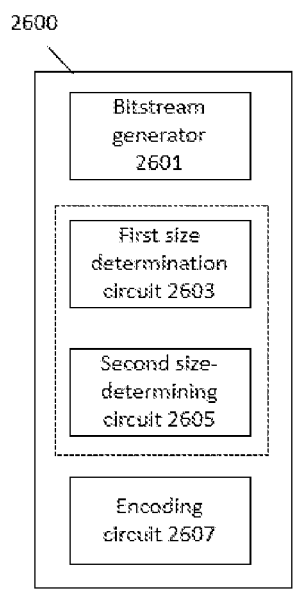
FIG. 26 is a functional block diagram illustrating an encoding apparatus.

In FIG. 26, an encoding apparatus 2600 is provided for encoding a picture which is partitioned into multiple coding tree blocks which are further partitioned into multiple coding blocks with particular sizes, the encoder comprising a bitstream generating unit/circuit 2601 for inserting a first indication into a parameter set of a bit stream containing the encoded picture, the parameter set being sequence parameter set, SPS, picture parameter set, PPS, slice header, or tile header, a first size determining unit/circuit 2603 for determining the particular sizes of the coding blocks, which are confined by a block size restriction parameter and including the parameter set into the bit stream if the first indication has a first value, or a second size determining unit/circuit 2605 for determining the particular sizes of the coding blocks, which are confined by a default size restriction parameter and setting the first indication to a second value or not including the first indication into the parameter set, and an encoding unit/circuit 2607 for encoding the coding blocks with the particular sizes.

Here, the encoding unit performs (hybrid) encoding (of the image/video) such as quantization and/or transformation and/or predictive coding or the like.

The following logical operators are defined as follows:
x && y Boolean logical "and" of x and y
x|| y Boolean logical "or" of x and y
! Boolean logical "not"
x? y:z If x is TRUE or not equal to 0, evaluates to the value of y, otherwise, evaluates to the value of z.

The following relational operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

The invention claimed is:

1. A method implemented by a decoder, wherein the method comprises:
parsing a first indication from a parameter set of a bit stream that comprises an encoded picture, wherein the encoded picture is partitioned into a plurality of coding tree blocks, wherein the coding tree blocks are partitioned into a plurality of coding blocks of different sizes, and wherein the parameter set comprises a sequence parameter set (SPS), a picture parameter set (PPS), a slice header, or a tile header;

determining, based on a block size restriction parameter in the parameter set, the different sizes when the first indication has a first value;

determining, based on a default size restriction parameter, the different sizes when the first indication has a second value or the first indication is not in the parameter set;

decoding the coding blocks based on the different sizes;

determining, based on a partition depth restriction parameter in the parameter set, a partition mode of the coding tree blocks when the first indication has the first value;

determining, based on a default partition depth restriction parameter, the partition mode when the first indication has the second value or the first indication is not in the parameter set; and partitioning the coding tree blocks into the coding blocks according to the partition mode.

2. The method of claim 1, wherein the first indication is a partition_constraints_control_present_flag.

3. The method of claim 1, wherein the block size restriction parameter and the default size restriction parameter comprise a minimum quad tree size, and wherein the partition depth restriction parameter comprises a maximum multiple type tree depth.

4. The method of claim 1, wherein the default size restriction parameter comprises a minimum quad tree size, wherein the minimum quad tree size is set as 4 or a minimum coding block size, and wherein the default partition depth restriction parameter comprises a maximum multiple type tree depth being set as 3.

5. A decoding apparatus comprising:
a memory configured to store instructions; and
a processor coupled to the memory, wherein the instructions cause the processor to be configured to:
parse a first indication from a parameter set of a bit stream that comprises an encoded picture, wherein the encoded picture is partitioned into a plurality of coding tree blocks, wherein the coding tree blocks are partitioned into a plurality of coding blocks of different sizes, and wherein the parameter set comprises a sequence parameter set (SPS), a picture parameter set (PPS), a slice header, or a tile header;
determine, based on a block size restriction parameter in the parameter set, the different sizes when the first indication has a first value;
determine, based on a default size restriction parameter, the different sizes when the first indication has a second value or the first indication is not presented in the parameter set;
decode the coding blocks based on the different sizes;
determine, based on a partition depth restriction parameter in the parameter set, a partition mode of the coding tree blocks when the first indication has the first value;
determine, based on a default partition depth restriction parameter, the partition mode when the first indication has the second value or the first indication is not presented in the parameter set; and
partition, according to the partition mode, the coding tree blocks into the coding blocks.

6. The decoding apparatus of claim 5, wherein the first indication is a partition_constraints_control_present_flag.

7. The decoding apparatus of claim 5, wherein the block size restriction parameter and the default size restriction parameter comprise a minimum quad tree size, a maximum binary tree size, and a maximum ternary tree size, and wherein the partition depth restriction parameter comprises a maximum multiple type tree depth.

8. The decoding apparatus of claim 5, wherein the default size restriction parameter comprises a minimum quad tree size, wherein the minimum quad tree size is set as 4 or a minimum coding block size, and wherein the default partition depth restriction parameter comprises a maximum multiple type tree depth being set as 3.

9. The decoding apparatus of claim 5, wherein the block size restriction parameter and the default size restriction parameter comprise a minimum quad tree size, and wherein the partition depth restriction parameter comprises a maximum multiple type tree depth.

10. The decoding apparatus of claim 5, wherein the block size restriction parameter and the default size restriction parameter comprise a maximum binary tree size, and wherein the partition depth restriction parameter comprises a maximum multiple type tree depth.

11. The decoding apparatus of claim 5, wherein the block size restriction parameter and the default size restriction parameter comprise a maximum ternary tree size, and wherein the partition depth restriction parameter comprises a maximum multiple type tree depth.

12. The decoding apparatus of claim 8, wherein the default partition depth restriction parameter comprises a maximum multiple type tree depth being set as 3.

13. The decoding apparatus of claim 5, wherein the default size restriction parameter comprises a maximum binary tree size, wherein the maximum binary tree size is set as 128 for inter slice and 32 for intra slice, and wherein the default partition depth restriction parameter comprises a maximum multiple type tree depth being set as 3.

14. The decoding apparatus of claim 5, wherein the default size restriction parameter comprises a maximum binary tree size, wherein the maximum binary tree size is set as a coding tree block size for inter slice and 32 for intra slice, and wherein the default partition depth restriction parameter comprises a maximum multiple type tree depth being set as 3.

15. The decoding apparatus of claim 5, wherein the default size restriction parameter comprises a maximum ternary tree size, wherein the maximum ternary tree size is set as 64 for inter slice and 32 for intra slice, and wherein the default partition depth restriction parameter comprises a maximum multiple type tree depth being set as 3.

16. The method of claim 1, wherein the block size restriction parameter and the default size restriction parameter comprise a maximum binary tree size, and wherein the partition depth restriction parameter comprises a maximum multiple type tree depth.

17. The method of claim 1, wherein the block size restriction parameter and the default size restriction parameter comprise a maximum ternary tree size, and wherein the partition depth restriction parameter comprises a maximum multiple type tree depth.

18. The method of claim 1, wherein the default size restriction parameter comprises a maximum binary tree size, wherein the maximum binary tree size is set as 128 for inter slice and 32 for intra slice, and wherein the default partition depth restriction parameter comprises a maximum multiple type tree depth being set as 3.

19. The method of claim 1, wherein the default size restriction parameter comprises a maximum binary tree size, wherein the maximum binary tree size is set as a coding tree block size for inter slice and 32 for intra slice, and wherein the default partition depth restriction parameter comprises a maximum multiple type tree depth being set as 3.

20. The method of claim 1, wherein the default size restriction parameter comprises a maximum ternary tree size, wherein the maximum ternary tree size is set as 64 for inter slice and 32 for intra slice, and wherein the default partition depth restriction parameter comprises a maximum multiple type tree depth being set as 3.

* * * * *